United States Patent
Takanashi et al.

(10) Patent No.: US 9,942,537 B2
(45) Date of Patent: Apr. 10, 2018

(54) IMAGE PROCESSING DEVICE, IMAGING APPARATUS, AND COMPUTER-READABLE MEDIUM HAVING STORED THEREON AN IMAGE PROCESSING PROGRAM

(71) Applicant: NIKON CORPORATION, Tokyo (JP)

(72) Inventors: Yusuke Takanashi, Yokohama (JP); Kenichi Ishiga, Yokohama (JP)

(73) Assignee: NIKON CORPORATION, Tokyo (JP)

(*) Notice: Subject to any disclaimer, the term of this patent is extended or adjusted under 35 U.S.C. 154(b) by 224 days.

(21) Appl. No.: 14/869,527

(22) Filed: Sep. 29, 2015

(65) Prior Publication Data

US 2016/0094835 A1 Mar. 31, 2016

Related U.S. Application Data

(63) Continuation of application No. PCT/JP2014/001884, filed on Mar. 31, 2014.

(30) Foreign Application Priority Data

Mar. 29, 2013 (JP) .................. 2013-075018
Mar. 29, 2013 (JP) .................. 2013-075092

(51) Int. Cl.
*H04N 13/04* (2006.01)
*H04N 13/00* (2018.01)
(Continued)

(52) U.S. Cl.
CPC ......... *H04N 13/0409* (2013.01); *H04N 5/243* (2013.01); *H04N 13/0018* (2013.01);
(Continued)

(58) Field of Classification Search
CPC .......... H04N 13/0018; H04N 13/0207; H04N 13/0232; H04N 13/0296; H04N 13/0409; H04N 5/243
(Continued)

(56) References Cited

U.S. PATENT DOCUMENTS 6,496,218 B2 * 12/2002 Takigawa ........... G02B 27/2228
                                                              348/42
8,131,098 B2 *  3/2012 Watanabe ............ G06K 9/4633
                                                              345/422
(Continued)

FOREIGN PATENT DOCUMENTS

JP        2003-007994 A     1/2003
JP        2010-145544 A     7/2010
(Continued)

OTHER PUBLICATIONS

Aldalali et al, A micro camera utilizing a mirolens array for multiple viewpoint imaging, 2011.*
(Continued)

*Primary Examiner* — Shan E Elahi
(74) *Attorney, Agent, or Firm* — Oliff PLC

(57) ABSTRACT

An image processing device including means for: inputting two parallax images composed of images of first and second viewpoint directions; generating first and second smoothed images by applying, respectively to the images of the first and second viewpoint directions, a smoothing filter in a direction joining the first and second viewpoints; generating a reference image formed by a value based on a product of values of the first and second smoothed images; generating gain distribution data by dividing a value of the reference image by the value of the first smoothed image; performing gain correction of each pixel on the image of the first viewpoint direction, based on the gain distribution data; and outputting the gain corrected image of the first viewpoint direction as a parallax image, the smoothing filter having a filter diameter approximately equal to a parallax amount between the images of the first and second viewpoint directions.

33 Claims, 14 Drawing Sheets

(51) Int. Cl.
*H04N 13/02* (2006.01)
*H04N 5/243* (2006.01)

(52) U.S. Cl.
CPC ..... *H04N 13/0207* (2013.01); *H04N 13/0296* (2013.01); *H04N 13/0232* (2013.01)

(58) Field of Classification Search
USPC .......................................................... 348/54
See application file for complete search history.

(56) References Cited

U.S. PATENT DOCUMENTS

| | | | |
|---|---|---|---|
| 8,259,213 B2 | 9/2012 | Ishiga | |
| 8,885,026 B2 * | 11/2014 | Endo | H04N 13/0217 348/340 |
| 9,167,224 B2 * | 10/2015 | Izawa | G02B 7/34 |
| 9,247,227 B2 * | 1/2016 | Izawa | H04N 13/0022 |
| 2002/0113867 A1 * | 8/2002 | Takigawa | G02B 27/2228 348/51 |
| 2010/0289878 A1 * | 11/2010 | Sato | G03B 35/26 348/46 |
| 2011/0080487 A1 * | 4/2011 | Venkataraman | H04N 5/2253 348/218.1 |
| 2011/0122308 A1 * | 5/2011 | Duparre | H01L 27/14621 348/340 |
| 2011/0234861 A1 * | 9/2011 | Endo | H04N 5/3572 348/243 |
| 2011/0298917 A1 * | 12/2011 | Yanagita | G03B 5/02 348/135 |
| 2013/0135448 A1 * | 5/2013 | Nagumo | H04N 13/0203 348/49 |
| 2013/0162780 A1 * | 6/2013 | Kurahashi | H04N 5/3572 348/46 |
| 2013/0188025 A1 * | 7/2013 | Hayashi | G03B 5/00 348/49 |
| 2013/0278730 A1 * | 10/2013 | Hasegawa | G03B 35/08 348/49 |
| 2013/0342641 A1 * | 12/2013 | Morioka | G03B 35/08 348/36 |
| 2014/0028806 A1 * | 1/2014 | Endo | H04N 13/0217 348/49 |
| 2014/0168362 A1 * | 6/2014 | Hannuksela | H04N 19/597 348/43 |
| 2014/0198188 A1 * | 7/2014 | Izawa | H04N 13/0022 348/49 |
| 2014/0204178 A1 * | 7/2014 | Kawai | G03B 35/08 348/46 |
| 2014/0375673 A1 | 12/2014 | Ishiga et al. | |
| 2015/0002634 A1 | 1/2015 | Ishiga et al. | |
| 2015/0009299 A1 * | 1/2015 | Izawa | G02B 7/34 348/49 |
| 2015/0062307 A1 | 3/2015 | Ishiga et al. | |
| 2015/0062308 A1 | 3/2015 | Ishiga | |
| 2015/0103144 A1 | 4/2015 | Shibazaki et al. | |
| 2015/0156430 A1 | 6/2015 | Ishiga et al. | |

FOREIGN PATENT DOCUMENTS

| | | |
|---|---|---|
| WO | 2012/036019 A1 | 3/2012 |
| WO | 2012/039346 A1 | 3/2012 |
| WO | 2013/027513 A1 | 2/2013 |

OTHER PUBLICATIONS

Wang et al, Stereoscopic Image Acquisition and Autosteroscoic Display, 2010.*
Hoshino et al, A study of resolution and aliasing for multi-viewpoint image acquisition, Apr. 2000.*
Burt et al., "The Laplacian Pyramid as a Compact Image Code," IEEE Transactions on Communications, vol. COM-31, No. 4, pp. 532-540, Apr. 1983.
Jun. 17, 2014 International Search Report issued in International Patent Application No. PCT/JP2014/001884.
Sep. 29, 2015 International Preliminary Report on Patentability issued in International Patent Application No. PCT/JP2014/001884.

* cited by examiner

LEFT PARALLAX IMAGE (BEFORE CORRECTION)   RIGHT PARALLAX IMAGE (BEFORE CORRECTION)

LEFT PARALLAX IMAGE (AFTER CORRECTION)   RIGHT PARALLAX IMAGE (AFTER CORRECTION)

IMAGE PROCESSING DEVICE, IMAGING APPARATUS, AND COMPUTER-READABLE MEDIUM HAVING STORED THEREON AN IMAGE PROCESSING PROGRAM

BACKGROUND

The contents of the following Japanese and PCT patent applications are incorporated herein by reference:
NO. 2013-075018 filed on Mar. 29, 2013,
NO. 2013-075092 filed on Mar. 29, 2013, and
NO. PCT/JP2014/001884 filed on Mar. 31, 2014.

1. Technical Field

The present invention relates to an image processing device, an imaging apparatus, and an image processing program.

2. Related Art

An imaging apparatus is known in which a single imaging optical system is used to generate left and right parallax images having a parallax therebetween, as the result of a single instance of imaging.
Patent Document 1: Japanese Patent Application Publication No. 2003-7994
The left and right parallax images obtained by this type of imaging apparatus have different amounts of shading.

SUMMARY

According to a first aspect of the present invention, provided is an image processing device comprising an input device for inputting, through one optical system, at least two parallax images composed of an image of a first viewpoint direction and an image of a second viewpoint direction obtained by capturing a subject image of a partial luminous flux passed through different regions from among a total luminous flux; a smoothed image generating device for generating a first smoothed image and a second smoothed image by applying, respectively to the image of the first viewpoint direction and the image of the second viewpoint direction, a smoothing filter at least in a direction joining the first viewpoint and the second viewpoint; a reference image generating device for generating a reference image formed by a value based on a product of a value of the first smoothed image and a value of the second smoothed image; a first gain distribution data generating device for generating first gain distribution data by dividing a value of the reference image by the value of the first smoothed image; a first gain correcting device for performing a gain correction of each pixel on the image of the first viewpoint direction, based on the first gain distribution data; and a first output device for outputting the image of the first viewpoint direction on which the gain correction has been performed, as a parallax image for stereoscopic display. The smoothing filter is a filter for smoothing that has a filter diameter approximately equal to a parallax amount occurring between the image of the first viewpoint direction and the image of the second viewpoint direction.

According to a second aspect of the present invention, provided is an image processing device comprising an input device for inputting, through one optical system, at least two parallax images composed of an image of a first viewpoint direction and an image of a second viewpoint direction obtained by capturing a subject image of a partial luminous flux passed through different regions from among a total luminous flux; a smoothed image generating device for generating a first smoothed image and a second smoothed image by applying, respectively to the image of the first viewpoint direction and the image of the second viewpoint direction, a smoothing filter at least in a direction joining the first viewpoint and the second viewpoint; a reference image generating device for generating a reference image based on the first smoothed image and the second smoothed image; a first gain distribution data generating device for generating first gain distribution data by dividing a value of the reference image by a value of the first smoothed image; a second gain distribution data generating device for generating second gain distribution data by dividing the value of the reference image by a value of the second smoothed image; a first gain correcting device for performing a gain correction of each pixel on the image of the first viewpoint direction, based on the first gain distribution data; a second gain correcting device for performing a gain correction of each pixel on the image of the second viewpoint direction, based on the second gain distribution data; an output device for outputting together the image of the first viewpoint direction on which the gain correction has been performed and the image of the second viewpoint direction on which the gain correction has been performed, as parallax images for stereoscopic display; and an adjusting device for adjusting a parallax amount between the parallax images for the stereoscopic display, by causing a filter diameter of the smoothing filter to be variable. The filter diameter contracts to zero when eliminating the parallax and widens to a diameter greater than or equal to a maximum parallax amount that can occur between two parallax pixels of the input image when preserving the parallax.

According to a third aspect of the present invention, provided is an image processing device comprising an image data acquiring section that acquires first image data corresponding to a first viewpoint and second image data corresponding to a second viewpoint, obtained through an optical system of which at least a portion is shared; a smoothed data generating section that generates first smoothed data and second smoothed data by respectively filtering the first image data and the second image data such that an image represented by the first image data and an image represented by the second image data are smoothed in a parallax direction; a target image data generating section that generates target image data using a geometric mean of a pixel value of the first smoothed data and a pixel value of the second smoothed data; and a gain correcting section that corrects the first image data using a ratio of the target image data to the first smoothed data.

According to a fourth aspect of the present invention, provided is an imaging apparatus comprising an image sensor and the image processing device described above. The first image data and the second image data are generated based on output of the image sensor.

According to a fifth aspect of the present invention, provided is a computer-readable medium storing thereon an image processing program that causes a computer to acquire first image data corresponding to a first viewpoint and second image data corresponding to a second viewpoint, obtained through an optical system of which at least a portion is shared; generate first smoothed data and second smoothed data by respectively filtering the first image data and the second image data such that an image represented by the first image data and an image represented by the second image data are smoothed in a parallax direction; generate target image data using a geometric mean of a pixel value of the first smoothed data and a pixel value of the second smoothed data; and correct the first image data using a ratio of the target image data to the first smoothed data.

According to a sixth aspect of the present invention, provided is an image processing device comprising an input device for inputting, through one optical system, at least two parallax images composed of an image of a first viewpoint direction and an image of a second viewpoint direction obtained by capturing a subject image of a partial luminous flux passed through different regions from among a total luminous flux; a one-dimensional distribution data generating device for generating one-dimensional distribution data of the first viewpoint direction and one-dimensional distribution data of the second viewpoint direction projected one-dimensionally respectively for the image of the first viewpoint direction and the image of the second viewpoint direction, by adding together pixel values of a plurality of pixels lined up in a y direction orthogonal to an x direction that joins the first viewpoint and the second viewpoint; a one-dimensional smoothed distribution data generating device for generating first one-dimensional smoothed distribution data and second one-dimensional smoothed distribution data by applying a one-dimensional smoothing filter respectively to the one-dimensional distribution data of the first viewpoint direction and the one-dimensional distribution data of the second viewpoint direction projected one-dimensionally; a one-dimensional reference distribution data generating device for generating one-dimensional reference distribution data by obtaining a point between the first one-dimensional smoothed distribution data and the second one-dimensional smoothed distribution data, based on the first one-dimensional smoothed distribution data and the second one-dimensional smoothed distribution data; a first one-dimensional gain distribution data generating device for generating first one-dimensional gain distribution data by dividing a value of the one-dimensional reference distribution data by a value of the first one-dimensional smoothed distribution data; a first gain correcting device for performing a gain correction in the one-dimensional direction on the image of the first viewpoint direction, using the first one-dimensional gain distribution data in common at each y coordinate; and a first output device for outputting the image of the first viewpoint on which the gain correction has been performed, as a parallax image for stereoscopic display. The one-dimensional smoothing filter is a filter that smooths across a range greater than a maximum parallax amount occurring between the image of the first viewpoint direction and the image of the second viewpoint direction.

According to a seventh aspect of the present invention, provided is an image processing device comprising an image data acquiring section that acquires first image data corresponding to a first viewpoint and second image data corresponding to a second viewpoint, obtained through an optical system of which at least a portion is shared; a one-dimensional projection data generating section that generates first one-dimensional projection data and second one-dimensional projection data by adding together, respectively for the first image data and the second image data, pixel values of a plurality of pixels lined up in a direction orthogonal to the parallax direction; a one-dimensional smoothed data generating section that generates first one-dimensional smoothed data and second one-dimensional smoothed data by calculating, respectively for the first one-dimensional projection data and the second one-dimensional projection data, a movement average with a sampling width that is greater than or equal to a maximum parallax amount; a one-dimensional reference data generating section that generates one-dimensional reference data based on the first one-dimensional smoothed data and the second one-dimensional smoothed data; and a shading correcting section that performs a shading correction on the first image data using a ratio of the one-dimensional reference data to the first one-dimensional smoothed data.

According to an eighth aspect of the present invention, provided is an imaging apparatus comprising an image sensor and the image processing device described above. The first image data and the second image data are generated based on output of the image sensor.

According to a ninth aspect of the present invention, provided is a computer-readable medium storing thereon an image processing program that causes a computer to acquire first image data corresponding to a first viewpoint and second image data corresponding to a second viewpoint, obtained through an optical system of which at least a portion is shared; generate first one-dimensional projection data and second one-dimensional projection data by adding together, respectively for the first image data and the second image data, pixel values of a plurality of pixels lined up in a direction orthogonal to the parallax direction; generate first one-dimensional smoothed data and second one-dimensional smoothed data by calculating, respectively for the first one-dimensional projection data and the second one-dimensional projection data, a movement average with a sampling width that is greater than or equal to a maximum parallax amount; generate one-dimensional reference data based on the first one-dimensional smoothed data and the second one-dimensional smoothed data; and perform a shading correction on the first image data using a ratio of the one-dimensional reference data to the first one-dimensional smoothed data.

The summary clause does not necessarily describe all necessary features of the embodiments of the present invention. The present invention may also be a sub-combination of the features described above.

BRIEF DESCRIPTION OF THE DRAWINGS

FIG. 3-B is a drawing for describing the basics of defocus in non-parallax pixels.

FIG. 3-C is a drawing for describing the basics of defocus in non-parallax pixels.

FIG. 3-D is a drawing for describing the basics of defocus in non-parallax pixels.

FIG. 4-B is a drawing for describing the basics of defocus in parallax pixels.

FIG. 4-C is a drawing for describing the basics of defocus in parallax pixels.

FIG. 4-D is a drawing for describing the basics of defocus in parallax pixels.

FIG. 5-B is a graph showing the changes in the optical intensity distributions described in FIGS. 4-A to 4-C.

FIG. 6-B shows an optical intensity distribution in a case where the object point is shifted from the focal position in a direction away from the light receiving surface of the image sensor.

FIG. 6-C shows an optical intensity distribution in a case where the object point is shifted from the focal position in a direction toward the light receiving surface of the image sensor.

FIG. 7-B is a drawing for describing the asymmetry of the blur.

FIG. 7-C is a drawing for describing the asymmetry of the blur.

FIG. 8-B shows the MTF distributions of the vertical line striped pattern chart and the horizontal line striped pattern chart relating to the subject distance of the subject having a prescribed frequency for the parallax images.

FIG. 10-B shows a point spread of an object point in an unfocused region.

FIG. 14-B shows a left parallax image and a right parallax image before the shading correction.

FIG. 14-C shows a left parallax image and a right parallax image after the shading correction.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

First Embodiment

A digital camera according to an embodiment of the present invention, which is an embodiment of an imaging apparatus, is configured in a manner to be able to generate an image of a single scene having a plurality of viewpoints, through a single occurrence of imaging. Each image having a different viewpoint from another image is referred to as a parallax image. The present embodiment describes a particular example of generating a right parallax image and a left parallax image according to two viewpoints that correspond to a right eye and a left eye. Although explained in greater detail further below, the digital camera of the present invention can generate both a parallax image and a non-parallax image that has no parallax from a central viewpoint, which is a viewpoint in a reference direction.

Figure 1:
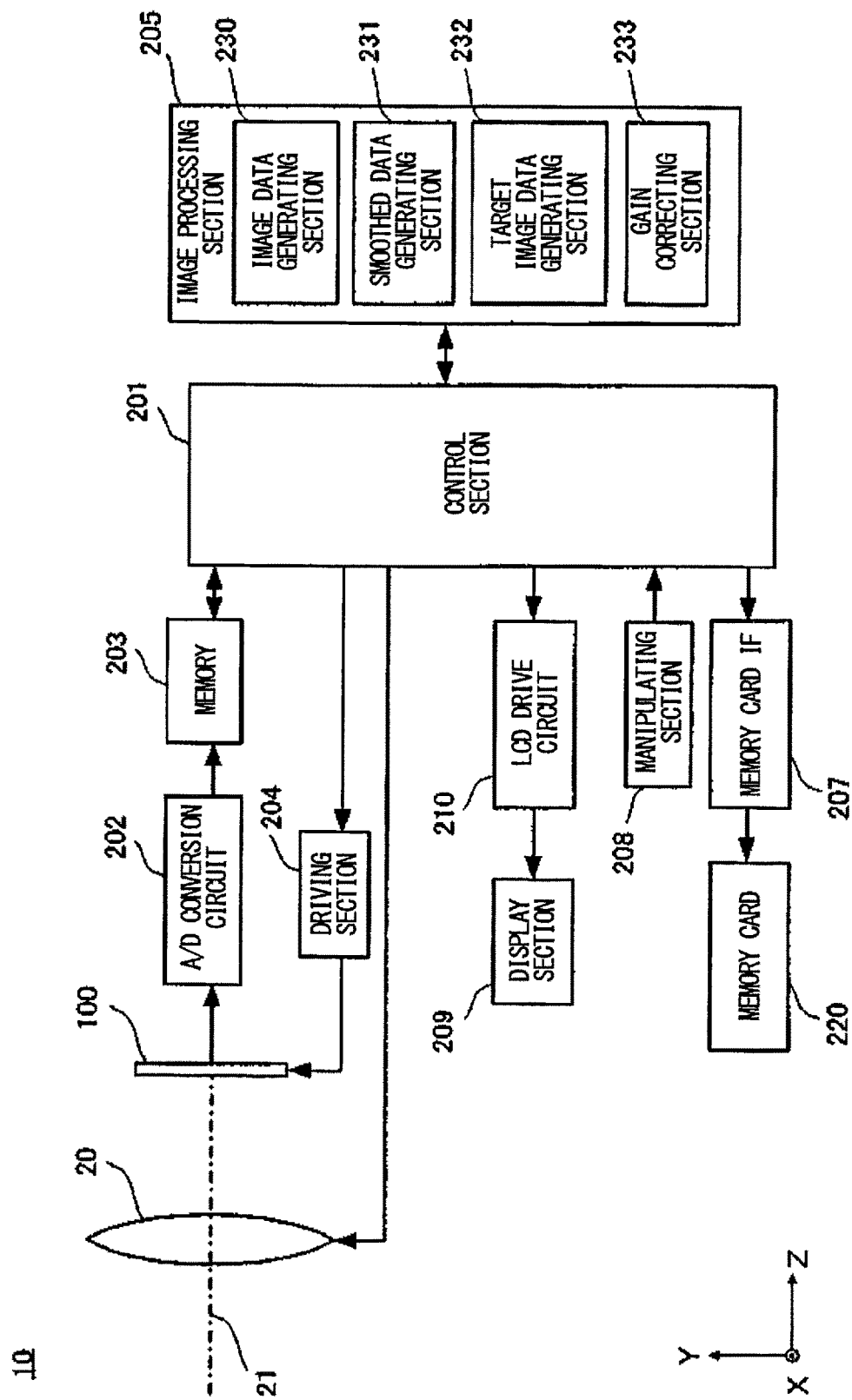
FIG. 1 shows a structure of the digital camera according to the present embodiment.

FIG. 1 shows a structure of the digital camera 10 according to the present embodiment. The digital camera 10 includes an imaging lens 20 serving as an imaging optical system, and guides subject light that is incident thereto along an optical axis 21 to the image sensor 100. The imaging lens 20 may be an exchangeable lens that can be attached to and detached from the digital camera 10. The digital camera 10 includes an image sensor 100, a control section 201, an A/D conversion circuit 202, a memory 203, a driving section 204, an image processing section 205, a memory card IF 207, a manipulating section 208, a display section 209, and an LCD drive circuit 210.

As shown in the drawing, a direction parallel to the optical axis 21 and pointing toward the image sensor 100 is defined as the +Z axis direction, a direction pointing into the plane of the drawing in a plane orthogonal to the Z axis is defined as the +X axis direction, and a direction pointing toward the top of the drawing is defined as the +Y axis direction. The orientation of this structural drawing during imaging is such that the X axis is the horizontal direction and the Y axis is the vertical direction. In several of the following drawings, the coordinate axes of FIG. 1 are used as the reference to display the orientation of each drawing.

The imaging lens 20 is formed from a plurality of optical lenses, and focuses subject light from a scene at a position near a focal plane. For ease of description, FIG. 1 shows a single virtual lens arranged near the pupil to represent the imaging lens 20.

The image sensor 100 is arranged near the focal plane of the imaging lens 20. The image sensor 100 is an image sensor such as a CCD or CMOS sensor, in which a plurality of photoelectric converting elements are arranged two-dimensionally. The image sensor 100 experiences timing control from the driving section 204, to convert a subject image formed on a light receiving surface into an image signal and to output this image signal to the A/D conversion circuit 202. The image signal output to the A/D conversion circuit 202 includes image signals of a left viewpoint and a right viewpoint.

The A/D conversion circuit 202 converts the image signal output by the image sensor 100 into a digital image signal, and outputs this digital image signal to the memory 203. The image processing section 205 performs various types of image processing, using the memory 203 as a work space, to generate image data. In particular the image processing section 205 includes an image data generating section 230, a smoothed data generating section 231, a target image data generating section 232, and a gain correcting section 233.

The image data generating section 230 uses the left viewpoint and right viewpoint digital image signals to generate left parallax image data corresponding to the left viewpoint and right parallax image data corresponding to the right viewpoint. The generation of the left parallax image data and right parallax image data is described in detail further below.

The smoothed data generating section 231 performs filtering on the left parallax image data and the right parallax image data, such that the images represented by the left parallax image data and the right parallax image data are smoothed in the left and right direction, i.e. the parallax direction. As a result, left smoothed data in which the left parallax image data has been smoothed and right smoothed data in which the right parallax image data has been smoothed are generated. The generation of the left smoothed data and the right smoothed data is described in detail further below.

The target image data generating section 232 generates target image data using the geometric mean of the pixel values corresponding respectively to the left smoothed data and the right smoothed data. The generation of the target image data is described in detail further below.

The gain correcting section 233 corrects the left parallax image data using the ratio of the target image data to the left smoothed data. The gain correcting section 233 corrects the right parallax image data using the ratio of the target image data to the right smoothed data.

The image processing section 205 also performs other general functions for image processing, such as adjusting the image data according to the selected image format. The generated image data is converted into a display signal by the LCD drive circuit 210, and is displayed in the display section 209. Furthermore, the generated image data is recorded in the memory card 220 loaded in the memory card IF 207.

One series of the image capturing sequence begins when the manipulating section 208 is manipulated by the user and outputs a manipulation signal to the control section 201. The various operations such as AF, AE, and the like that accompany the imaging sequence are performed under the control of the control section 201.

Figure 2:
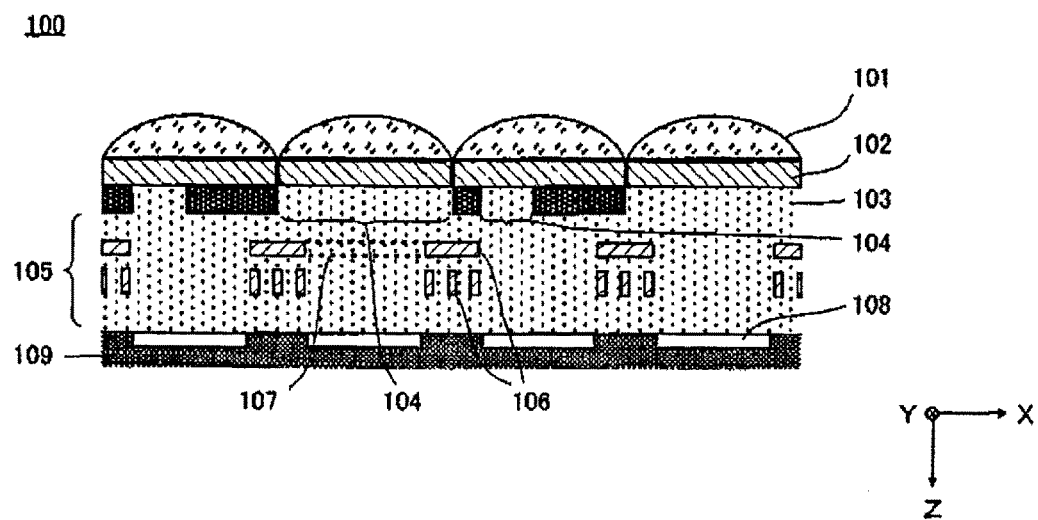
FIG. 2 is a schematic view of a cross section of the image sensor.
Figure 3A:
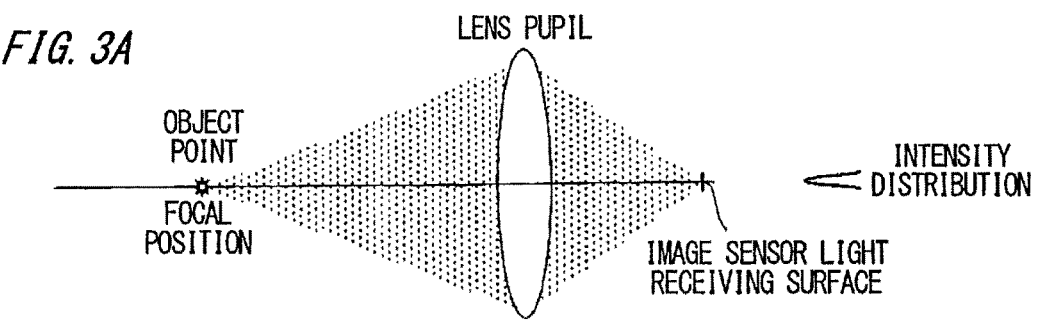
FIG. 3-A is a drawing for describing the basics of defocus in non-parallax pixels.
Figure 3B:
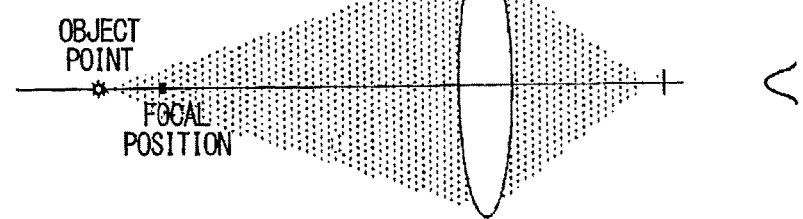
Figure 3C:
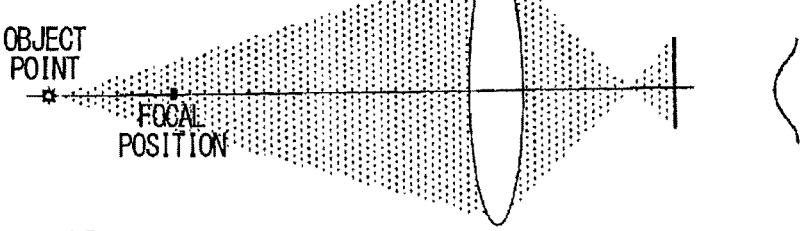
Figure 3D:
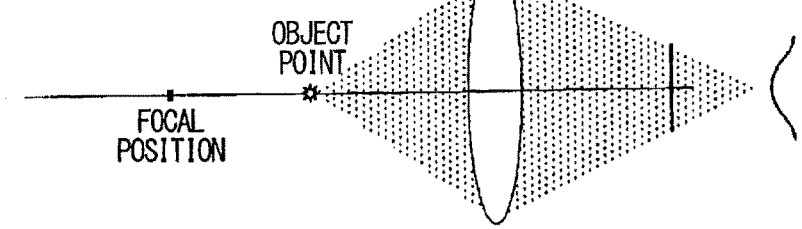
Figure 4A:
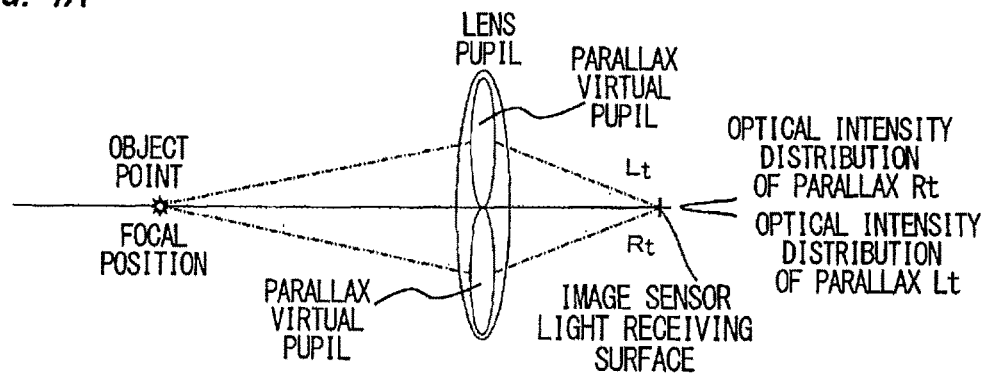
FIG. 4-A is a drawing for describing the basics of defocus in parallax pixels.
Figure 4B:
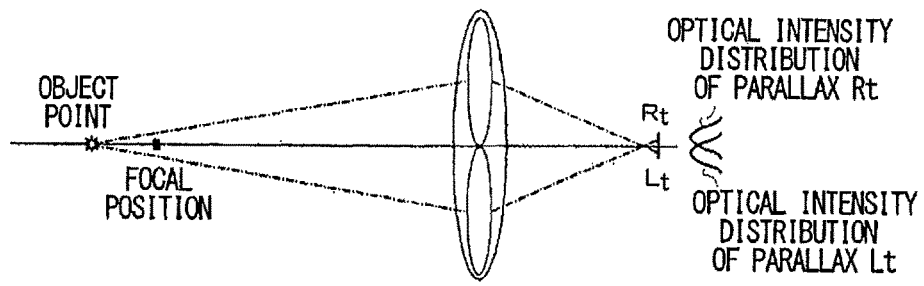
Figure 4C:
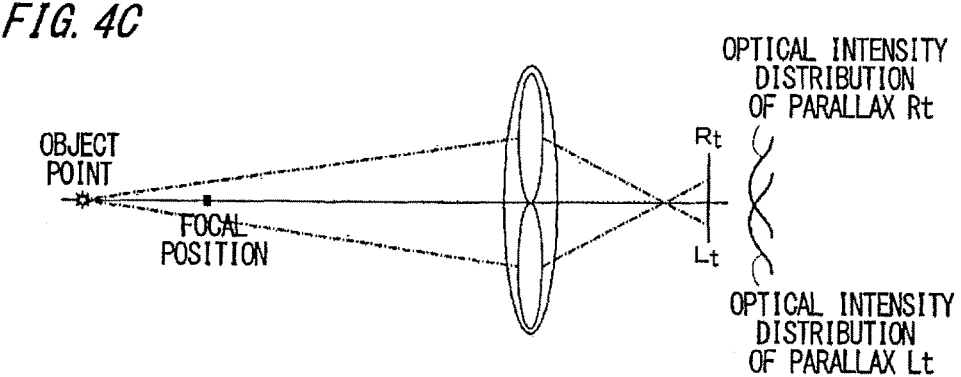
Figure 4D:
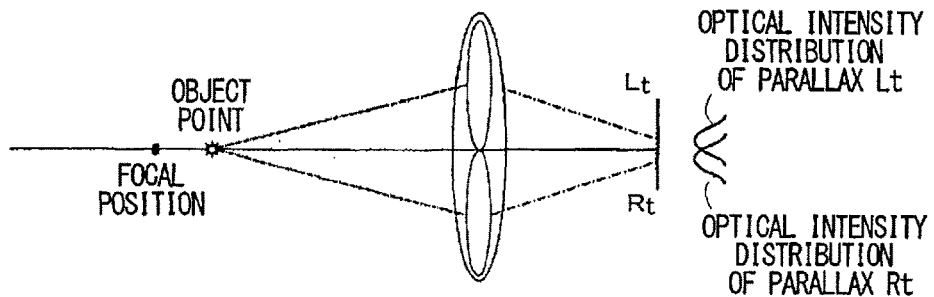

The following describes an exemplary configuration of the image sensor 100. FIG. 2 is a schematic view of a cross section of the image sensor 100.

The image sensor 100 includes microlenses 101, color filters 102, an aperture mask 103, a wiring layer 105, and photoelectric converting elements 108, arranged in the stated order from the subject side. Each photoelectric converting element 108 is formed by a photodiode that converts incident light into an electrical signal. A plurality of the photoelectric converting elements 108 are arranged two-dimensionally on the surface of the substrate 109.

The image signals converted by the photoelectric converting elements 108, the control signals for controlling the photoelectric converting elements 108, and the like are transmitted and received through wiring 106 provided in the wiring layer 105. Furthermore, the aperture mask 103 includes aperture sections 104 arranged two-dimensionally in a repeating manner to correspond one-to-one with the photoelectric converting elements 108, and is provided in contact with the wiring layer 105. As described further below, the aperture sections 104 are shifted for each photoelectric converting element 108, such that each aperture section 104 has a specifically determined position relative to the corresponding photoelectric converting element 108. Although described in detail further below, due to the aperture mask 103 including these aperture sections 104, a parallax occurs in the subject light received by the photoelectric converting elements 108.

On the other hand, the aperture mask 103 is not present on photoelectric converting elements 108 that are not to cause a parallax. In other words, the aperture mask 103 is provided to include aperture sections 104 that pass all incident light, i.e. aperture sections 104 that do not limit the subject light incident to the corresponding photoelectric converting elements 108. Although no parallax is caused in this case, the apertures 107 formed by the wiring 106 substantially regulate the incident subject light, and therefore the wiring 106 can serve as an aperture mask that passes all of the incident light and does not cause a parallax. The aperture mask 103 may be arranged independently in correspondence to each photoelectric converting element 108, or may be formed all at once for a plurality of the photoelectric converting elements 108 in the same manner as the manufacturing process of the color filters 102.

The color filters 102 are provided on the aperture mask 103. The color filters 102 are filters that are provided to correspond one-to-one with the photoelectric converting elements 108, and each color filter 102 is colored in a manner to pass a prescribed wavelength band to the corresponding photoelectric converting element 108. In order to output a color image, only at least two different types of color filters must be arranged, but three or more types of color filters may be arranged to acquire a higher quality color image. For example, red filters (R filters) that pass the red wavelength band, green filters (G filters) that pass the green wavelength band, and blue filters (B filters) that pass the blue wavelength band may be arranged in a grid formation. The color filters are not limited to a combination of the primary colors R, G, and B, and may instead be a combination of the complementary colors Y, C, and M.

The microlenses 101 are provided on the color filters 102. The microlenses 101 are converging lenses for guiding a greater amount of the incident subject light to the photoelectric converting elements 108. The microlenses 101 are provided to correspond one-to-one with the photoelectric converting elements 108. The microlenses 101 preferably have optical axes that are shifted in a manner to guide a greater amount of subject light to the photoelectric converting elements 108, according to the relative positional relationship between the photoelectric converting elements 108 and the pupil center of the imaging lens 20. Furthermore, the arrangement position may be adjusted along with the positions of the aperture portions 104 of the aperture mask 103 such that a greater amount of certain subject light is incident thereto, as described further below.

In this way, one unit including a microlens 101, a color filter 102, and an aperture mask 103 provided to correspond one-to-one to each photoelectric converting element 108 is referred to as a pixel. In particular, the pixels provided with an aperture mask 103 that causes a parallax are referred to as parallax pixels, and pixels that are not provided with an aperture mask 103 causing a parallax are referred to as non-parallax pixels. There are also cases where parallax pixels of the left viewpoint are referred to as parallax Lt pixels, parallax pixels of the right viewpoint are referred to as parallax Rt pixels, and non-parallax pixels are referred to as N pixels. Furthermore, there are cases where the parallax image of the left viewpoint is referred to as the parallax Lt image, the parallax image of the right viewpoint is referred to as the parallax Rt image, and the non-parallax image is referred to as the N image. As an example, in a case where the effective pixel region of the image sensor 100 is approximately 24 mm×16 mm, the number of pixels is approximately 12 million.

If the image sensor has good light focusing efficiency and photoelectric conversion efficiency, the microlenses 101 need not be provided. Furthermore, in the case of a back surface emission image sensor, the wiring layer 105 is provided on the opposite side from the photoelectric converting elements 108. If there are color components in the aperture sections 104 of the aperture mask 103, the color filters 102 and the aperture mask 103 can be formed integrally. The color filters 102 are not provided if it is acceptable for black and white image signals to be output.

In the present embodiment, the aperture mask 103 and the wiring 106 are formed independently, but the function of the aperture mask 103 in the parallax pixels may be fulfilled by the wiring 106. In other words, a prescribed aperture pattern is formed by the wiring 106, and the incident light is limited by this aperture pattern such that only a prescribed portion of the light is guided to the photoelectric converting element 108. In this case, the wiring 106 forming the aperture pattern is preferably farthest on the photoelectric converting element 108 side within the wiring layer 105.

The aperture mask 103 may be formed by a transmission stopping film provided overlapping the photoelectric converting elements 108. In this case, the aperture mask 103 is formed by sequentially layering SiN film and $SiO_2$ film to form the transmission stopping film and then performing etching to remove the regions corresponding to the aperture sections 104.

(Parallax Pixels and Blur Characteristic)

The following is a basic description of defocus occurring when the parallax Lt pixels and parallax Rt pixels receive light. First, drawings are used to provide a simple description of defocus in non-parallax pixels. FIGS. 3-A to 3-C are drawings for describing the basics of defocus in non-parallax pixels. As shown in FIG. 3-A, when the object point, which is the subject, is at a focal position, the subject light that passes through the lens pupil to reach the light receiving surface of the image sensor exhibits a steep optical intensity distribution centered on the pixels of the corresponding image point. In other words, if non-parallax pixels that receive all of the effective light passed through the lens pupil are arranged near the image point, the output value of the pixel corresponding to the image point is large and the output values of the pixels arranged in the periphery decrease sharply.

On the other hand, as shown in FIG. 3-B, when the object point is shifted from the focal position in a direction away from the light receiving surface of the image sensor, the subject light exhibits an optical intensity distribution at the light receiving surface of the image sensor that is less steep than in the case where the object point is at the focal position. In other words, the distribution has a decreased output value for the pixel corresponding to the image point and has output values that reach to pixels further in the periphery.

As shown in FIG. 3-C, when the object point is shifted farther from the focal position, the subject light exhibits an optical intensity distribution at the light receiving surface of the image sensor that is even less steep. In other words, the distribution has a further decreased output value for the pixel corresponding to the image point and has output values that reach to pixels even further in the periphery.

As shown in FIG. 3-D, when the object point is shifted from the focal position in a direction toward the light receiving surface of the image sensor, the subject light exhibits an optical intensity distribution that is similar to the case in which the object point is shifted in a direction away from the light receiving surface of the image sensor.

FIGS. 4-A to 4-D are drawings for describing the basics of defocus for the parallax pixels. The parallax Lt pixels and parallax Rt pixels each receive subject light that reaches the pixels from one of the two parallax virtual pupils whose optical axes targets are set as partial regions of the lens pupil. In the present Specification, the system capturing a parallax image by receiving the subject light from different virtual pupils in a single lens pupil is referred to as a single-lens pupil-divided imaging system.

As shown in FIG. 4-A, when the object point that is the subject is at the focal position, whichever of the parallax virtual pupils the subject light passes through, the subject light exhibits a steep optical intensity distribution centered on the pixel of the corresponding image point. If the parallax Lt pixels are arranged near the image point, the output value of the pixel corresponding to the image point is the largest and the output values of the pixels arranged in the periphery decrease sharply. In the same manner, if the parallax Rt pixels are arranged near the image point, the output value of the pixel corresponding to the image point is the largest and the output values of the pixels arranged in the periphery decrease sharply. In other words, regardless of which of the parallax virtual pupils the subject light passes through, in the resulting distributions the output value of the pixel corresponding to the image point is the largest and the output values of the pixels arranged in the periphery decrease sharply, and these distributions match each other.

On the other hand, as shown in FIG. 4-B, when the object point is shifted from the focal position in a direction away from the light receiving surface of the image sensor, in contrast to the case in which the object point is at the focal position, the peak of the optical intensity distribution exhibited by the parallax Lt pixels occurs at a position at a distance in a certain direction from the pixel corresponding to the image point, and the output value of this peak is lower. Furthermore, the width of pixels having output values is larger. In other words, the point image widens in the horizontal direction of the light receiving surface of the image sensor, and therefore the blur amount increases. The peak of the optical intensity distribution exhibited by the parallax Rt pixels occurs at a position at a distance from the pixel corresponding to the image point equal to the distance of the peak of the distribution exhibited by the parallax Lt pixels, but in a direction opposite the certain direction of the shift of the peak exhibited by the parallax Lt pixels, and the output value decreases in the same manner. Furthermore, the width of pixels having output values is larger, in the same manner. In other words, compared to the case where the object point is at the focal position, identical optical intensity distributions that are less steep occur at a certain distance from each other. The amount of shift between the peaks of the optical intensity distributions exhibited by the parallax Lt pixels and the parallax Rt pixels corresponds to the parallax amount.

As shown in FIG. 4-C, when the object point is shifted farther form the focal position, compared to the state shown in FIG. 4-B, identical optical intensity distributions that are even less steep occur at a greater distance from each other. Since the widening of the point image becomes larger, the blur amount increases. Furthermore, the distance between the peaks of the optical intensity distributions exhibited by the parallax Lt pixels and the parallax Rt pixels becomes greater, and therefore the parallax amount increases. In other words, when the object point is farther from the focal position, the blur amount and the parallax amount increase.

As shown in FIG. 4-D, when the object point is shifted form the focal position in a direction toward the light receiving surface of the image sensor, the peak of the optical intensity distribution exhibited by the parallax Rt pixels occurs at a position at a distance in the certain direction described above from the pixel corresponding to the image point, in a manner opposite that of the state shown in FIG. 4-C. Furthermore, the peak of the optical intensity distribution exhibited by the parallax Lt pixels occurs at a position at a distance in a direction opposite the certain direction in which the peak of the parallax Rt pixels is distanced. In other words, the direction in which the peaks of the optical intensity distributions of the parallax Lt pixels and the parallax Rt pixels are distanced from the pixel corresponding to the image point is determined according to the direction in which the object point is shifted.

Figure 5A:
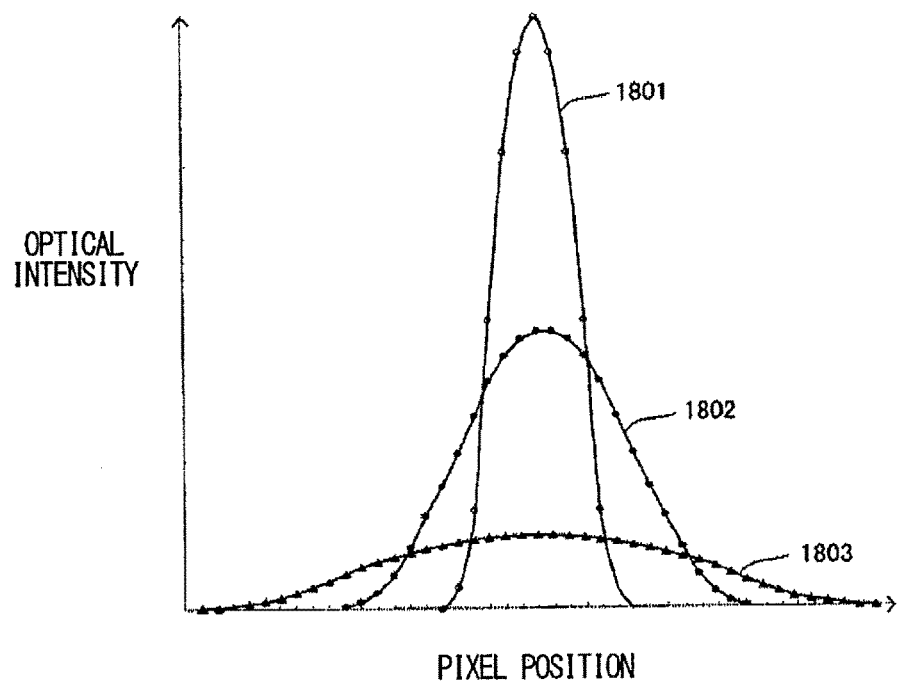
FIG. 5-A is a graph showing the changes in the optical intensity distributions described in FIGS. 3-A to 3-C.
Figure 5B:
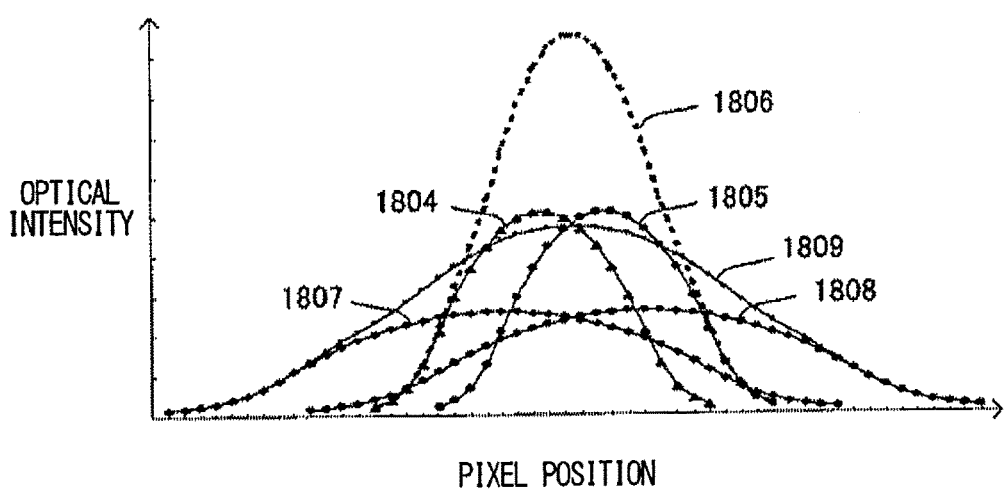

The results obtained by graphing the changes of the optical intensity distributions described in FIGS. 3-A to 3-C and the changes in the optical intensity distributions described in FIGS. 4-A to 4-C are shown in FIGS. 5-A and 5-B. FIGS. 5-A and 5-B show the optical intensity distributions of the non-parallax pixels and the parallax pixels. In the drawings, the horizontal axis indicates the pixel position, with the center position being the position of the pixel corresponding to the image point. The vertical axis indicates the output values of the pixels and, since these output values are substantially proportional to the optical intensity, also indicates the optical intensity.

As described above, when the object point is shifted from the focal position in a direction toward the light receiving surface of the image sensor, the optical intensity distribution is the same as the optical intensity distribution in the case where the object point is shifted in a direction away from the light receiving surface of the image sensor, and therefore the change of the optical intensity distribution in a case where the object point is shifted in a direction toward the light receiving surface of the image sensor is omitted from the drawings. The peaks of the optical intensity distributions exhibited by the parallax Lt pixels and the parallax Rt pixels when the object point is shifted from the focal position in a direction toward the light receiving surface of the image sensor are the same as the peaks of the optical intensity distributions exhibited by the parallax Lt pixels and the parallax Rt pixels when the object point is shifted from the focal position in a direction away from the light receiving surface of the image sensor, and therefore description of these peaks is omitted.

FIG. 5-A is a graph showing the changes in the optical intensity distributions described in FIGS. 3-A to 3-C. The distribution curve 1801 represents the optical intensity distribution corresponding to FIG. 3-A, which is the steepest distribution. The distribution curve 1802 represents the optical intensity distribution corresponding to FIG. 3-B, and the distribution curve 1803 represents the optical intensity distribution corresponding to FIG. 3-C. Compared to the distribution curve 1801, these distributions become gradually wider and have peak values that gradually decrease.

FIG. 5-B is a graph showing the change of the optical intensity distributions described in FIGS. 4-A to 4-C. The distribution curve 1804 and the distribution curve 1805 respectively represent the optical intensity distribution of the parallax Lt pixels and the optical intensity distribution of the parallax Rt pixels in FIG. 4-B. As understood from the drawings, these distributions are symmetrical over the center position. The combined distribution curve 1806, which is a combination of these distribution curves, exhibits approximately the same shape as the distribution curve 1802 of FIG. 3-B, which is a defocus state equivalent to that of FIG. 4-B.

The distribution curve 1807 and the distribution curve 1808 respectively represent the optical intensity distribution of the parallax Lt pixels and the optical intensity distribution of the parallax Rt pixels in FIG. 4-C. As understood from the drawings, these distributions are symmetrical over the center position. The combined distribution curve 1809, which is a combination of these distribution curves, exhibits approximately the same shape as the distribution curve 1803 of FIG. 3-C, which is a defocus state equivalent to that of FIG. 4-C. The optical intensity distribution of the parallax Lt pixels and the optical intensity distribution of the parallax Rt pixels in FIG. 4-D are the same as the optical intensity distribution of the parallax Lt pixels and the optical intensity distribution of the parallax Rt pixels in FIG. 4-D, except that the positions of these distributions are switched, and therefore these optical intensity distributions in FIG. 4-D correspond respectively to the distribution curve 1808 and the distribution curve 1807.

Figure 6A:
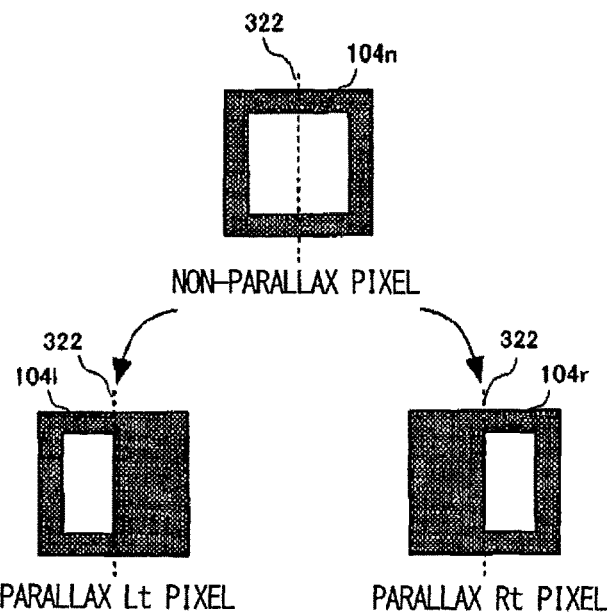
FIG. 6-A is a drawing for describing the aperture shape of the aperture sections 104 in a case where there are two types of parallax pixels.
Figure 6B:
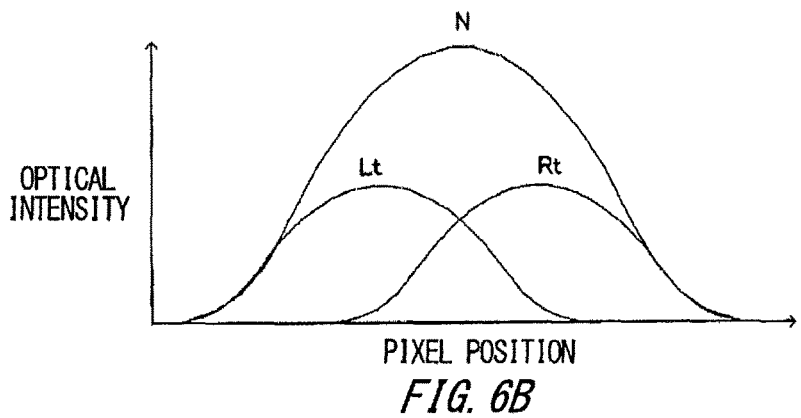
Figure 6C:
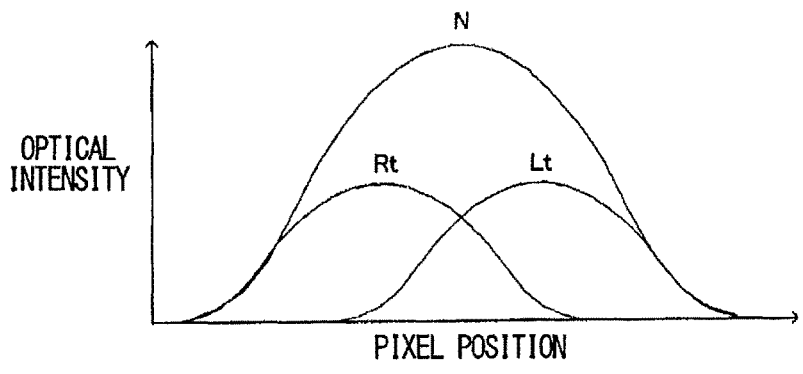

FIGS. 6-A to 6-C are drawings for describing the aperture shapes of the aperture sections 104 in a case where there are two types of parallax pixels. FIG. 6-A shows an example in which the shapes of the aperture sections 104*l* of the parallax Lt pixels and the shapes of the aperture sections 104*r* of the parallax Rt pixels are identical shapes obtained by dividing the shapes of the aperture sections 104*n* of the non-parallax pixels at the center line 322. In other words, in FIG. 6-A, the area of the aperture sections 104*n* of the non-parallax pixels is equal to the sum of the area of the aperture sections 104*l* of the parallax Lt pixels and the area of the aperture sections 104*r* of the parallax Rt pixels. In the present embodiment, an aperture section 104*n* of a non-parallax pixel refers to the entire aperture of an aperture section, and an aperture section 104*l* and an aperture section 104*r* each refer to half of the aperture of an aperture section. When an aperture section is positioned at the center of a photoelectric converting element, this aperture section is referred to as being oriented in the reference direction. The aperture section 104*l* of a parallax Lt pixel and the aperture section 104*r* of a parallax Rt pixel are respectively shifted in opposite directions from the virtual center line 322 passing through the center of the corresponding photoelectric converting element 108, i.e. the center of the pixel. Accordingly, the aperture section 104*l* of the parallax Lt pixel and the aperture section 104*r* of the parallax Rt pixel create a parallax in one direction relative to the center line 322 and another direction that is opposite the one direction.

FIG. 6-B shows an optical intensity distribution in a case where the object point is shifted from the focal position in a direction away from the light receiving surface of the image sensor having pixels with the aperture sections shown in FIG. 6-A. In the drawing, the horizontal axis indicates the pixel position, and the center position is the position of the pixel corresponding to the image point. Furthermore, the curve Lt corresponds to the distribution curve 1804 of FIG. 5-B and the curve Rt corresponds to the distribution curve 1805 of FIG. 5-B. The curve N corresponds to non-parallax pixels, and exhibits a shape that approximates the combined distribution curve 1806 of FIG. 5-B. The aperture sections 104*n*, the aperture sections 104*l*, and the aperture sections 104*r* each realize functioning as aperture diaphragms. Accordingly, the blur width of the non-parallax pixels including the aperture sections 104*n* that have multiple times the area of the aperture sections 104*l* (or aperture sections 104*r*) is approximately equal to the blur width of the curve obtained by combining the parallax Lt pixels and the parallax Rt pixels, which is represented by the combined distribution curve 1806 of FIG. 5-B.

FIG. 6-C shows an optical intensity distribution in a case where the object point is shifted from the focal position in a direction toward the light receiving surface of the image sensor having pixels with the aperture sections shown in FIG. 6-A. In the drawing, the horizontal axis indicates the pixel position, and the center position is the position of the pixel corresponding to the image point. The curve Lt and the curve Rt of FIG. 6-C maintain the relationship that the blur width of the non-parallax pixels including the aperture sections 104*n* is approximately the same as the blur width of the curve resulting from the combination of the parallax Lt pixels and the parallax Rt pixels, and have a positional relationship that is the inverse of that of the curve Lt and the curve Rt of FIG. 6-B.

(Depth of Field and Asymmetrical Blur)

The following describes the relationship between the depth of field and the asymmetry of the blur. As made clear from FIGS. 6-B and 6-C, in an unfocused region, the blur width of the parallax pixels is less than the blur width of the non-parallax pixels. This means that the incident light of the lens is substantially constricted on the right half and the left half by the aperture mask of the parallax pixels shown in FIG. 6-A. In other words, there are two virtual pupils respectively on the left and right in the single lens pupil. Specifically, the aperture area in the aperture mask of the parallax pixels fulfills a role equivalent to the effect of a lens diaphragm.

Generally, an image with deeper depth of field is captured when the lens is constricted. The apertures of the aperture mask for the parallax pixels are shorter in the horizontal direction and longer in the vertical direction. Accordingly, for a subject having a frequency component in the horizontal direction, such as vertical lines, an image with a deep depth of field is captured, while for a subject having a frequency component in the vertical direction, such as horizontal lines, an image with a shallow depth of field is captured.

Figure 7A:
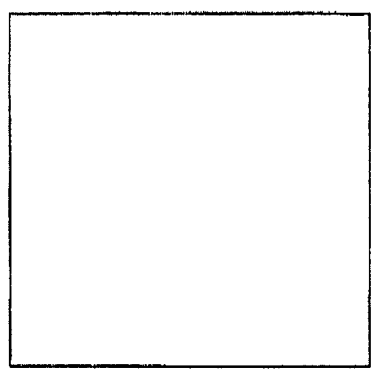
FIG. 7-A is a drawing for describing the asymmetry of the blur.
Figure 7C:
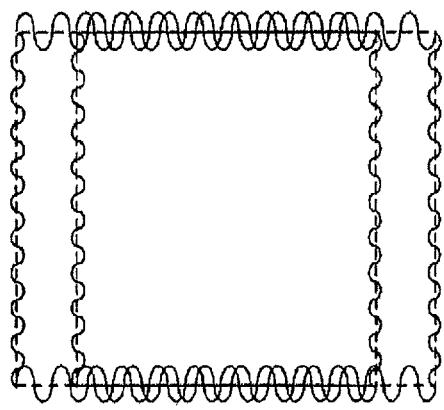
Figure 7B:
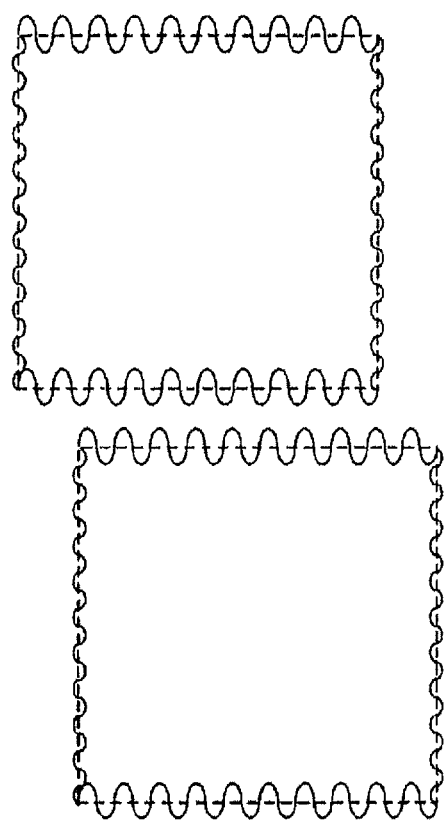

FIGS. 7-A to 7-C are drawings for describing asymmetry of the blur. For example, when capturing an image of a subject that is a square patch such as shown in FIG. 7-A, a subject image such as shown in FIG. 7-A is obtained in a focused region. FIG. 7B shows the subject images taken by the left parallax pixels and the right parallax pixels together. In an unfocused region, a subject image is captured in which there is little blur in the horizontal direction and the vertical lines appear sharper than the horizontal lines, as shown in FIG. 7-B. In other words, the aperture sections of the aperture mask for the parallax pixels are asymmetrical with respect to the horizontal direction and the vertical direction, and therefore the blur is asymmetrical with respect to the horizontal direction and the vertical direction of the subject image. This can be referred to as the anisotropic nature of the blur.

When the left eye subject image and right eye subject image of FIG. 7-B are shown in an overlapping manner to obtain a 2D image from a 3D image, undesirable blur occurs, such as shown by the double-line blur caused by the sharp blur in the horizontal direction in the 2D image (FIG. 7-C). Accordingly, a correction that reduces the asymmetry of the blur of the left and right parallax images for 3D image viewing to obtain a natural blur or a correction for obtaining a natural blur in which double-line blur does not appear in the 2D image display is preferably able to be realized through image processing.

Figure 8A:
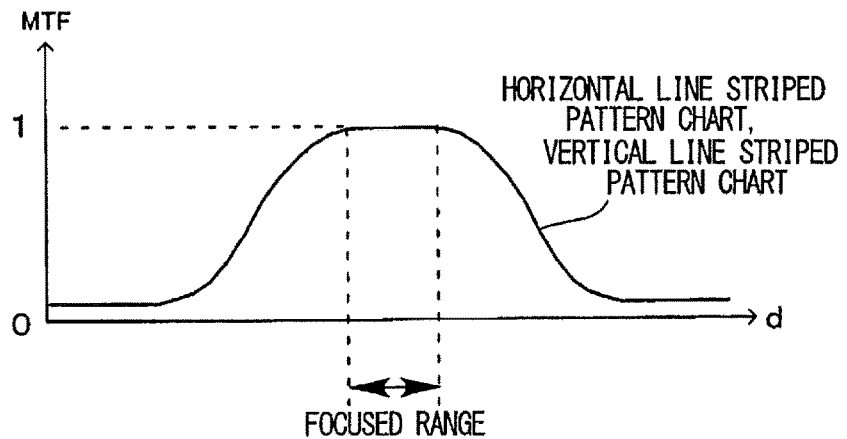
FIG. 8-A shows the MTF distributions of the vertical line striped pattern chart and the horizontal line striped pattern chart relating to the subject distance of the subject having a prescribed frequency for the non-parallax image.
Figure 8B:
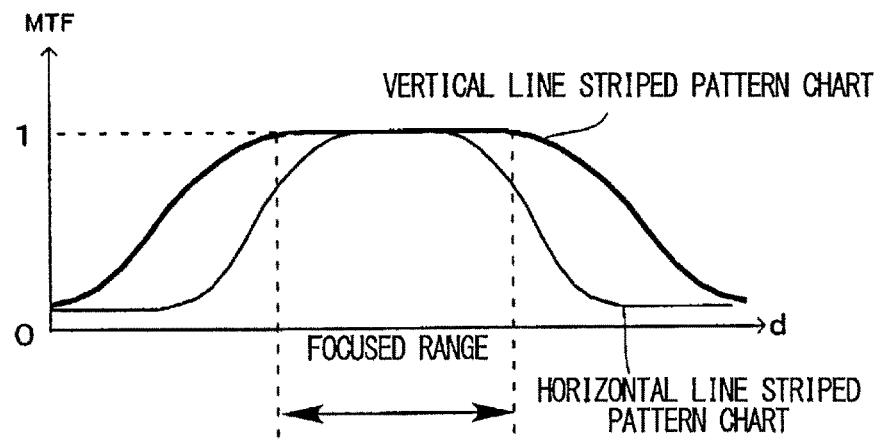

FIGS. 8-A and 8-B show the relationship between the parallax image and non-parallax image and the depth of field. Specifically, FIGS. 8-A and 8-B show the subject distance dependency of the MTF (Modulation Transfer Function) characteristic of a vertical line striped pattern chart occurring when capturing a striped pattern chart of a subject in a case where the pixel pitch of the image sensor 100 is a (mm) and the frequency is f (lines/mm) and of a horizontal line striped pattern chart obtained by rotating the vertical line striped pattern chart by 90°. The vertical axis indicates the MTF and the horizontal axis indicates the distance d from the digital camera 10. The MTF distribution indicates how attenuation occurs when the striped pattern chart is moved forward and backward from the focal position, in a case where the MTF is 1 near the optical axis at the focal position. FIG. 8-A shows the MTF distributions of the vertical line striped pattern chart and the horizontal line striped pattern chart relating to the subject distance of the subject image having a prescribed frequency for the non-parallax image (N image). As shown in FIG. 8-A, in the non-parallax image, the MTF distribution of the vertical line striped pattern chart matches the MTF distribution of the horizontal line striped pattern chart. FIG. 8-B shows the MTF distributions of the vertical line striped pattern chart and the horizontal line striped pattern chart relating to the subject distance of the subject image having a prescribed frequency for the parallax images (the parallax Lt image and the parallax Rt image). The MTF distribution of the horizontal line striped pattern chart shown in FIG. 8-B matches the MTF distribution of the horizontal line striped pattern chart shown in FIG. 8-A. On the other hand, the MTF distribution of the vertical line striped pattern chart shown in FIG. 8-B can be seen to have a deeper depth of field and a wider distribution for the region with high contrast, compared to the MTF distribution of the vertical line striped pattern chart shown in FIG. 8-A. In other words, when the striped pattern chart is moved backward or forward from the focal position, the contrast differs between the horizontal line striped pattern chart and the vertical line striped pattern chart in the parallax images. This is an expression of the asymmetry of the blur shown in FIGS. 7-A to 7-C above.

International Publication WO 2012/039346 exposes a problem that different shading occurs between the left and right parallax images, as a unique phenomenon occurring in a single-lens pupil-divided imaging system. However, with the single-lens pupil-divided imaging system, in addition to the shading problem, another problem that must be considered when making a comparison to normal 2D image capturing is that the blur characteristics are asymmetrical between the left and right. Although described in further detail below, one example is that, when defocusing and capturing an image of a square patch such as a Macbeth chart, not only is the blur asymmetrical in the horizontal direction and vertical direction of the subject image as described above, but the blur is also asymmetrical at the left and right ends of the parallax images. Specifically, while one boundary exhibits blur in the left parallax image, the blur occurring at the other boundary appears sharp. This phenomenon is reversed in the right parallax image. This left-right asymmetry of the blur is known as double-line blur, and causes the stereoscopic image to appear unnatural.

As a result of a detailed analysis of a single-lens stereoscopic imaging system, it became clear that there is an extremely strong relationship between the shading problem, the left-right asymmetry of the blur, and the parallax amount. Accordingly, when correcting portions relating to these three characteristics in the left parallax image and right parallax image, there is also a large impact on other characteristics. As a result, it is unclear whether it is actually possible to generate a natural stereoscopic image. For example, in WO 2012/039346, there is no detailed disclosure concerning the relationship between shading correction and parallax amount, and therefore it is unclear whether it is actually possible to generate the stereoscopic image. There is also no description concerning the blur characteristic. In light of this, in the present embodiment, the relationship between the three characteristics described above is clarified and a technique is described for generating a stereoscopic image that appears natural.

(Left-Right Blur Asymmetry and Correction Thereof)

The parallax pixels receive incident light projected to the virtual pupils, and therefore the shape of the virtual pupils appears as a blur characteristic. The parallax pixels basically fulfill the role of passing light that is one half of the light passed by the lens. Since the pupil of the lens is round, the virtual pupils are semicircles. Accordingly, the shape of the blur is asymmetrical between the left and right parallax images.

Figure 9:
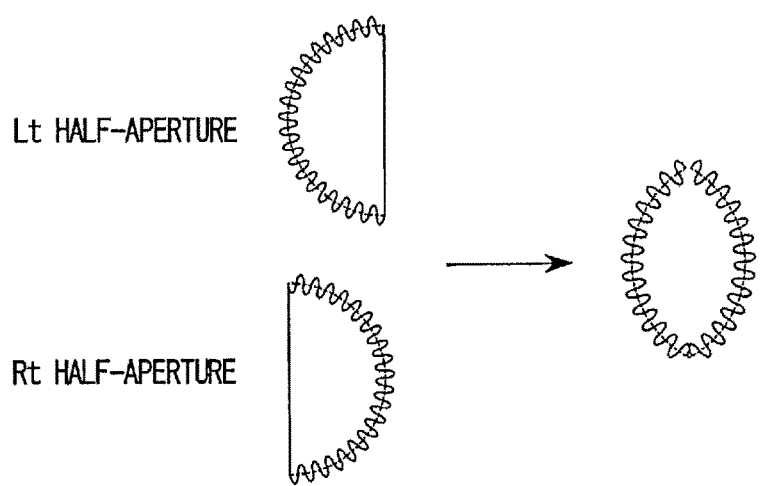
FIG. 9 is a drawing for describing the asymmetry of the blur.

FIG. 9 is a drawing for describing the asymmetry of the blur. As shown in FIG. 9, for the left parallax pixels, the blur on the arc side of the semicircle is suitably expressed, but the blur on the cut side of the semicircle is not suitably expressed. In other words, the edge is prone to being sharp, and there is little blur. In a similar manner, for the right parallax pixels, the blur on the arc side of the semicircle is suitable expressed, but the blur on the cut side of the semicircle is prone to having a sharp edge and there is little blur. It should be noted that the arcs are at opposite positions for the left parallax pixels and the right parallax pixels. As a result of the above, the double-line blur described above becomes more pronounced. In order to correct this left-right asymmetry of the blur, as shown in FIG. 9, it is preferable to mix the blur caused by the left parallax pixels and the blur caused by the right parallax pixels, which have inverse characteristics, to make the blur as symmetrical as possible between the left and right.

The strategy for achieving this includes generating an average image by mixing the blur of the left parallax images and the blur of the right parallax images, and performing a left-right asymmetrical blur correction on the blur with this generated average image as a target image. As explained in the "non-parallax reference image generation" of the third embodiment example described further below, when generating an average image that is simply the average of the left parallax image and the right parallax image, a phenomenon occurs by which the parallax shading cancels out and the parallax is completely eliminated. Accordingly, when performing a correction using such an image in which the parallax has been eliminated as a target, it is only possible to generate an image in which the parallax has been eliminated. This results in a correction that conflicts with the generation of a stereoscopic image, and therefore must be avoided. In order to extract only the information concerning the right-left asymmetry of the blur, the parallax component must not be included among the items being corrected. In order to remove the parallax component from among the corrected items, it is necessary to apply a one-dimensional smoothing filter in the horizontal direction with approximately the same parallax amount or a two-dimensional smoothing filter obtained by expanding the one-dimensional smoothing filter vertically and horizontally to the left parallax image and the right parallax image. The process that adds this smoothing computation is expressed using the symbols $\langle \ \rangle$.

$$Lt' = Lt \cdot \frac{\sqrt{\langle Lt \rangle \langle Rt \rangle}}{\langle Lt \rangle} = Lt \cdot \sqrt{\frac{\langle Rt \rangle}{\langle Lt \rangle}}$$

$$Rt' = Rt \cdot \frac{\sqrt{\langle Lt \rangle \langle Rt \rangle}}{\langle RT \rangle} = Rt \cdot \sqrt{\frac{\langle Lt \rangle}{\langle Rt \rangle}}$$

In this way, it is possible to correct the left-right asymmetry of the blur. This is because the difference between the characteristics of the blur component of the left parallax image and the characteristic of the blur component of the right parallax image remain even after a smoothing process as large as the parallax amount is applied. When the sampling width of the filter is too large relative to the parallax amount, the difference between the blur characteristics does not appear, and therefore it is necessary to limit the smoothing process to an amount approximately equal to the parallax amount. When the smoothing range in the above expression is continuously changed in a manner to be gradually reduced from an amount approximately equal to the parallax amount until finally reaching a sampling width of zero, i.e. no smoothing, the parallax amount changes continuously from the original parallax amount in the parallax images to a parallax of zero. Accordingly, it is possible to control the parallax amount according to the sampling width, i.e. the filter diameter of the smoothing filter.

In the expression above, the correction is performed in accordance with the blur of the geometric mean of the smoothed parallax images, but there is also an idea that involves using the arithmetic mean. The following considers what type of blur would result in this case. The correction expression is as shown below.

$$Lt' = Lt \cdot \frac{\frac{\langle Lt \rangle + \langle Rt \rangle}{2}}{\langle Lt \rangle}$$

$$Rt' = Rt \cdot \frac{\frac{\langle Lt \rangle + \langle Rt \rangle}{2}}{\langle Rt \rangle}$$

Figure 10A:
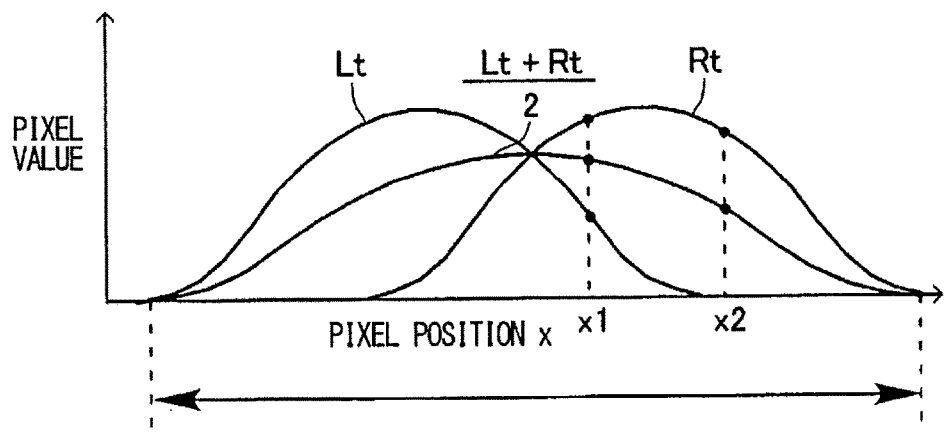
FIG. 10-A shows a point spread of an object point in an unfocused region.
Figure 10B:
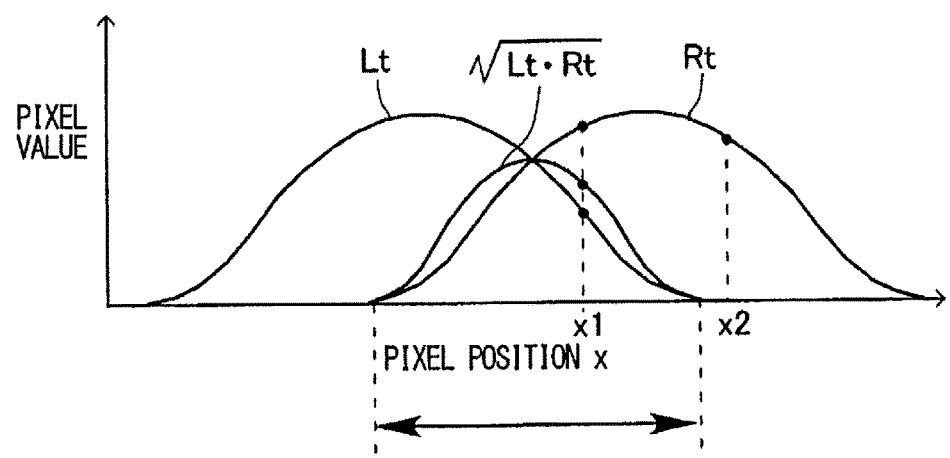

FIGS. 10-A and 10-B show the point spread of an object point in an unfocused region. In the drawings, the horizontal axis indicates the pixel position, and the center position is the position of the pixel corresponding to the image point. The vertical axis indicates the pixel value. In FIGS. 10-A and 10-B, the point spread Lt of the left viewpoint and the point spread Rt of the right viewpoint exhibit a blur width in the horizontal direction when the aperture sections of the right and left parallax pixels shown in FIG. 6-A are half-aperture.

The point spread Lt of the left viewpoint and the point spread Rt of the right viewpoint in FIG. 10-A are expressed as functions of the pixel position x. The arithmetic mean of the point spread Lt of the left viewpoint and the point spread Rt of the right viewpoint is also expressed as a function of the pixel position x. For example, at the pixel position x1, both Lt and Rt have pixel values, and therefore the computation result is a positive value. At the pixel position x2, Lt does not have a pixel value but Rt does have a pixel value, and therefore the computation result is a positive value. In the manner described above, when calculating the arithmetic mean, if any one of Lt and Rt has a pixel value, the computation result is a positive value. Accordingly, the arithmetic mean of the point spread Lt and the point spread Rt at each pixel position, when viewed in total, is the sum of the width over which the point spreads Lt and Rt reach, as shown in FIG. 10-A. This corresponds to the blur width corresponding to the non-parallax pixels including the aperture sections that have full apertures as shown in FIG. 6-A.

The arithmetic mean is one example of a computation for acquiring the sum of the widths spanned by the point spreads Lt and Rt. Another computation may be used, as long as it enables the acquisition of the sum of the widths spanned by the point spreads Lt and Rt.

The geometric mean of the point spread Lt of the left viewpoint and the point spread Rt of the right viewpoint is also expressed as a function of the pixel position x. For example, at the pixel position x1, Lt and Rt both have a pixel value, and therefore the computation result is a positive value. On the other hand, at the pixel position x2, Rt has a pixel value but Lt does not have a pixel value, and therefore the computation result is zero. As described above, when calculating the geometric mean, if Lt and Rt both have pixel values, the computation result is a positive value. Accordingly, the geometric mean of the point spread Lt and the point spread Rt at each pixel position, when viewed in total, is the product of the widths spanned by the point spreads Lt and Rt, as shown in FIG. 10-B. The width spanned by the geometric mean is narrower than that of the arithmetic mean and becomes relatively even smaller when the parallax amount increases, and therefore it can be said that the ratio between these widths is correlated with the parallax amount. In other words, the following expression represents a disparity map.

$$D(x, y) = \sigma_1 \frac{\frac{Lt(x, y) + Rt(x, y)}{2}}{\sqrt{Lt(x, y) \cdot Rt(x, y)}} \quad \text{(Expression 1)}$$

Here, $\sigma_1$ is a constant for converting into the absolute spread width of the image, and is a fixed value relative to an arbitrary image.

The geometric mean is an example of a computation for acquiring the product of the spread width of the point spreads Lt and Rt. Another computation may be used, as long as it enables the acquisition of the product of the spread width of the point spreads Lt and Rt. Generally, it can be thought that the subject is a collection of object points, and therefore the image can be the integral of the point images for each object point. Accordingly, the blur of the image can be thought of in the same manner as the blur of the point spread described above.

As shown in FIGS. 10-A and 10-B, the blur on the left and right of the original parallax images has a width equal to the blur width when the aperture sections are half-aperture, and the geometric mean transfers the half-aperture blur as-is. On the other hand, the arithmetic mean transfers the full-aperture blur. Clearly expressing only the transfer relationship of the blur width for the geometric mean and the arithmetic mean described above results in the expressions shown below.

In the Case of the Geometric Mean:

(half-aperture blur)=(half-aperture blur)×(half-aperture blur)/(half-aperture blur)

In the Case of the Arithmetic Mean:

(full-aperture blur)=(half-aperture blur)×(full-aperture blur)/(half-aperture blur)

Accordingly, in a case where the left parallax image and the right parallax image are in a state where the parallax is separated along with the half-aperture blur in a region where there is a parallax between the images, when the left-right asymmetrical blur correction is performed, the parallax separation remains and a blur width approximately equal to the original amount remains, for the case of the geometric mean. On the other hand, for the case of the arithmetic mean, the parallax separation remains and the full-aperture blur remains for each parallax. The image obtained by simply overlapping the left parallax image and the right parallax image is intended to appear as a completely 2D image, but when the arithmetic mean is used, the horizontal direction has two full-aperture overlapping blurs, which causes spreading of the blur in the horizontal direction. As a result, excessive blur correction is performed. On the other hand, when the geometric mean is used, the 2D image has only overlapping half-aperture blurs, and therefore an overall blur equivalent to full-aperture blur is seen in both the vertical direction and the horizontal direction, in the same manner as a normal 2D image. Accordingly, when considering the blur transfer, setting the target of the left-right asymmetrical blur correction to be the blur of an image obtained using the geometric mean results in a desirable image being provided. If the target were set to be the blur obtained using the arithmetic mean, the provided image would be unclear and appear unnatural in the horizontal direction, and therefore use of the arithmetic mean should be avoided.

Although described in detail further below, when correcting the left-right asymmetry of the blur in the manner described above, there is an added benefit that the shading problem occurring in the 3D image is actually solved at the same time.

First, in the first embodiment example, technology is described for performing the left-right asymmetry correction of the blur and the shading correction caused by the parallax pixels, in an image for which a stereoscopic image has already been generated through single-lens stereoscopic imaging. Then, in the second embodiment example, a case is described in which the parallax amount adjustment is performed. Finally, in the third embodiment example, in order to clarify the relationship between the parallax elimination, the shading correction, and the left-right asymmetry correction of the blur in parallax images, technology is described for reproducing both the color and parallax in an image for which the color and parallax are captured at the same time by a single-plate sensor in a single-lens stereoscopic imaging apparatus.

First Embodiment Example

The present embodiment example deals with a monochromatic stereoscopic image. In the case of a color image formed from the three colors R, G, and B, the same process as performed for the monochromatic image may be performed for each of the three color images, and therefore repetitive description of this process is omitted. The steps of this process are as shown below.

1) Input of the parallax image data
2) Generation of the smoothed image
3) Generation of the reference image used for 3D image correction
4) Generation of the gain distribution data
5) Left-right asymmetrical blur correction and shading correction for the parallax images The following describes these steps.

1) Input of the Parallax Image Data

The left parallax image Lt(x, y) and the right parallax image Rt(x, y) obtained by imaging a general subject are input. At this time, each parallax image is linear gradation data that has not undergone gamma correction. Furthermore, in the case of a color image, the parallax images are preferably RGB data resulting from the sensor spectral sensitivity without undergoing any color processing.

2) Generation of the Smoothed Image

A smoothing filter that is equal to or greater than the maximum parallax amount in the horizontal direction is applied to the left and right parallax images, such that the parallax is not eliminated by the left-right asymmetrical blur correction and the shading correction, and a process is performed to completely eliminate the parallax information.

Here, there are two possibilities including using a one-dimensional smoothing filter and using a two-dimensional smoothing filter.

The maximum parallax amount between the left and right parallax images is defined according to the relationship between the imaging area of the image sensor, the pixel pitch, and the optical system, and is of an order of approximately 5% in the horizontal direction relative to the entire image surface. When there are approximately 2000 pixels in the horizontal direction, the maximum parallax amount is approximately 100 pixels. A corresponding smoothing filter is applied. The filter radius is represented as $\sigma_0$, and is set to the order of the maximum parallax amount. This filter is for local smoothing. The smoothed image data holds the shading component and the blur characteristics with this localized accuracy.

The maximum parallax amount differs according to the diaphragm value and focal distance of a telescopic lens, a standard lens, a wide angle lens, or the like, and therefore $\sigma_0$ may be set in advance for each optical condition. The method for obtaining $\sigma_0$ from the image itself may include, as an example, taking the histogram of Expression (1) and setting the parameter of the horizontal axis of the histogram providing the maximum value to be $\sigma_0$.

The case of Gaussian blur is expressed as shown below. The left and right smoothed image data are respectively represented by $\langle L(x, y) \rangle$ and $\langle R(x, y) \rangle$, with the meaning of being a localized average.

Gaussian Blur Filter $$F(x - x') = \frac{\exp\left(-\frac{|x-x'|^2}{\sigma_0^2}\right)}{\int_{|x-x'| \leq 2\sigma_0} \exp\left(-\frac{|x-x'|^2}{\sigma_0^2}\right) dx'}$$

When One-Dimensional Smoothing is Used $$\langle Lt(x, y) \rangle - F \otimes Lt(x, y) - \frac{\int_{|x-x'| \leq 2\sigma_0} Lt(x, y) F(x - x') dx'}{\int_{|x-x'| \leq 2\sigma_0} F(x - x') dx'}$$

$$\langle Rt(x, y) \rangle - F \otimes Rt(x, y) - \frac{\int_{|x-x'| \leq 2\sigma_0} Rt(x, y) F(x - x') dx'}{\int_{|x-x'| \leq 2\sigma_0} F(x - x') dx'}$$

When Two-Dimensional Smoothing is Used $$\langle Lt(x, y) \rangle = F_y \otimes F_x \otimes Lt(x, y) =$$

$$\frac{\int_{|y-y'| \leq 2\sigma_0} dy' F(y - y') \int_{|y-y'| \leq 2\sigma_0} dx' F(x - x') Lt(x, y)}{\int_{|y-y'| \leq 2\sigma_0} F(y - y') dy' \cdot \int_{|y-y'| \leq 2\sigma_0} F(x - x') dx'}$$

$$\langle Rt(x, y) \rangle = F_y \otimes F_x \otimes Rt(x, y) =$$

$$\frac{\int_{|y-y'| \leq 2\sigma_0} dy' F(y - y') \int_{|x-x'| \leq 2\sigma_0} dx' F(x - x') Rt(x, y)}{\int_{|y-y'| \leq 2\sigma_0} F(y - y') dy' \cdot \int_{|x-x'| \leq 2\sigma_0} F(x - x') dx'}$$

Even when Gaussian blur is not used, it is easy to instead use a uniform filter that is expressed by positive filter constants that are all uniform.

3) Generation of the Reference Image Used for 3D Image Correction

The reference image used for correction of a 3D image to represent the reference level of the shading correction and the target of the blur correction is created from the smoothed image from which the left parallax has been eliminated and the smoothed image from which the right parallax has been eliminated. This reference image is represented as $\langle M(x) \rangle$. The creation of this reference point includes calculating the left and right geometric mean, from the perspective of the blur transfer that accompanies the left-right asymmetry correction of the blur.

$$\langle M(x) \rangle = \sqrt{\langle Lt(x) \rangle \cdot \langle Rt(x) \rangle}$$

Although using the geometric mean described above is most desirable in consideration of the left-right asymmetry correction of the blur, in a case of a computation in accordance with an image that is relatively bright using shading correction, for example, this reference image is calculated using the expression below.

$$\langle M(x) \rangle = \langle Lt(x) \rangle \cdot \langle Rt(x) \rangle$$

At this time, the final expression defined in the following step 4 is described as a formula without the square root.

4) Generation of the Gain Distribution Data

Using the left and right smoothed images and the reference image for correcting the 3D image, the gain distribution data $gL(x, y)$ for correcting the left parallax image and the gain distribution data $gR(x, y)$ for correcting the right parallax image are generated. In this way, the image structure information cancels out, and an inverse component of the shading and a component acting to correct the asymmetry of the blur are generated. Here, the components that affect the parallax no longer remain.

$$g_L(x, y) = \frac{\langle M(x, y) \rangle}{\langle Lt(x, y) \rangle} = \sqrt{\frac{\langle Rt(x, y) \rangle}{\langle Lt(x, y) \rangle}}$$

$$g_R(x, y) = \frac{\langle M(x, y) \rangle}{\langle Rt(x, y) \rangle} = \sqrt{\frac{\langle Lt(x, y) \rangle}{\langle Rt(x, y) \rangle}}$$

5) Left-Right Asymmetrical Blur Correction and Shading Correction for the Parallax Images Using the obtained left and right gain distribution data respectively, the left and right asymmetry of the blur is corrected for each of the left parallax image and the right parallax image. This means that the shading correction occurs at the same time. The left parallax image in which the left-right asymmetrical blur has been corrected is represented by Lt'(x, y) and the right parallax image in which the left-right asymmetrical blur has been corrected is represented by Rt'(x, y).

$$Lt'(x,y) = g_L(x,y) \cdot Lt(x,y)$$

$$Rt'(x,y) = g_R(x,y) \cdot Rt(x,y)$$

In this way, a stereoscopic image is generated in which the left-right asymmetry of the blur caused by the characteristics of the parallax pixels has been corrected, and when displayed stereoscopically, it is possible to obtain a stereoscopic image in which the blur appears natural. Furthermore, at the same time it is possible to obtain a natural stereoscopic image in which there is no conflict in the field of view caused by shading. In other words, it is possible to generate a high-definition stereoscopic image without losing the parallax, while simultaneously correcting the shading and the left-right asymmetry of the blur that are unique to single-lens stereoscopic imaging.

The shading is not limited to a function of only the pupil diameter and the pupil position of the optical system, and it is confirmed through experimentation that the shading is expressed differently in a case where the subject is nearby and a case where the subject is infinitely far. In the present embodiment example, the correction amount is calculated from localized data of the image itself, and therefore it is possible to perform a correction that also removes this effect.

Second Embodiment Example

The present embodiment example describes a case in which a parallax amount adjustment is performed. The steps of this process are as shown below. The steps of 1) Input of the parallax image data and 4) Generation of the gain distribution data are the same as those of the first embodiment example, and therefore description of these steps is omitted.

1) Input of the parallax image data
2) Generation of the variable smoothed image
3) Generation of the reference image used for 3D image correction
4) Generation of the gain distribution data
5) Parallax amount adjustment of the parallax images The following describes these steps.

2) Generation of the variable smoothed image

The computation is the same as in step 2 of the first embodiment example. However, the value of the filter radius $\sigma_0$ is set to be variable in a range from the value shown in the first embodiment example to zero.

Figure 12:
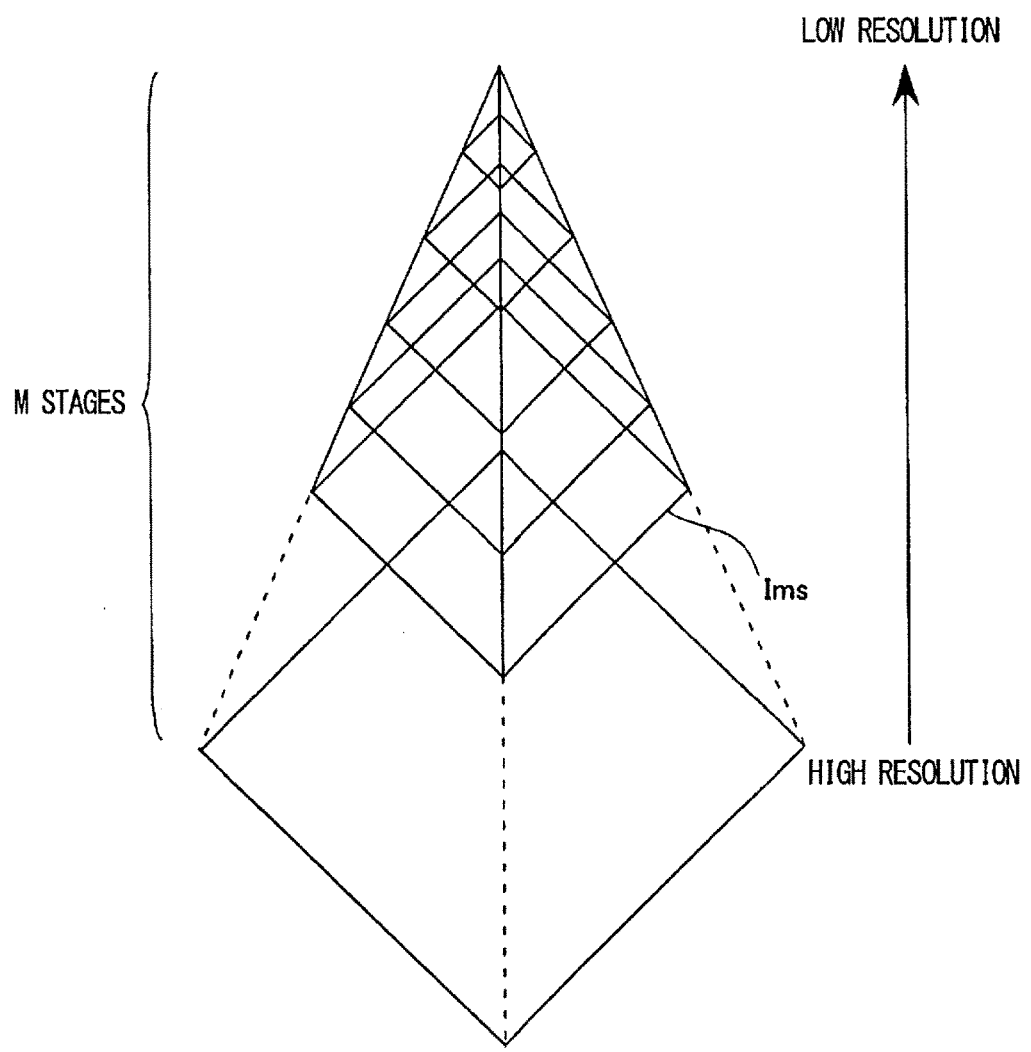
FIG. 12 is a drawing for describing the multiresolution transform.

A multiresolution transform can be used as the method for two-dimensional smoothing, instead of the method of filtering in real space shown in the first embodiment example. For example, a Gaussian pyramid may be constructed. FIG. 12 is a drawing for describing the Gaussian pyramid. For a detailed description of the Gaussian pyramid, please see Non-Patent Document 1. The following is a simple explanation of the Gaussian pyramid. In order to prevent aliasing when generating a reduced image, smoothing of approximately 5×5 is performed and ½ subsampling is performed to generate a reduced image Ims. By repeating this process, a Gaussian pyramid can be formed from a group of reduced images. The Gaussian pyramid is set to have M stages. When the number of stages is higher, the resolution changes from high resolution to low resolution.

The variable smoothed image described above is obtained by freely changing the M stages and expanding only the reduced image with the lowest resolution until reaching the actual resolution using linear interpolation. Usually, when an image sensor with approximately 10 million pixels is used in a single-lens pupil-divided imaging system, smoothing that is approximately equal to the maximum parallax amount can be realized when the resolution conversion is performed for 5 or 6 stages. Over this point, the smoothed image has regions that share the effect of eliminating the parallax. Not only is down-sampling performed for smoothing with the same ratio in the horizontal direction and the vertical direction, but down-sampling may also be performed for smoothing with different ratios in the horizontal direction and the vertical direction. For example, an image whose horizontal length is reduced may be generated by maintaining the resolution in the vertical direction compared to the horizontal direction.

Non-Patent Document 1: P. J. Burt and E. H. Adelson, "The Laplacian pyramid as a compact image code," IEEE Trans. Commun., vol. COM-31, No. 4, pp. 532-540, 1983.

5) Parallax Amount Adjustment of the Parallax Images

The computation is the same as that of step 5 in the first embodiment example. However, a parallax amount remains that is proportional to the magnitude of the filter radius set in step 2. Accordingly, it is possible to provide a means for adjusting the parallax amount. This relationship is shown in the expression below.

Parallax amount=constant multiple×(filter radius/$\sigma_0$)

The constant multiple is the maximum parallax amount of the image.

In the manner described above, in the present embodiment example, it is possible to adjust the parallax amount while realizing the correction effect, according to which stage of data in a multiresolution image is used for the correction. Specifically, when the correction is performed with smoothed data obtained by enlarging a reduced image having high resolution without performing much smoothing, the parallax component remains, and therefore the effect of improving the left-right asymmetry of the blur is increased. In this case, the parallax amount is smaller due to the parallaxes mixing with each other. On the other hand, when the correction is performed with smoothed data obtained by enlarging a reduced image having low resolution, compared to the case in which the correction is performed with smoothed data obtained by enlarging a reduced image with high resolution, the effect of improving the left-right asymmetry of the blur is smaller for small blur (small blur area) but the parallax component is easy to eliminate, and therefore it is possible to restrict the reduction of the parallax amount caused by the correction. The image processing section may adjust the parallax amount according to the filter radius set by user input. The image processing section may adjust the parallax amount according to the filter radius set in advance. The user may set the parallax amount by selecting one parallax amount from among a plurality of parallax amounts displayed in a menu.

Third Embodiment Example

Figure 11:
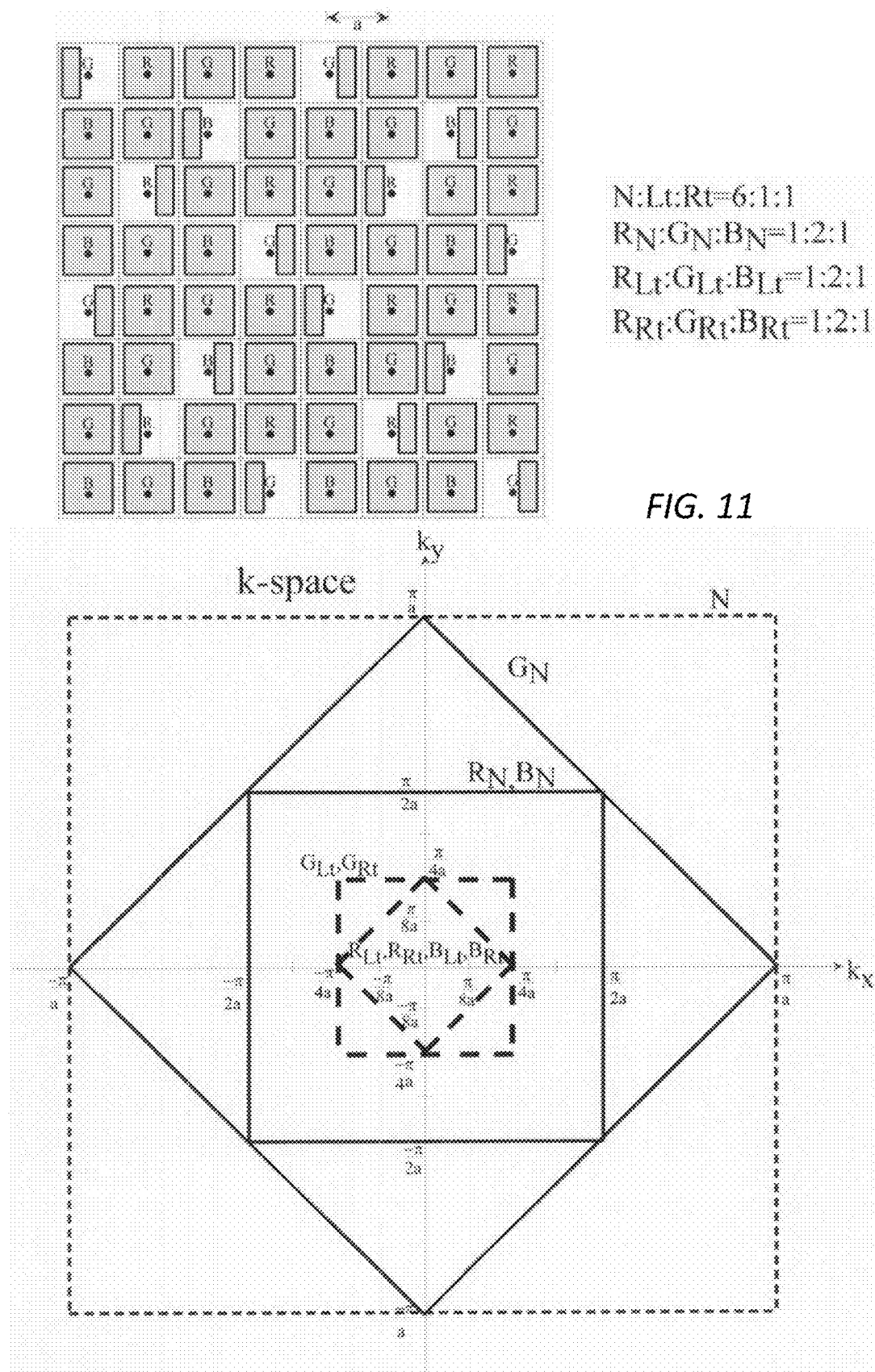
FIG. 11 shows an exemplary arrangement in real space and a k space.

A specific example is described using a parallax pixel arrangement that is a sparse Bayer RGB arrangement. FIG. 11 shows an example of an actual spatial arrangement and a k-space. In this example, the arrangement in the upper portion of FIG. 11 is a primitive lattice in which image sensors are arranged periodically. The frequency resolution region in a reciprocal lattice space is also shown together with each color and each parallax. In this arrangement, each image sensor achieves a quality that a parallax only occurs in subject regions with blur of the single-lens pupil-divided system, and has a structure in which the parallax pixels are arranged with low density and as many of the remaining pixels as possible are allocated as non-parallax pixels. The non-parallax pixels and the parallax pixels both have a Bayer formation as their basic structure, and the color filters are arranged such that the right parallax pixels and the left parallax pixels both have an R:G:B ratio of 1:2:1. In other words, by placing importance on the resolution power of the intermediate non-parallax images captured with primary colors and performing parallax modulation on the high-frequency component thereof, it is possible to obtain a high-resolution stereoscopic image as a result of the superposition of the left parallax pixels and the right parallax pixels. The steps of this process are generally as shown below.

1) Input of the color and parallax multiplexed mosaic image data
2) Global gain balance correction of the color and parallax mosaic image
3) Generation of the tentative parallax images
4) Correction of the left-right asymmetrical blur in the tentative parallax images (shading correction of the tentative parallax images) (regional gain balance correction)
5) Generation of the non-parallax color mosaic image resulting from the left and right localized luminance distribution correction (local gain balance correction)
6) Generation of the non-parallax reference image
7) Generation of the actual parallax images
8) Conversion to output color space The following describes these steps.

1) Input of the Color and Parallax Multiplexed Mosaic Image Data

The single-plate mosaic image obtained by multiplexing the color and parallax of FIG. 11 is represented as M(x, y). The gradation is the linear gradation output as a result of an A/D conversion.

2) Global Gain Balance Correction of the Color and Parallax Mosaic Image.

The captured subject image is used as-is to calculate the average value $\bar{N}$ for the entire image of the pixel values of the non-parallax pixels, the average value $\bar{Lt}$ for the entire image of the pixel values of the left parallax pixels, and the average value $\bar{Rt}$ for the entire image of the pixel values of the right parallax pixel. In contrast to the first embodiment, the there are three signal levels. First, the gain correction is performed to match the signal levels to the average values, with a reference point between the left and right. At this time, there are two methods for obtaining the reference point, which are a method using the arithmetic mean and a method using the geometric mean. After this, the geometric mean between the signal level averaged from the left and right and the signal level of the non-parallax pixels is calculated, and the gain correction is performed to match the signal levels to this average value. Next, this process is performed for each of the RGB color components.

The corresponding average values are as shown below.
$\bar{R}_N$, $\bar{R}_{Lt}$, $\bar{R}_{Rt}$,
$\bar{G}_N$, $\bar{G}_{Lt}$, $\bar{G}_{Rt}$,
$\bar{B}_N$, $\bar{B}_{Lt}$, $\bar{B}_{Rt}$ For convenience, in the mosaic image M(x, y):
the signal plane of the non-parallax pixels having the R component is represented as RN_mosaic(x, y),
the signal plane of the left parallax pixels having the R component is represented as RLt_mosaic(x, y),
the signal plane of the right parallax pixels having the R component is represented as RRt_mosaic(x, y),
the signal plane of the non-parallax pixels having the G component is represented as GN_mosaic(x, y),
the signal plane of the left parallax pixels having the G component is represented as GLt_mosaic(x, y),
the signal plane of the right parallax pixels having the G component is represented as GRt_mosaic(x, y),
the signal plane of the non-parallax pixels having the B component is represented as BN_mosaic(x, y),
the signal plane of the left parallax pixels having the B component is represented as BLt_mosaic(x, y), and
the signal plane of the right parallax pixels having the B component is represented as BRt_mosaic(x, y).

a) When Using the Arithmetic Mean of the Left and Right Average Values $$\bar{m}_R = \sqrt{\bar{R}_N \cdot \frac{\bar{R}_{Lt} \cdot \bar{R}_{Rt}}{2}}$$

$$\bar{m}_G = \sqrt{\bar{G}_N \cdot \frac{\bar{G}_{Lt} \cdot \bar{G}_{Rt}}{2}}$$

$$\bar{m}_B = \sqrt{\bar{B}_N \cdot \frac{\bar{B}_{Lt} \cdot \bar{B}_{Rt}}{2}}$$

Gain Values for the Non-Parallax Pixels $$\bar{g}_{R_N} = \frac{\bar{m}_R}{\bar{R}_N} = \sqrt{\frac{\bar{R}_{Lt} + \bar{R}_{Rt}}{2\bar{R}_N}}$$

$$\bar{g}_{G_N} = \frac{\bar{m}_G}{\bar{G}_N} = \sqrt{\frac{\bar{G}_{Lt} + \bar{G}_{Rt}}{2\bar{G}_N}}$$

$$\bar{g}_{B_N} = \frac{\bar{m}_B}{\bar{B}_N} = \sqrt{\frac{\bar{B}_{Lt} + \bar{B}_{Rt}}{2\bar{B}_N}}$$

Gain Values for the Left Parallax Pixels $$\bar{g}_{R_{Lt}} = \frac{\bar{m}_R}{\bar{R}_{Lt}} = \sqrt{\frac{\bar{R}_N}{\bar{R}_{Lt}} \cdot \frac{\bar{R}_{Lt} + \bar{R}_{Rt}}{2\bar{R}_{Lt}}}$$

$$\bar{g}_{G_{Lt}} = \frac{\bar{m}_G}{\bar{G}_{Lt}} = \sqrt{\frac{\bar{G}_N}{\bar{G}_{Lt}} \cdot \frac{\bar{G}_{Lt} \cdot \bar{G}_{Rt}}{2\bar{G}_{Lt}}}$$

$$\bar{g}_{B_{Lt}} = \frac{\bar{m}_B}{\bar{B}_{Lt}} = \sqrt{\frac{\bar{B}_N}{\bar{B}_{Lt}} \cdot \frac{\bar{B}_{Lt} + \bar{B}_{Rt}}{2\bar{B}_{Lt}}}$$

Gain Values for the Right Parallax Pixels $$\bar{g}_{R_{Rt}} = \frac{\bar{m}_R}{\bar{R}_{Rt}} = \sqrt{\frac{\bar{R}_N}{\bar{R}_{Rt}} \cdot \frac{\bar{R}_{Lt} + \bar{R}_{Rt}}{2\bar{R}_{Rt}}}$$

$$\bar{g}_{G_{Rt}} = \frac{\bar{m}_G}{\bar{G}_{Rt}} = \sqrt{\frac{\bar{G}_N}{\bar{G}_{Rt}} \cdot \frac{\bar{G}_{Lt} + \bar{G}_{Rt}}{2\bar{G}_{Rt}}}$$

$$\bar{g}_{B_{Rt}} = \frac{\bar{m}_B}{\bar{B}_{Rt}} = \sqrt{\frac{\bar{B}_N}{\bar{B}_{Rt}} \cdot \frac{\bar{B}_{Lt} + \bar{B}_{Rt}}{2\bar{B}_{Rt}}}$$

Global Gain Correction for the Non-Parallax Pixels $$R'_{Rt\_mosaic}(x, y) = R_{Rt\_mosaic}(x, y) \cdot \bar{g}_{R_{Rt}} = R_{Rt\_mosaic}(x, y) \cdot \sqrt{\frac{\bar{R}_N}{\bar{R}_{Rt}} \cdot \frac{\bar{R}_{Lt} + \bar{R}_{Rt}}{2\bar{R}_{Rt}}}$$

$$G'_{Rt\_mosaic}(x, y) = G_{Rt\_mosaic}(x, y) \cdot \bar{g}_{G_{Rt}} = G_{Rt\_mosaic}(x, y) \cdot \sqrt{\frac{\bar{G}_N}{\bar{G}_{Rt}} \cdot \frac{\bar{G}_{Lt} + \bar{G}_{Rt}}{2\bar{G}_{Rt}}}$$

-continued $$B'_{Rt\_mosaic}(x, y) = B_{Rt\_mosaic}(x, y) \cdot \bar{g}_{B_{Rt}} = B_{Rt\_mosaic} \cdot \sqrt{\frac{\bar{B}_N}{\bar{B}_{Rt}} \cdot \frac{\bar{B}_{Lt} + \bar{B}_{Rt}}{2\bar{B}_{Rt}}}$$

Global Gain Correction for the Left Parallax Pixels $$R'_{Lt\_mosaic}(x, y) =$$

$$R_{Lt\_mosaic}(x, y) \cdot \bar{g}_{R_{Lt}} = R_{Lt\_mosaic}(x, y) \cdot \sqrt{\frac{\bar{R}_N}{\bar{R}_{Lt}} \cdot \frac{\bar{R}_{Lt} + \bar{R}_{Rt}}{2\bar{R}_{Lt}}}$$

$$G'_{Lt\_mosaic}(x, y) = G_{Lt\_mosaic}(x, y) \cdot \bar{g}_{G_{Lt}} =$$

$$G_{Lt\_mosaic}(x, y) \cdot \sqrt{\frac{\bar{G}_N}{\bar{G}_{Lt}} \cdot \frac{\bar{G}_{Lt} + \bar{G}_{Rt}}{2\bar{G}_{Lt}}}$$

$$B'_{Lt\_mosaic}(x, y) = B_{Lt\_mosaic}(x, y) \cdot \bar{g}_{B_{Lt}} - B_{Lt\_mosaic}(x, y) \cdot \sqrt{\frac{\bar{B}_N}{\bar{B}_{Lt}} \cdot \frac{\bar{B}_{Lt} + \bar{B}_{Rt}}{2\bar{B}_{Lt}}}$$

Global Gain Correction for the Right Parallax Pixels $$R'_{N\_mosaic}(x, y) = R_{N\_mosaic}(x, y) \cdot \bar{g}_{R_N} = R_{N\_mosaic}(x, y) \cdot \sqrt{\frac{\bar{R}_{Lt} + \bar{R}_{Rt}}{2\bar{R}_N}}$$

$$G'_{N\_mosaic}(x, y) = G_{N\_mosaic}(x, y) \cdot \bar{g}_{G_N} = G_{N\_mosaic}(x, y) \cdot \sqrt{\frac{\bar{G}_{Lt} + \bar{G}_{Rt}}{2\bar{G}_N}}$$

$$B'_{N\_mosaic}(x, y) = B_{N\_mosaic}(x, y) \cdot g_{B_N} = B_{N\_mosaic}(x, y) \cdot \sqrt{\frac{\bar{B}_{Lt} + \bar{B}_{Rt}}{2\bar{B}_N}}$$

b) When Using the Geometric Mean of the Left and Right Average Values $$\bar{m}_R = \sqrt{\bar{R}_N \cdot \sqrt{\bar{R}_{Lt} \cdot \bar{R}_{Rt}}}$$

$$\bar{m}_G = \sqrt{\bar{G}_N \cdot \sqrt{\bar{G}_{Lt} \cdot \bar{G}_{Rt}}}$$

$$\bar{m}_B = \sqrt{\bar{B}_N \cdot \sqrt{\bar{B}_{Lt} \cdot \bar{B}_{Rt}}}$$

Gain Values for the Non-Parallax Pixels $$\bar{g}_{R_N} = \frac{\bar{m}_R}{\bar{R}_N} = \sqrt{\frac{\sqrt{\bar{R}_{Lt} \cdot \bar{R}_{Rt}}}{\bar{R}_N}}$$

$$\bar{g}_{G_N} = \frac{\bar{m}_G}{\bar{G}_N} = \sqrt{\frac{\sqrt{\bar{G}_{Lt} \cdot \bar{G}_{Rt}}}{\bar{G}_N}}$$

$$\bar{g}_{B_N} = \frac{\bar{m}_B}{\bar{B}_N} = \sqrt{\frac{\sqrt{\bar{B}_{Lt} \cdot \bar{B}_{Rt}}}{\bar{B}_N}}$$

Gain Values for the Left Parallax Pixels $$\bar{g}_{R_{Lt}} = \frac{\bar{m}_R}{\bar{R}_{Lt}} = \sqrt{\frac{\bar{R}_N}{\bar{R}_{Lt}} \cdot \sqrt{\frac{\bar{R}_{Rt}}{\bar{R}_{Lt}}}}$$

$$\bar{g}_{G_{Lt}} = \frac{\bar{m}_G}{\bar{G}_{Lt}} = \sqrt{\frac{\bar{G}_N}{\bar{G}_{Lt}} \cdot \sqrt{\frac{\bar{G}_{Rt}}{\bar{G}_{Lt}}}}$$

$$\bar{g}_{B_{Lt}} = \frac{\bar{m}_B}{\bar{B}_{Lt}} = \sqrt{\frac{\bar{B}_N}{\bar{B}_{Lt}} \cdot \sqrt{\frac{\bar{B}_{Rt}}{\bar{B}_{Lt}}}}$$

Gain Values for the Right Parallax Pixels $$\bar{g}_{R_{Rt}} = \frac{\bar{m}_R}{\bar{R}_{Rt}} = \sqrt{\frac{\bar{R}_N}{\bar{R}_{Rt}} \cdot \sqrt{\frac{\bar{R}_{Lt}}{\bar{R}_{Rt}}}}$$

$$\bar{g}_{G_{Rt}} = \frac{\bar{m}_G}{\bar{G}_{Rt}} = \sqrt{\frac{\bar{G}_N}{\bar{G}_{Rt}} \cdot \sqrt{\frac{\bar{G}_{Lt}}{\bar{G}_{Rt}}}}$$

$$\bar{g}_{B_{Rt}} = \frac{\bar{m}_B}{\bar{B}_{Rt}} = \sqrt{\frac{\bar{B}_N}{\bar{B}_{Rt}} \cdot \sqrt{\frac{\bar{B}_{Lt}}{\bar{B}_{Rt}}}}$$

Global Gain Correction for the Non-Parallax Pixels $$R'_{N\_mosaic}(x, y) = R_{N\_mosaic}(x, y) \cdot \bar{g}_{R_N} = R_{N\_mosaic}(x, y) \cdot \sqrt{\frac{\sqrt{\bar{R}_{Lt} \cdot \bar{R}_{Rt}}}{\bar{R}_N}}$$

$$G'_{N\_mosaic}(x, y) = G_{N\_mosaic}(x, y) \cdot \bar{g}_{G_N} = G_{N\_mosaic}(x, y) \cdot \sqrt{\frac{\sqrt{\bar{G}_{Lt} \cdot \bar{G}_{Rt}}}{\bar{G}_N}}$$

$$B'_{N\_mosaic}(x, y) = B_{N\_mosaic}(x, y) \cdot \bar{g}_{B_N} = B_{N\_mosaic}(x, y) \cdot \sqrt{\frac{\sqrt{\bar{B}_{Lt} \cdot \bar{B}_{Rt}}}{\bar{B}_N}}$$

Global Gain Correction for the Left Parallax Pixels $$R'_{Lt\_mosaic}(x, y) = R_{Lt\_mosaic}(x, y) \cdot \bar{g}_{R_{Lt}} = R_{Lt\_mosaic}(x, y) \cdot \sqrt{\frac{\bar{R}_N}{\bar{R}_{Lt}} \cdot \sqrt{\frac{\bar{R}_{Rt}}{\bar{R}_{Lt}}}}$$

$$G'_{Lt\_mosaic}(x, y) =$$

$$G_{Lt\_mosaic}(x, y) \cdot \bar{g}_{G_{Lt}} = G_{Lt\_mosaic}(x, y) \cdot \sqrt{\frac{\bar{G}_N}{\bar{G}_{Lt}} \cdot \sqrt{\frac{\bar{G}_{Rt}}{\bar{G}_{Lt}}}}$$

$$B'_{Lt\_mosaic}(x, y) = B_{Lt\_mosaic}(x, y) \cdot \bar{g}_{B_{Lt}} = B_{Lt\_mosaic}(x, y) \cdot \sqrt{\frac{\bar{B}_N}{\bar{B}_{Lt}} \cdot \sqrt{\frac{\bar{B}_{Rt}}{\bar{B}_{Lt}}}}$$

Global Gain Correction for the Right Parallax Pixels $$R'_{Rt\_mosaic}(x, y) =$$

$$R_{Rt\_mosaic}(x, y) \cdot \overline{g}_{R_{Rt}} = R_{Rt\_mosaic}(x, y) \cdot \sqrt{\frac{\overline{R}_N}{\overline{R}_{Rt}}} \cdot \sqrt{\frac{\overline{R}_{Lt}}{\overline{R}_{Rt}}}$$

$$G'_{Rt\_mosaic}(x, y) = G_{Rt\_mosaic}(x, y) \cdot \overline{g}_{G_{Rt}} =$$

$$G_{Rt\_mosaic}(x, y) \cdot \sqrt{\frac{\overline{G}_N}{\overline{G}_{Rt}}} \cdot \sqrt{\frac{\overline{G}_{Lt}}{\overline{G}_{Rt}}}$$

$$B'_{Rt\_mosaic}(x, y) = B_{Rt\_mosaic}(x, y) \cdot g_{B_{Rt}} = B_{Rt\_mosaic}(x, y) \cdot \sqrt{\frac{\overline{B}_N}{\overline{B}_{Rt}}} \cdot \sqrt{\frac{\overline{B}_{Lt}}{\overline{B}_{Rt}}}$$

When a mask is used in which all of the non-parallax pixels are full-aperture, the method using the arithmetic average is adopted. When a mask is used in which all of the non-parallax pixels are half-aperture, the method using the geometric mean is adopted. Accordingly, the method using the arithmetic mean is adopted in the present embodiment example. In this way, a mosaic image in which the non-parallax pixels are corrected using one gain coefficient, the left parallax pixels are corrected using one gain coefficient, and the right parallax pixels are corrected using one gain coefficient is output as M'(x, y).

3) Generation of the Tentative Parallax Images

A tentative left parallax image and a tentative right parallax image having low spatial frequency resolution are generated. A simple average interpolation of the G color plane obtained by gathering only the left parallax pixels is performed. Using nearby pixel values, linear interpolation is performed according to the ratio of the distance. In the same manner, a simple average interpolation in the G color plane obtained by gathering only the right parallax pixels is performed. In the same manner, a simple average interpolation in the G color plane obtained by gathering only the non-parallax pixels is performed. The same process is performed for each of the colors R, G, and B. Specifically, RLt(x, y) is generated from RLt_mosaic(x, y), RRt(x, y) is generated from RRt_mosaic(x, y), RN(x, y) is generated from RN_mosaic(x, y), GLt(x, y) is generated from GLt_mosaic(x, y), GRt(x, y) is generated from GRt_mosaic (x, y), GN(x, y) is generated from GN_mosaic(x, y), BLt(x, y) is generated from BLt_mosaic(x, y), BRt(x, y) is generated from BRt_mosaic(x, y), and BN(x, y) is generated from BN_mosaic(x, y).

Tentative non-parallax image having the R component: RN(x, y)

Tentative non-parallax image having the G component: GN(x, y)

Tentative non-parallax image having the B component: BN(x, y)

Tentative left parallax image having the R component: RLt(x, y)

Tentative left parallax image having the G component: GLt(x, y)

Tentative left parallax image having the B component: BLt(x, y)

Tentative right parallax image having the R component: RRt(x, y)

Tentative right parallax image having the G component: GRt(x, y)

Tentative right parallax image having the B component: BRt(x, y)

When creating the tentative non-parallax images RN(x, y), GN(x, y), and BN(x, y), a direction judgment in the signal plane may be introduced to realize higher accuracy.

4) Correction of the Left-Right Asymmetrical Blur and Shading Correction in the Tentative Parallax Images (Regional Gain Balance Correction)

The shading correction of the first embodiment example and the second embodiment example is performed for each of the RGB color planes. The local gain balance correction described further below in step 5 involves performing the shading correction at the same time as completely eliminating the parallax in order to generate the 2D image, but here the shading correction and left-right asymmetrical blur correction are performed such that the parallax necessary for generating the 3D image remains in the parallax images. Accordingly, the regional areas are made to match an average brightness level.

The reason that the gain balance correction is performed on the tentative parallax images, instead of on the parallax images for displaying the stereoscopic image as described further below in step 7, is that gradation jumps occur in regions that experience an increase in gain due to the gain matching and, as a result of acquiring information of the non-parallax images having high resolution in the parallax modulation process of the following step 7, the effects of the gradation jumps are all effectively buried. There is also a reason for performing this correction before the following step 5. Specifically, the non-parallax mosaic image for generating the 2D image is generated while acquiring the tentative parallax image information that has undergone the left-right asymmetrical blur correction. Accordingly, since the Bayer arrangement image in which the double-line blur has been reduced even for the 2D image is generated, the effect of correction the asymmetry of the blur occurs not only in the stereoscopic display image but also in the 2D image.

5) Generation of the Non-Parallax Color Mosaic Image Resulting from the Left and Right Localized Luminance Distribution Correction (Local Gain Balance Correction)

Next, based on the same thinking as used for the global gain correction performed in step 1, the luminance of the left parallax pixels in the screen and the right parallax pixels in the screen are made to match, by performing a local gain correction in pixel units. As a result of this operation, the parallax between the left and right is eliminated. After this, the signal planes that have been averaged for the left and right and the imaging signal plane of the non-parallax pixels are also made to match. A new Bayer plane is thereby created in which all of the pixels have matching gain. This is equivalent to the replacement with an average value, and realizes a Bayer plane in which the parallax has been eliminated. This is written as $M_N(x, y)$.

In this case as well, there are two types of methods that can be used for the process of setting the target value to be taken as the reference point for each pixel and the process for eliminating the parallax between the left and right, which are a method selecting the arithmetic mean and a method selecting the geometric mean. When there is a mask area in which all of the non-parallax pixels are full-aperture, it is necessary to select the method using the arithmetic mean in order for the blur width of the subject image for which the parallax between the left and right has been eliminated to match the full-aperture blur width. On the other hand, if there is a mask area in which all of the non-parallax pixels are half-aperture, it is necessary to select the method using the geometric mean, in order for the blur width of the subject image in which the parallax between the left and right has been eliminated to match the half-aperture blur width.

Furthermore, the operation for obtaining the average between the signal plane in which the parallax between the left and right has been eliminated and the imaging signal plane of the non-parallax pixels must preserve the blur widths of these planes, since both already conform to the subject image having the same blur width. Accordingly, the geometric mean must be used for both planes at this time. The following provides detailed expressions for this operation.

a) When Using the Arithmetic Mean of the Left and Right Average Value of Each Pixel $$m_R(x,y) = \sqrt{R_N(x,y) \cdot \frac{R_{Lt}(x,y) + R_{Rt}(x,y)}{2}}$$

$$m_G(x,y) = \sqrt{G_N(x,y) \cdot \frac{G_{Lt}(x,y) + G_{Rt}(x,y)}{2}}$$

$$m_B(x,y) = \sqrt{B_N(x,y) \cdot \frac{B_{Lt}(x,y) + B_{Rt}(x,y)}{2}}$$

Gain Values for Each Non-Parallax Pixel $$g_{R_N}(x,y) = \frac{m_R(x,y)}{R_N(x,y)} = \sqrt{\frac{R_{Lt}(x,y) + R_{Rt}(x,y)}{2R_N(x,y)}}$$

$$g_{G_N}(x,y) = \frac{m_G(x,y)}{G_N(x,y)} = \sqrt{\frac{G_{Lt}(x,y) + G_{Rt}(x,y)}{2G_N(x,y)}}$$

$$g_{B_N}(x,y) = \frac{m_B(x,y)}{B_N(x,y)} = \sqrt{\frac{B_{Lt}(x,y) + B_{Rt}(x,y)}{2B_N(x,y)}}$$

Gain Values for Each Left Parallax Pixel $$g_{R_{Lt}}(x,y) = \frac{m_R(x,y)}{R_{Lt}(x,y)} = \sqrt{\frac{R_N(x,y)}{R_{Lt}(x,y)} \cdot \frac{R_{Lt}(x,y) + R_{Rt}(x,y)}{2R_{Lt}(x,y)}}$$

$$g_{G_{Lt}}(x,y) = \frac{m_G(x,y)}{R_{Lt}(x,y)} = \sqrt{\frac{G_N(x,y)}{G_{Lt}(x,y)} \cdot \frac{G_{Lt}(x,y) + G_{Rt}(x,y)}{2G_{Lt}(x,y)}}$$

$$g_{B_{Lt}}(x,y) = \frac{m_B(x,y)}{R_{Lt}(x,y)} = \sqrt{\frac{B_N(x,y)}{B_{Lt}(x,y)} \cdot \frac{B_{Lt}(x,y) + B_{Rt}(x,y)}{2B_{Lt}(x,y)}}$$

Gain Values for Each Right Parallax Pixel $$g_{R_{Rt}}(x,y) = \frac{m_R(x,y)}{R_{Rt}(x,y)} = \sqrt{\frac{R_N(x,y)}{R_{Rt}(x,y)} \cdot \frac{R_{Lt}(x,y) + R_{Rt}(x,y)}{2R_{Rt}(x,y)}}$$

$$g_{G_{Rt}}(x,y) = \frac{m_G(x,y)}{G_{Rt}(x,y)} = \sqrt{\frac{G_N(x,y)}{G_{Rt}(x,y)} \cdot \frac{G_{Lt}(x,y) + G_{Rt}(x,y)}{2G_{Rt}(x,y)}}$$

$$g_{B_{Rt}}(x,y) = \frac{m_B(x,y)}{B_{Rt}(x,y)} = \sqrt{\frac{B_N(x,y)}{B_{Rt}(x,y)} \cdot \frac{B_{Lt}(x,y) + B_{Rt}(x,y)}{2B_{Rt}(x,y)}}$$

Global Gain Correction for Each Non-Parallax Pixel $R_N(x,y) \cdot g_{R_N}(x,y) = m_R(x,y)$ $G_N(x,y) \cdot g_{G_N}(x,y) = m_G(x,y)$ $B_N(x,y) \cdot g_{B_N}(x,y) = m_B(x,y)$ Global Gain Correction for Each Left Parallax Pixel $R_{Lt}(x,y) \cdot g_{R_{Lt}}(x,y) = m_R(x,y)$ $G_{Lt}(x,y) \cdot g_{G_{Lt}}(x,y) = m_G(x,y)$ $B_{Lt}(x,y) \cdot g_{B_{Lt}}(x,y) = m_B(x,y)$ Global Gain Correction for Each Right Parallax Pixel $R_{Rt}(x,y) \cdot g_{R_{Rt}}(x,y) = m_R(x,y)$ $G_{Rt}(x,y) \cdot g_{G_{Rt}}(x,y) = m_G(x,y)$ $B_{Rt}(x,y) \cdot g_{B_{Rt}}(x,y) = m_B(x,y)$ b) When Using the Geometric Mean of the Left and Right Average Value of Each Pixel $$m_R(x,y) = \sqrt{R_N(x,y) \cdot \sqrt{R_{Lt}(x,y) \cdot R_{Rt}(x,y)}}$$

$$m_G(x,y) = \sqrt{G_N(x,y) \cdot \sqrt{G_{Lt}(x,y) \cdot G_{Rt}(x,y)}}$$

$$m_B(x,y) = \sqrt{B_N(x,y) \cdot \sqrt{B_{Lt}(x,y) \cdot B_{Rt}(x,y)}}$$

Gain Values for Each Non-Parallax Pixel $$g_{R_N}(x,y) = \frac{m_R(x,y)}{R_N(x,y)} = \sqrt{\frac{\sqrt{R_{Lt}(x,y) \cdot R_{Rt}(x,y)}}{R_N(x,y)}}$$

$$g_{G_N}(x,y) = \frac{m_G(x,y)}{G_N(x,y)} = \sqrt{\frac{\sqrt{R_{Lt}(x,y) \cdot R_{Rt}(x,y)}}{R_N(x,y)}}$$

$$g_{B_N}(x,y) = \frac{m_B(x,y)}{B_N(x,y)} = \sqrt{\frac{\sqrt{B_{Lt}(x,y) \cdot B_{Rt}(x,y)}}{B_N(x,y)}}$$

Gain Values for Each Left Parallax Pixel $$g_{R_{Lt}}(x,y) = \frac{m_R(x,y)}{R_{Lt}(x,y)} = \sqrt{\frac{R_N(x,y)}{R_{Lt}(x,y)} \cdot \sqrt{\frac{R_{Rt}(x,y)}{R_{Lt}(x,y)}}}$$

$$g_{G_{Lt}}(x,y) = \frac{m_G(x,y)}{G_{Lt}(x,y)} = \sqrt{\frac{G_N(x,y)}{G_{Lt}(x,y)} \cdot \sqrt{\frac{G_{Rt}(x,y)}{G_{Lt}(x,y)}}}$$

$$g_{B_{Lt}}(x,y) = \frac{m_B(x,y)}{B_{Lt}(x,y)} = \sqrt{\frac{B_N(x,y)}{B_{Lt}(x,y)} \cdot \sqrt{\frac{B_{Rt}(x,y)}{B_{Lt}(x,y)}}}$$

Gain Values for Each Right Parallax Pixel $$g_{R_{Rt}}(x,y) = \frac{m_R(x,y)}{R_{Rt}(x,y)} = \sqrt{\frac{R_N(x,y)}{R_{Rt}(x,y)} \cdot \sqrt{\frac{R_{Lt}(x,y)}{R_{Rt}(x,y)}}}$$

$$g_{G_{Rt}}(x,y) = \frac{m_G(x,y)}{G_{Rt}(x,y)} = \sqrt{\frac{G_N(x,y)}{G_{Rt}(x,y)} \cdot \sqrt{\frac{G_{Lt}(x,y)}{G_{Rt}(x,y)}}}$$

$$g_{B_{Rt}}(x,y) = \frac{m_B(x,y)}{B_{Rt}(x,y)} = \sqrt{\frac{B_N(x,y)}{B_{Rt}(x,y)} \cdot \sqrt{\frac{B_{Lt}(x,y)}{B_{Rt}(x,y)}}}$$

Global Gain Correction for Each Non-Parallax Pixel $$R_N(x,y) \cdot g_{R_N}(x,y) = m_R(x,y)$$

$$G_N(x,y) \cdot g_{G_N}(x,y) = m_G(x,y)$$

$$B_N(x,y) \cdot g_{B_N}(x,y) = m_B(x,y)$$

Global Gain Correction for Each Left Parallax Pixel $$R_{Lt}(x,y) \cdot g_{R_{Lt}}(x,y) = m_R(x,y)$$

$$G_{Lt}(x,y) \cdot g_{G_{Lt}}(x,y) = m_G(x,y)$$

$$B_{Lt}(x,y) \cdot g_{B_{Lt}}(x,y) = m_B(x,y)$$

Global Gain Correction for Each Right Parallax Pixel $$R_{Rt}(x,y) \cdot g_{R_{Rt}}(x,y) = m_R(x,y)$$

$$G_{Rt}(x,y) \cdot g_{G_{Rt}}(x,y) = m_G(x,y)$$

$$B_{Rt}(x,y) \cdot g_{B_{Rt}}(x,y) = m_B(x,y)$$

The data of the Bayer plane is overwritten with the average values of the image of the left viewpoint and the image of the right viewpoint and the new non-parallax pixel values that are the pixel values obtained as the average values of the pixels of the reference viewpoint image that does not have a parallax, and the result is output as the image $M_N(x, y)$ having a non-parallax Bayer plane.

6) Generation of the Non-Parallax Reference Image

A widely known Bayer interpolation technique (demosaicing process) is used. For example, please see U.S. Pat. No. 8,259,213 from the same inventor as the present application. This image can be used to print out a normal 2D image with high resolution as-is.

7) Generation of the Actual Parallax Images

Using the tentative left parallax color images RLt(x, y), GLt(x, y), and BLt(x, y) with low resolution generated in step 3 and the non-parallax color images RN(x, y), GN(x, y), and BN(x, y) with high resolution generated as an intermediate process in step 5, left parallax color images color images R'Lt(x, y), G'Lt(x, y), and B'Lt(x, y) that have high resolution and are to actually be output are generated. In the same manner, using the tentative right parallax color images RRt(x, y), GRt(x, y), and BRt(x, y) with low resolution generated in step 3 and the non-parallax color images RN(x, y), GN(x, y), and BN(x, y) with high resolution generated as an intermediate process in step 5, right parallax color images color images R'Rt(x, y), G'Rt(x, y), and B'Rt(x, y) that have high resolution and are to actually be output are generated.

There are two methods considered for the parallax modulation, which are a method using the arithmetic mean as a reference point and a method using the geometric mean as a reference point. Either method can be used to realize the parallax modulation effect, but the method using the arithmetic mean as the reference point is adopted when the aperture mask of the non-parallax pixels of the image sensor is full-aperture and the method using the geometric mean as the reference point is adopted when the aperture mask of the non-parallax pixels of the image sensor is half-aperture in the same manner as the parallax pixels. Accordingly, in the present embodiment example, the method using the arithmetic mean as the reference point is used.

a) Parallax Modulation with the Arithmetic Mean as a Reference Point

Left Parallax Modulation $$R'_{Rt}(x, y) = R_N(x, y) \frac{2R_{Rt}(x, y)}{R_{Lt}(x, y) + R_{Rt}(x, y)} \frac{2G_{Rt}(x, y)}{G_{Lt}(x, y) + G_{Rt}(x, y)} \frac{2B_{Rt}(x, y)}{B_{Lt}(x, y) + B_{Rt}(x, y)}$$

$$G'_{Rt}(x, y) = G_N(x, y) \frac{2R_{Rt}(x, y)}{R_{Lt}(x, y) + R_{Rt}(x, y)} \frac{2G_{Rt}(x, y)}{G_{Lt}(x, y) + G_{Rt}(x, y)} \frac{2B_{Rt}(x, y)}{B_{Lt}(x, y) + B_{Rt}(x, y)}$$

$$B'_{Rt}(x, y) = B_N(x, y) \frac{2R_{Rt}(x, y)}{R_{Lt}(x, y) + R_{Rt}(x, y)} \frac{2G_{Rt}(x, y)}{G_{Lt}(x, y) + G_{Rt}(x, y)} \frac{2B_{Rt}(x, y)}{B_{Lt}(x, y) + B_{Rt}(x, y)}$$

Right Parallax Modulation $$R'_{Lt}(x, y) = R_N(x, y) \frac{R_{Rt}(x, y)}{\sqrt{R_{Lt}(x, y) \cdot R_{Rt}(x, y)}} \frac{G_{Rt}(x, y)}{\sqrt{G_{Lt}(x, y) \cdot G_{Rt}(x, y)}} \frac{B_{Rt}(x, y)}{\sqrt{B_{Lt}(x, y) \cdot B_{Rt}(x, y)}}$$

$$G'_{Rt}(x, y) = G_N(x, y) \frac{R_{Rt}(x, y)}{\sqrt{R_{Lt}(x, y) \cdot R_{Rt}(x, y)}} \frac{G_{Rt}(x, y)}{\sqrt{G_{Lt}(x, y) \cdot G_{Rt}(x, y)}} \frac{B_{Rt}(x, y)}{\sqrt{B_{Lt}(x, y) \cdot B_{Rt}(x, y)}}$$

$$B'_{Rt}(x, y) = B_N(x, y) \frac{R_{Rt}(x, y)}{\sqrt{R_{Lt}(x, y) \cdot R_{Rt}(x, y)}} \frac{G_{Rt}(x, y)}{\sqrt{G_{Lt}(x, y) \cdot G_{Rt}(x, y)}} \frac{B_{Rt}(x, y)}{\sqrt{B_{Li}(x, y) \cdot B_{Rt}(x, y)}}$$

b) Parallax Modulation with the Geometric Mean as a Reference Point

Left Parallax Modulation $$R'_{Lt}(x, y) = R_N(x, y) \frac{R_{Lt}(x, y)}{\sqrt{R_{Lt}(x, y) \cdot R_{Rt}(x, y)}} \frac{G_{Lt}(x, y)}{\sqrt{G_{Lt}(x, y) \cdot G_{Rt}(x, y)}} \frac{B_{Lt}(x, y)}{\sqrt{B_{Lt}(x, y) \cdot B_{Rt}(x, y)}}$$

$$G'_{Lt}(x, y) = G_N(x, y) \frac{R_{Lt}(x, y)}{\sqrt{R_{Lt}(x, y) \cdot R_{Rt}(x, y)}} \frac{G_{Lt}(x, y)}{\sqrt{G_{Lt}(x, y) \cdot G_{Rt}(x, y)}} \frac{B_{Lt}(x, y)}{\sqrt{B_{Lt}(x, y) \cdot B_{Rt}(x, y)}}$$

$$B'_{Lt}(x, y) = B_N(x, y) \frac{R_{Lt}(x, y)}{\sqrt{R_{Lt}(x, y) \cdot R_{Rt}(x, y)}} \frac{G_{Lt}(x, y)}{\sqrt{G_{Lt}(x, y) \cdot G_{Rt}(x, y)}} \frac{B_{Lt}(x, y)}{\sqrt{B_{Li}(x, y) \cdot B_{Rt}(x, y)}}$$

Right Parallax Modulation $$R'_{Lt}(x, y) = R_N(x, y) \frac{2R_{Lt}(x, y)}{R_{Lt}(x, y) + R_{Rt}(x, y)} \frac{2G_{Lt}(x, y)}{G_{Lt}(x, y) + G_{Rt}(x, y)} \frac{2B_{Lt}(x, y)}{B_{Lt}(x, y) + B_{Rt}(x, y)}$$

-continued $$G'_{Lt}(x, y) = G_N(x, y) \frac{2R_{Lt}(x, y)}{R_{Lt}(x, y) + R_{Rt}(x, y)}$$

$$\frac{2G_{Lt}(x, y)}{G_{Lt}(x, y) + G_{Rt}(x, y)} \frac{2B_{Lt}(x, y)}{B_{Lt}(x, y) + B_{Rt}(x, y)}$$

$$B'_{Lt}(x, y) = B_N(x, y) \frac{2R_{Lt}(x, y)}{R_{Lt}(x, y) + R_{Rt}(x, y)}$$

$$\frac{2G_{Lt}(x, y)}{G_{Lt}(x, y) + G_{Rt}(x, y)} \frac{2B_{Lt}(x, y)}{B_{Lt}(x, y) + B_{Rt}(x, y)}$$

When the Above Expressions are Rewritten
Left Parallax Modulation $$R'_{Lt}(x, y) = R_N(x, y) \sqrt{\frac{R_{Lt}(x, y)}{R_{Rt}(x, y)}} \sqrt{\frac{G_{Lt}(x, y)}{G_{Rt}(x, y)}} \sqrt{\frac{B_{Lt}(x, y)}{B_{Rt}(x, y)}}$$

$$G'_{Lt}(x, y) = G_N(x, y) \sqrt{\frac{R_{Lt}(x, y)}{R_{Rt}(x, y)}} \sqrt{\frac{G_{Lt}(x, y)}{G_{Rt}(x, y)}} \sqrt{\frac{B_{Lt}(x, y)}{B_{Rt}(x, y)}}$$

$$B'_{Lt}(x, y) = B_N(x, y) \sqrt{\frac{R_{Lt}(x, y)}{R_{Rt}(x, y)}} \sqrt{\frac{G_{Lt}(x, y)}{G_{Rt}(x, y)}} \sqrt{\frac{B_{Lt}(x, y)}{B_{Rt}(x, y)}}$$

Right Parallax Modulation $$R'_{Rt}(x, y) = R_N(x, y) \sqrt{\frac{R_{Rt}(x, y)}{R_{Lt}(x, y)}} \sqrt{\frac{G_{Rt}(x, y)}{G_{Lt}(x, y)}} \sqrt{\frac{B_{Rt}(x, y)}{B_{Lt}(x, y)}}$$

$$G'_{Rt}(x, y) = G_N(x, y) \sqrt{\frac{R_{Rt}(x, y)}{R_{Lt}(x, y)}} \sqrt{\frac{G_{Rt}(x, y)}{G_{Lt}(x, y)}} \sqrt{\frac{B_{Rt}(x, y)}{B_{Lt}(x, y)}}$$

$$B'_{Rt}(x, y) = B_N(x, y) \sqrt{\frac{R_{Rt}(x, y)}{R_{Lt}(x, y)}} \sqrt{\frac{G_{Rt}(x, y)}{G_{Lt}(x, y)}} \sqrt{\frac{B_{Rt}(x, y)}{B_{Lt}(x, y)}}$$

8) Conversion to Output Color Space

The non-parallax intermediate color images RN(x, y), GN(x, y), and BN(x, y) with high resolution, the left parallax color images RLt(x, y), GLt(x, y), and BLt(x, y) with high resolution, and the right parallax color images RRt(x, y), GRt(x, y), and BRt(x, y) with high resolution obtained in this manner each undergo a gamma conversion and a color matrix conversion from the camera RGB of the spectral characteristics of the sensor to a standard sRGB color space, and are then output as images in the output color space.

Only the portion of the process described above relating to the relationship between the gain correction and parallax amount and the asymmetry correction of the blur is extracted and summarized once again. For ease of explanation, only a case in which the geometric average is used as the reference point for the gain correction is discussed.

In the local gain balance correction, in order to generate the 2D image, the gain balance matching and parallax elimination between the Lt image and the Rt image are performed simultaneously, and the 2D image shading correction is introduced. The expression at the core of this operation includes performing the gain correction shown below on each of the left parallax image and the right parallax image.

$$g_{Lt}^{(2D)}(x, y) = \sqrt{\frac{R(x, y)}{L(x, y)}}$$

$$g_{Rt}^{(2D)}(x, y) = \sqrt{\frac{L(x, y)}{R(x, y)}}$$

One of the processes for generating the 3D image through parallax modulation from the 2D image has a core expression that includes performing the gain correction shown below on the non-parallax image.

$$Lt'(x, y) = N(x, y) \sqrt{\frac{Lt(x, y)}{Rt(x, y)}}$$

$$Rt'(x, y) = N(x, y) \sqrt{\frac{Rt(x, y)}{Lt(x, y)}}$$

In other words, the expression for the local gain balance correction has an inverse relationship with respect to the expression for the parallax modulation, and is associated with parallax elimination.

Furthermore, the process of performing the shading correction and the left-right asymmetry correction of the blur for the 3D image, i.e. the regional gain balance correction, has a core expression that includes performing the gain correction shown below on the parallax images.

$$g_{Lt}^{(3D)}(x) = \sqrt{\frac{\langle Rt(x) \rangle}{\langle Lt(x) \rangle}}$$

$$g_{Rt}^{(3D)}(x) = \sqrt{\frac{\langle Lt(x) \rangle}{\langle Rt(x) \rangle}}$$

This fulfills the role of extracting the blur characteristic information and the shading information without loss, even though the parallax information is lost by taking the local average over a larger area.

The three processes described above can be said to be computations using the unique nature derived from the one-to-one correspondence relationship between the blur and the parallax in single-lens stereoscopic imaging.

In the description relating to the third embodiment example above, the geometric mean is used in the operation to acquire the average between the signal plane in which the parallax between the left and right has been eliminated and the imaging signal plane of the non-parallax pixels, in order to realize a common blur width. When calculating the geometric mean of the pixel values of the non-parallax pixels and the average values of the left and right parallax pixels, the weighting for these pixel values and the weighting for these average values has a uniform distribution. However, the number of parallax pixels is less than the number of non-parallax pixels. In addition, the resolution power of the parallax images is less than the resolution power of the non-parallax images. As described above, while the Nyquist limit performance of the non-parallax images RN and BN is in a region formed by joining [±π/(2a), ±π/(2a)] and ky=[±π/(2a), ±π/(2a)], the Nyquist limit performance of the parallax images GLt and GRt is in a region formed by joining [±π/(4a), ±π/(4a)] and ky=[±π/(4a), ±π/(4a)]. Accordingly, when the weighting is distributed uniformly to the pixel values of the non-parallax pixels and the average values of the left and right parallax pixels, the resolution power of the resulting image drops overall due to the effect of the resolution power of the parallax images. Accordingly, some technique is necessary to make the resolution power as close as possible to the resolution power of the non-parallax images. Therefore, the geometric mean may be used in consideration of the density ratio of the parallax pixels and the non-parallax pixels in the pixel arrangement on the image sensor. Specifically, the ratio between the non-parallax pixels (N), the left parallax pixels (Lt) and the right parallax pixels (Rt) used in the third embodiment example are N:Lt:Rt=6:1:1, in other words N:(Lt+Rt)=3:1, and therefore a weighting of 3/4 is applied to the non-parallax image and a weighting of 1/4 is applied to the parallax images, such that the distribution gives more importance to the non-parallax images that have high density.

In the manner described above, there are two methods for eliminating the parallax between the left and right, which are a method selecting the arithmetic mean and a method selecting the geometric mean. In a case where there is a mask area in which all of the non-parallax pixels are full-aperture, the arithmetic mean may be selected in order for the blur width of the subject image in which the parallax between the left and right has been eliminated to match the full-aperture blur width. Section a) below shows a case in which the arithmetic mean is selected.

a) When Using the Arithmetic Mean of the Left and Right Average Value of Each Pixel $$m_R(x, y) = [R_N(x, y)]^{\frac{3}{4}} \cdot \left[\frac{R_{Lt}(x, y) + R_{Rt}(x, y)}{2}\right]^{\frac{1}{4}}$$

$$m_G(x, y) = [G_N(x, y)]^{\frac{3}{4}} \cdot \left[\frac{G_{Lt}(x, y) + G_{Rt}(x, y)}{2}\right]^{\frac{1}{4}}$$

$$m_B(x, y) = [B_N(x, y)]^{\frac{3}{4}} \cdot \left[\frac{B_{Lt}(x, y) + B_{Rt}(x, y)}{2}\right]^{\frac{1}{4}}$$

Gain Values for Each Non-Parallax Pixel $$g_{R_N}(x, y) = \frac{m_R(x, y)}{R_N(x, y)} = \sqrt[4]{\frac{R_{Lt}(x, y) + R_{Rt}(x, y)}{2R_N(x, y)}}$$

$$g_{G_N}(x, y) = \frac{m_G(x, y)}{R_N(x, y)} = \sqrt[4]{\frac{G_{Lt}(x, y) + G_{Rt}(x, y)}{2G_N(x, y)}}$$

$$g_{B_N}(x, y) = \frac{m_B(x, y)}{R_N(x, y)} = \sqrt[4]{\frac{B_{Lt}(x, y) + B_{Rt}(x, y)}{2B_N(x, y)}}$$

Gain Values for Each Left Parallax Pixel $$g_{R_{Lt}}(x, y) = \frac{m_R(x, y)}{R_{Lt}(x, y)} = \left[\frac{R_N(x, y)}{R_{Lt}(x, y)}\right]^{\frac{3}{4}} \cdot \left[\frac{R_{lt}(x, y) + R_{Rt}(xy)}{2R_{Lt}(x, y)}\right]^{\frac{1}{4}}$$

$$g_{G_{Lt}}(x, y) = \frac{m_G(x, y)}{G_{Lt}(x, y)} = \left[\frac{G_N(x, y)}{G_{Lt}(x, y)}\right]^{\frac{3}{4}} \cdot \left[\frac{G_{Lt}(x, y) + G_{Rt}(x, y)}{2G_{Lt}(x, y)}\right]^{\frac{1}{4}}$$

$$g_{B_{Lt}}(x, y) = \frac{m_B(x, y)}{B_{Lt}(x, y)} = \left[\frac{B_N(x, y)}{B_{Lt}(x, y)}\right]^{\frac{3}{4}} \cdot \left[\frac{B_{Lt}(x, y) + B_{Rt}(x, y)}{2B_{Lt}(x, y)}\right]^{\frac{1}{4}}$$

Gain Values for Each Right Parallax Pixel $$g_{R_{Rt}}(x, y) = \frac{m_R(x, y)}{R_{Rt}(x, y)} = \left[\frac{R_N(x, y)}{R_{Rt}(x, y)}\right]^{\frac{3}{4}} \cdot \left[\frac{R_{Lt}(x, y) + R_{Rt}(x, y)}{2R_{Rt}(x, y)}\right]^{\frac{1}{4}}$$

$$g_{G_{Rt}}(x, y) = \frac{m_G(x, y)}{G_{Rt}(x, y)} = \left[\frac{G_N(x, y)}{G_{Rt}(x, y)}\right]^{\frac{3}{4}} \cdot \left[\frac{G_{Lt}(x, y) + G_{Rt}(x, y)}{2G_{Rt}(x, y)}\right]^{\frac{1}{4}}$$

$$g_{B_{Rt}}(x, y) = \frac{m_B(x, y)}{B_{Rt}(x, y)} = \left[\frac{B_N(x, y)}{B_{Rt}(x, y)}\right]^{\frac{3}{4}} \cdot \left[\frac{B_{Lt}(x, y) + B_{Rt}(x, y)}{2B_{Rt}(x, y)}\right]^{\frac{1}{4}}$$

On the other hand, in a case where there is a mask area in which all of the non-parallax pixels are half-aperture, the geometric mean may be selected in order for the blur width of the subject image in which the parallax between the left and right has been eliminated to match the half-aperture blur width. Section b) below shows a case in which the geometric mean is selected.

b) When Using the Geometric Mean of the Left and Right Average Value of Each Pixel $$m_R(x, y) - [R_N(x, y)]^{\frac{3}{4}} \cdot \left[\sqrt{R_{Lt}(x, y) \cdot R_{Rt}(x, y)}\right]^{\frac{1}{4}}$$

$$m_G(x, y) - [G_N(x, y)]^{\frac{3}{4}} \cdot \left[\sqrt{G_{Lt}(x, y) \cdot G_{Rt}(x, y)}\right]^{\frac{1}{4}}$$

$$m_B(x, y) - [B_N(x, y)]^{\frac{3}{4}} \cdot \left[\sqrt{B_{Lt}(x, y) \cdot B_{Rt}(x, y)}\right]^{\frac{1}{4}}$$

Gain Values for Each Non-Parallax Pixel $$g_{R_N}(x, y) = \frac{m_R(x, y)}{R_N(x, y)} = \sqrt[4]{\frac{\sqrt{R_{Lt}(x, y) \cdot R_{Rt}(x, y)}}{R_N(x, y)}}$$

$$g_{G_N}(x, y) = \frac{m_G(x, y)}{G_N(x, y)} = \sqrt[4]{\frac{\sqrt{G_{Lt}(x, y) \cdot G_{Rt}(x, y)}}{G_N(x, y)}}$$

$$g_{B_N}(x, y) = \frac{m_B(x, y)}{B_N(x, y)} = \sqrt[4]{\frac{\sqrt{B_{Lt}(x, y) \cdot B_{Rt}(x, y)}}{B_N(x, y)}}$$

Gain Values for Each Left Parallax Pixel $$g_{R_{Lt}}(x, y) = \frac{m_R(x, y)}{R_{Lt}(x, y)} = \left[\frac{R_N(x, y)}{R_{Lt}(x, y)}\right]^{\frac{3}{4}} \cdot \left[\sqrt{\frac{R_{Rt}(x, y)}{R_{Lt}(x, y)}}\right]^{\frac{1}{4}}$$

$$g_{G_{Lt}}(x, y) = \frac{m_G(x, y)}{G_{Lt}(x, y)} = \left[\frac{G_N(x, y)}{G_{Lt}(x, y)}\right]^{\frac{3}{4}} \cdot \left[\sqrt{\frac{G_{Rt}(x, y)}{G_{Lt}(x, y)}}\right]^{\frac{1}{4}}$$

$$g_{B_{Lt}}(x, y) = \frac{m_B(x, y)}{B_{Lt}(x, y)} = \left[\frac{B_N(x, y)}{B_{Lt}(x, y)}\right]^{\frac{3}{4}} \cdot \left[\sqrt{\frac{B_{Rt}(x, y)}{B_{Lt}(x, y)}}\right]^{\frac{1}{4}}$$

Gain Values for Each Right Parallax Pixel $$g_{R_{Rt}}(x, y) = \frac{m_R(x, y)}{R_{Rt}(x, y)} = \left[\frac{R_N(x, y)}{R_{Rt}(x, y)}\right]^{\frac{3}{4}} \cdot \left[\sqrt{\frac{R_{Lt}(x, y)}{R_{Rt}(x, y)}}\right]^{\frac{1}{4}}$$

$$g_{G_{Rt}}(x, y) = \frac{m_G(x, y)}{G_{Rt}(x, y)} = \left[\frac{G_N(x, y)}{G_{Rt}(x, y)}\right]^{\frac{3}{4}} \cdot \left[\sqrt{\frac{G_{Lt}(x, y)}{G_{Rt}(x, y)}}\right]^{\frac{1}{4}}$$

$$g_{B_{Rt}}(x, y) = \frac{m_B(x, y)}{B_{Rt}(x, y)} = \left[\frac{B_N(x, y)}{B_{Rt}(x, y)}\right]^{\frac{3}{4}} \cdot \left[\sqrt{\frac{B_{Lt}(x, y)}{B_{Rt}(x, y)}}\right]^{\frac{1}{4}}$$

Furthermore, when performing the parallax modulation, it is possible to take the geometric mean in consideration of the RGB density ratio among the parallax pixels in the pixel arrangement on the image sensor. Specifically, the R:G:B ratio among the left parallax pixels is 1:2:1 and the R:G:B ratio among the right parallax pixels is 1:2:1, and therefore a weighting of 1/4 is applied to the parallax modulation with the R component, a weighting of 1/2 is applied to the parallax modulation with the G component, and a weighting of 1/4 is applied to the parallax modulation with the B component, thereby realizing a distribution that places more importance on the parallax modulation with the G component that has high density. Section a) below shows parallax modulation in which the arithmetic mean is the reference point.

a) Parallax Modulation with the Arithmetic Mean as a Reference Point

Left Parallax Modulation $$R'_{Lt}(x, y) = R_N(x, y) \sqrt[4]{\frac{2 R_{Lt}(x, y)}{R_{Lt}(x, y) + R_{Rt}(x, y)}}$$

$$\sqrt{\frac{2 G_{Lt}(x, y)}{G_{Lt}(x, y) + G_{Rt}(x, y)}} \sqrt{\frac{2 B_{Lt}(x, y)}{B_{Lt}(x, y) + B_{Rt}(x, y)}}$$

$$G'_{Lt}(x, y) = G_N(x, y) \sqrt[4]{\frac{2 R_{Lt}(x, y)}{R_{Lt}(x, y) + R_{Rt}(x, y)}}$$

$$\sqrt{\frac{2 G_{Lt}(x, y)}{G_{Lt}(x, y) + G_{Rt}(x, y)}} \sqrt{\frac{2 B_{Lt}(x, y)}{B_{Lt}(x, y) + B_{Rt}(x, y)}}$$

$$B'_{Lt}(x, y) = B_N(x, y) \sqrt[4]{\frac{2 R_{Lt}(x, y)}{R_{Lt}(x, y) + R_{Rt}(x, y)}}$$

$$\sqrt{\frac{2 G_{Lt}(x, y)}{G_{Lt}(x, y) + G_{Rt}(x, y)}} \sqrt{\frac{2 B_{Lt}(x, y)}{B_{Lt}(x, y) + B_{Rt}(x, y)}}$$

Right Parallax Modulation $$R'_{Rt}(x, y) = R_N(x, y) \sqrt[4]{\frac{2 R_{Rt}(x, y)}{R_{Lt}(x, y) + R_{Rt}(x, y)}}$$

$$\sqrt{\frac{2 G_{Rt}(x, y)}{G_{Lt}(x, y) + G_{Rt}(x, y)}} \sqrt{\frac{2 B_{Rt}(x, y)}{B_{Lt}(x, y) + B_{Rt}(x, y)}}$$

$$G'_{Rt}(x, y) = G_N(x, y) \sqrt[4]{\frac{2 R_{Rt}(x, y)}{R_{Lt}(x, y) + R_{Rt}(x, y)}}$$

$$\sqrt{\frac{2 G_{Rt}(x, y)}{G_{Lt}(x, y) + G_{Rt}(x, y)}} \sqrt{\frac{2 B_{Rt}(x, y)}{B_{Lt}(x, y) + B_{Rt}(x, y)}}$$

$$B'_{Rt}(x, y) = B_N(x, y) \sqrt[4]{\frac{2 R_{Rt}(x, y)}{R_{Lt}(x, y) + R_{Rt}(x, y)}}$$

$$\sqrt{\frac{2 G_{Rt}(x, y)}{G_{Lt}(x, y) + G_{Rt}(x, y)}} \sqrt{\frac{2 B_{Rt}(x, y)}{B_{Lt}(x, y) + B_{Rt}(x, y)}}$$

Section b) below shows parallax modulation in which the geometric mean is the reference point.

b) Parallax Modulation with the Geometric Mean as a Reference Point

Left Parallax Modulation $$R'_{Lt}(x, y) = R_N(x, y) \sqrt[4]{\frac{R_{Lt}(x, y)}{\sqrt{R_{Lt}(x, y) \cdot R_{Rt}(x, y)}}}$$

$$\sqrt{\frac{G_{Lt}(x, y)}{\sqrt{G_{Lt}(x, y) \cdot G_{Rt}(x, y)}}} \sqrt{\frac{B_{Lt}(x, y)}{\sqrt{B_{Lt}(x, y) \cdot B_{Rt}(x, y)}}}$$

$$G'_{Lt}(x, y) = G_N(x, y) \sqrt[4]{\frac{R_{Lt}(x, y)}{\sqrt{R_{Lt}(x, y) \cdot R_{Rt}(x, y)}}}$$

$$\sqrt{\frac{G_{Lt}(x, y)}{\sqrt{G_{Lt}(x, y) \cdot G_{Rt}(x, y)}}} \sqrt{\frac{B_{Lt}(x, y)}{\sqrt{B_{Lt}(x, y) \cdot B_{Rt}(x, y)}}}$$

$$B'_{Lt}(x, y) = B_N(x, y) \sqrt[4]{\frac{R_{Lt}(x, y)}{\sqrt{R_{Lt}(x, y) \cdot R_{Rt}(x, y)}}}$$

$$\sqrt{\frac{G_{Lt}(x, y)}{\sqrt{G_{Lt}(x, y) \cdot G_{Rt}(x, y)}}} \sqrt{\frac{B_{Lt}(x, y)}{\sqrt{B_{Lt}(x, y) \cdot B_{Rt}(x, y)}}}$$

Right Parallax Modulation $$R'_{Rt}(x, y) = R_N(x, y) \sqrt[4]{\frac{R_{Rt}(x, y)}{\sqrt{R_{Lt}(x, y) \cdot R_{Rt}(x, y)}}}$$

$$\sqrt{\frac{G_{Rt}(x, y)}{\sqrt{G_{Lt}(x, y) \cdot G_{Rt}(x, y)}}} \sqrt{\frac{B_{Rt}(x, y)}{\sqrt{B_{Lt}(x, y) \cdot B_{Rt}(x, y)}}}$$

$$G'_{Rt}(x, y) = G_N(x, y) \sqrt[4]{\frac{R_{Rt}(x, y)}{\sqrt{R_{Lt}(x, y) \cdot R_{Rt}(x, y)}}}$$

$$\sqrt{\frac{G_{Rt}(x, y)}{\sqrt{G_{Lt}(x, y) \cdot G_{Rt}(x, y)}}} \sqrt{\frac{B_{Rt}(x, y)}{\sqrt{B_{Lt}(x, y) \cdot B_{Rt}(x, y)}}}$$

$$B'_{Rt}(x, y) = B_N(x, y) \sqrt[4]{\frac{R_{Rt}(x, y)}{\sqrt{R_{Lt}(x, y) \cdot R_{Rt}(x, y)}}}$$

$$\sqrt{\frac{G_{Rt}(x, y)}{\sqrt{G_{Lt}(x, y) \cdot G_{Rt}(x, y)}}} \sqrt{\frac{B_{Rt}(x, y)}{\sqrt{B_{Lt}(x, y) \cdot B_{Rt}(x, y)}}}$$

When the Above Expressions are Rewritten

Left Parallax Modulation $$R'_{Lt}(x, y) = R_N(x, y) \sqrt[4]{\sqrt{\frac{R_{Lt}(x, y)}{R_{Rt}(x, y)}}} \sqrt{\sqrt{\frac{G_{Lt}(x, y)}{G_{Rt}(x, y)}}} \sqrt[4]{\sqrt{\frac{B_{Lt}(x, y)}{B_{Rt}(x, y)}}}$$

$$G'_{Lt}(x, y) = G_N(x, y) \sqrt[4]{\sqrt{\frac{R_{Lt}(x, y)}{R_{Rt}(x, y)}}} \sqrt{\sqrt{\frac{G_{Lt}(x, y)}{G_{Rt}(x, y)}}} \sqrt[4]{\sqrt{\frac{B_{Lt}(x, y)}{B_{Rt}(x, y)}}}$$

$$B'_{Lt}(x, y) = B_N(x, y) \sqrt[4]{\sqrt{\frac{R_{Lt}(x, y)}{R_{Rt}(x, y)}}} \sqrt{\sqrt{\frac{G_{Lt}(x, y)}{G_{Rt}(x, y)}}} \sqrt[4]{\sqrt{\frac{B_{Lt}(x, y)}{B_{Rt}(x, y)}}}$$

Right Parallax Modulation $$R'_{Rt}(x, y) = R_N(x, y) \sqrt[4]{\sqrt{\frac{R_{Rt}(x, y)}{R_{Lt}(x, y)}}} \sqrt[4]{\sqrt{\frac{G_{Rt}(x, y)}{G_{Lt}(x, y)}}} \sqrt[4]{\sqrt{\frac{B_{Rt}(x, y)}{B_{Lt}(x, y)}}}$$

$$G'_{Rt}(x, y) = G_N(x, y) \sqrt[4]{\sqrt{\frac{R_{Rt}(x, y)}{R_{Lt}(x, y)}}} \sqrt{\sqrt{\frac{G_{Rt}(x, y)}{G_{Lt}(x, y)}}} \sqrt[4]{\sqrt{\frac{B_{Rt}(x, y)}{B_{Lt}(x, y)}}}$$

$$B'_{Rt}(x, y) = B_N(x, y) \sqrt[4]{\sqrt{\frac{R_{Rt}(x, y)}{R_{Lt}(x, y)}}} \sqrt[4]{\sqrt{\frac{G_{Rt}(x, y)}{G_{Lt}(x, y)}}} \sqrt{\sqrt{\frac{B_{Rt}(x, y)}{B_{Lt}(x, y)}}}$$

(Additional Note)

Combining the parallax control means of the second embodiment example with the arrangement of the third embodiment example is obvious from the relationship between the first embodiment example and the second embodiment example, and therefore a description of such a combination is omitted.

A personal computer can be made to function as the image processing device that fulfills the functions of the image data generating section 230, the smoothed data generating section 231, the target image data generating section 232, and the gain correcting section 233. The image processing device may acquire parallax image data from another apparatus, such as a camera. In this case, the image data generating section 230 fulfills the role of an image data acquiring section. In a case where the image data generating section 230 generates the parallax image data by itself, it can still be said that the image data generating section 230 acquires the parallax image data by generating this data itself. The image processing device is not limited to a personal computer, and can be realized in various forms. For example, the image processing device can be a device that includes a display section such as a TV, mobile telephone, or game device, or a device that is connected to the display section. The images in the above description can refer to image data or to an actual subject image that is visible as a result of being expanded according to a certain format.

Second Embodiment

Figure 13:
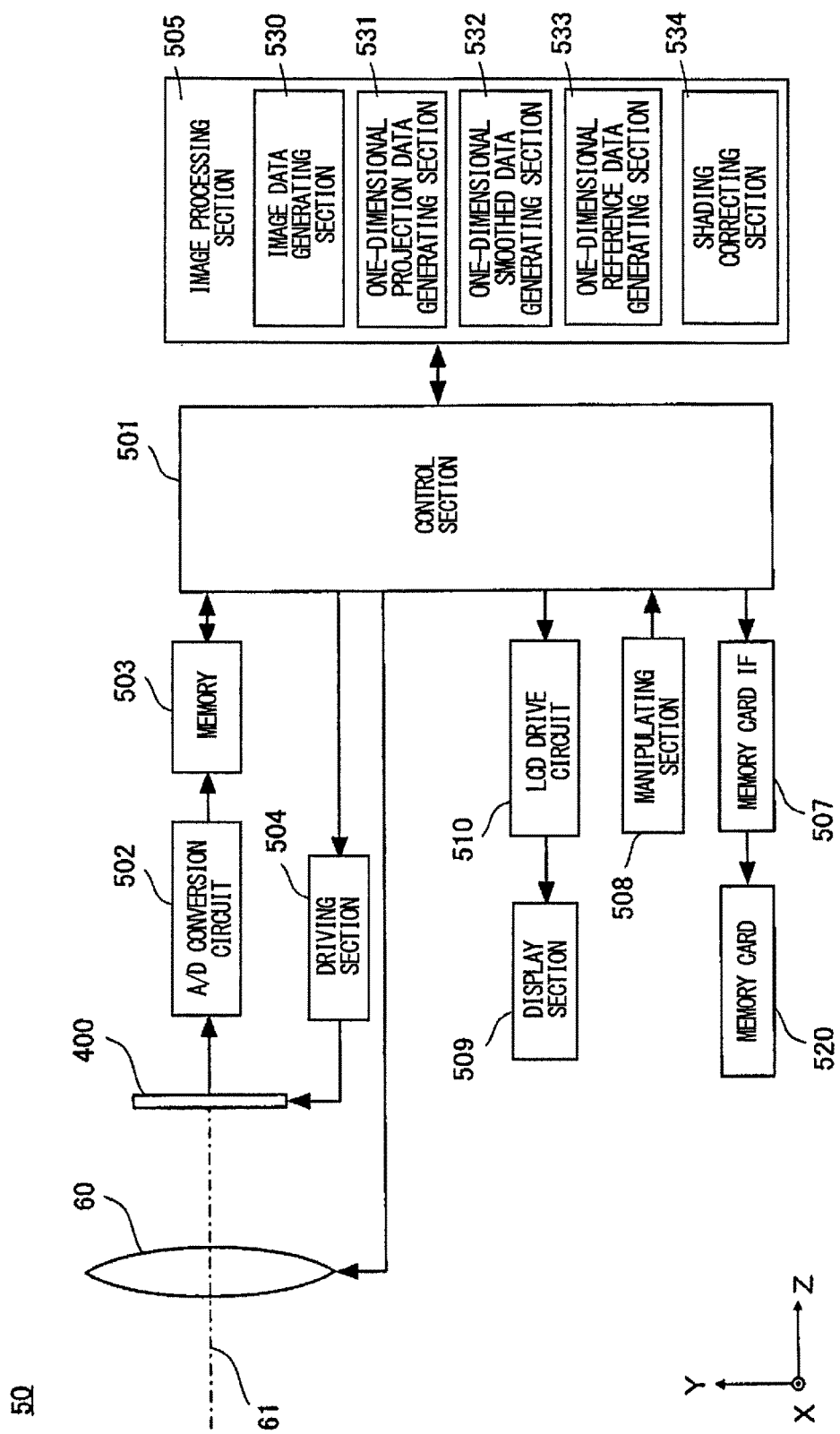
FIG. 13 is a drawing for describing the configuration of a digital camera according to an embodiment of the present invention.
Figure 14A:
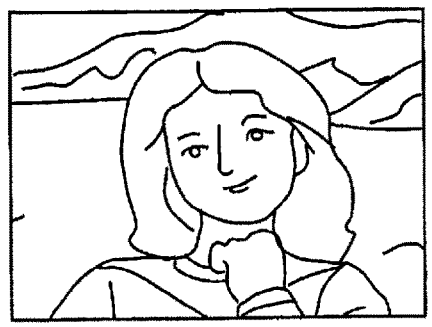
FIG. 14-A shows a captured image displayed in the display section.
Figure 14B:
Figure 14B:
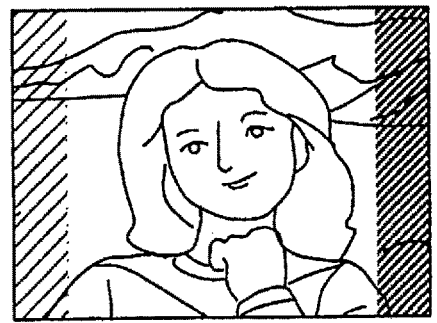
Figure 14C:
Figure 14C:
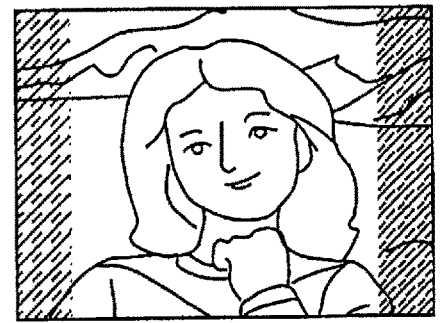

FIG. 13 is a drawing for describing the configuration of a digital camera 10 according to an embodiment of the present invention. The digital camera 50 includes an imaging lens 60 as an imaging optical system, and guides subject light incident thereto along an optical axis 61 to an image sensor 400. The imaging lens 60 may be a replaceable lens that can be attached to and detached from the digital camera 50. The digital camera 50 includes an image sensor 400, a control section 501, an A/D conversion circuit 502, a memory 503, a driving section 504, an image processing section 505, a memory card IF 507, a manipulating section 508, a display section 509, and an LCD drive circuit 510.

As shown in the drawing, the direction parallel to the optical axis 61 toward the image sensor 400 is defined as the +Z axis direction, the direction moving into the paper in the plane orthogonal to the Z axis is defined as the +X axis direction, and the direction toward the top of the paper is the +Y axis direction. The orientation of this structural drawing during imaging is such that the X axis is the horizontal direction and the Y axis is the vertical direction.

The imaging lens 60 is formed from a plurality of optical lenses, and focuses subject light from a scene at a position near a focal plane. For ease of description, FIG. 13 shows a single virtual lens arranged near the pupil to represent the imaging lens 60.

The image sensor 400 is arranged near the focal plane of the imaging lens 60. The image sensor 400 is an image sensor such as a CCD or CMOS sensor, in which a plurality of photoelectric converting elements are arranged two-dimensionally. The image sensor 400 experiences timing control from the driving section 504, to convert a subject image formed on a light receiving surface into an image signal and to output this image signal to the A/D conversion circuit 502. The image signal output to the A/D conversion circuit 502 includes image signals of a left viewpoint and a right viewpoint.

The A/D conversion circuit 502 converts the image signal output by the image sensor 400 into a digital image signal, and outputs this digital image signal to the memory 503. The image processing section 505 performs various types of image processing, using the memory 503 as a work space, to generate image data. In particular the image processing section 505 includes an image data generating section 530, a one-dimensional projection data generating section 531, a one-dimensional smoothed data generating section 532, a one-dimensional reference data generating section 533, and a shading correcting section 534.

The image data generating section 530 uses the left viewpoint and right viewpoint digital image signals to generate left parallax image data corresponding to the left viewpoint and right parallax image data corresponding to the right viewpoint. The generation of the left parallax image data and right parallax image data is described in detail further below.

The one-dimensional projection data generating section 531 calculates pixel values of a plurality of pixels lined up in a direction of a straight line joining the left viewpoint and the right viewpoint, i.e. a direction orthogonal to the parallax direction, respectively for the left parallax image data and the right parallax image data. In this way, one-dimensional projection data of the left viewpoint corresponding to the left parallax image data and one-dimensional projection data of the right viewpoint corresponding to the right parallax image data are generated.

The one-dimensional smoothed data generating section 532 generates one-dimensional smoothed data of the left viewpoint and one-dimensional smoothed data of the right viewpoint, by calculating a movement average with a sampling width greater than or equal to the maximum parallax amount for each of the one-dimensional projection data of the left viewpoint and the one-dimensional projection data if the right viewpoint. The generation of the one-dimensional smoothed data of the left viewpoint and the one-dimensional smoothed data of the right viewpoint is described in detail further below.

The one-dimensional reference data generating section 533 generates one-dimensional reference data based on the one-dimensional smoothed data of the left viewpoint and the one-dimensional smoothed data of the right viewpoint. Specifically, the one-dimensional reference data generating section 533 generates the one-dimensional reference data using the geometric mean or the arithmetic mean of the pixel values corresponding respectively to the one-dimensional smoothed data of the left viewpoint and the one-dimensional smoothed data of the right viewpoint. The generation of the one-dimensional reference data is described in detail further below.

The shading correcting section 534 corrects the left parallax image data using the ratio of the one-dimensional reference data to the one-dimensional smoothed data of the left viewpoint. Furthermore, the shading correcting section 534 corrects the right parallax image data using the ratio of the one-dimensional reference data to the one-dimensional smoothed data of the right viewpoint. In this way, it is possible to obtain left parallax image data and right parallax image data in which the shading has been corrected.

The image processing section 505 also performs other general functions for image processing, such as adjusting the image data according to the selected image format. The generated image data is converted into a display signal by the LCD drive circuit 510, and is displayed in the display section 509. Furthermore, the generated image data is recorded in the memory card 520 loaded in the memory card IF 507.

One series of the image capturing sequence begins when the manipulating section 508 is manipulated by the user and outputs a manipulation signal to the control section 501. The various operations such as AF, AE, and the like that accompany the imaging sequence are performed under the control of the control section 501.

With a digital camera using the single-lens pupil-divided imaging method, in addition to the problem of the asymmetrical blur, there is a problem that the different amounts of shading occur between the left and right parallax images. In the present specification, the shading of the parallax images is referred to as parallax shading. WO 2012/036019 describes a technique for correcting the shading of parallax images using a correction table. Specifically, in order to correct the shading of the parallax images, an image of a uniform surface is captured in advance and a one-dimensional table for correction is created and stored in advance for every optical condition. When correcting the shading, the correction table of the corresponding optical condition is read and the shading is corrected. The state of the shading changes depending on the pupil position (focal distance) and the pupil diameter (diaphragm diameter) of the optical system and therefore, in order to correct the shading using the correction table, it is necessary to set data in advance for all of the conditions. Furthermore, in the embodiments of WO 2012/036019, it is assumed that the shading characteristics appearing in the left parallax images and right parallax images are inverted between the left and right, and the necessary memory is reduced by inverting and then reusing one-dimensional tables.

Upon performing a detailed investigation of the effects on the shading of a stereoscopic display image caused by a single-lens pupil-divided imaging system, the following facts were made clear.

1) For the shading of parallax images, there is a trend that when the pupil diameter is smaller (when the diaphragm value is greater), the shading difference between the left and right is greater.

2) The parallax shading is generally asymmetrical between the left parallax image and the right parallax image, due to the effect of manufacturing errors or the like of the parallax pixels.

3) When viewing the stereoscopic display of an image in which the parallax shading has not been corrected, conflicting fields of view occur near the ends of the image due to the difference in brightness between the right parallax image and the left parallax image, and this causes a significant sense of unnaturalness and causes strain when the stereoscopic image is viewed for an extended period of time.

As a result of a detailed investigation of the technology described in WO 2012/039346, it was determined that the technology described in the first embodiment of WO 2012/039346 actually causes the parallax information of both the left parallax image (A image) and the right parallax image (B image) to be lost at the same time as the shading correction, and even when these images are displayed together as a stereoscopic image, it is only possible to obtain a simple planar image. In other words, if the relationship between the shading correction and the remaining parallax amount is not considered, there is a concern that the stereoscopic effect will be lost. In the second embodiment, some type of smoothing is applied to each of the left parallax image (A image), the right parallax image (B image) and the combined image (C image), but since the definition of this smoothing is vague and unclear, there is a concern that the parallax will be lost and the stereoscopic image cannot be displayed, in the same manner as in the first embodiment. Accordingly, in the third embodiment, the parallax shading correction is performed only on when displaying a planar image, and the description states that the correction is not performed when in the stereoscopic image display mode. In other words, when the information of a general captured image itself is used and an attempt is made to correct the effect of the parallax shading, there is a concern that the parallax information will be lost and the stereoscopic image cannot be generated.

On the other hand, the technique of WO 2012/036019 corrects only the characteristics of the parallax shading calculated in advance, and therefore, although there is no worry about losing the parallax information, it is necessary to hold data relating to the diaphragm value, zoom position, and the like of all kinds of lenses. Accordingly, it is extremely difficult to actually implement, and even if it could be implemented, there would be a significant amount of initial effort.

In the present embodiment, in light of these problems, a shading correction technique is described for stereoscopic display without losing the function as a stereoscopic image while also easily correcting the parallax shading in each image by using the information of a general captured image itself. In particular, the first to third embodiment examples describe techniques for correcting the shading caused by the parallax pixels in an image captured by a single-lens stereoscopic imaging for which a stereoscopic image has already been generated. In the fourth embodiment, in order to clarify the relationship between the parallax elimination and the shading correction in parallax images, technology is described for reproducing both the color and parallax in an image for which the color and parallax are captured at the same time by a single-plate sensor in a single-lens stereoscopic imaging apparatus.

(Making the Blur Isotropic and Eliminating Parallax)

In Japanese Patent Application No. 2012-179044 from the same applicant as this application, a description is provided that the asymmetrical blur occurring between the horizontal direction and the vertical direction in the parallax pixels becomes blur that appears natural as a result of applying a smoothing filter in the horizontal direction to make the blur isotropic, and that the parallax becomes smaller as the change to the isotropic nature progresses and the parallax is finally completely eliminated when the blur becomes completely isotropic. Simply put, as the blur in the horizontal direction becomes closer to the blur width in the vertical direction due to the smoothing in the horizontal direction, the parallax amount becomes smaller until the parallax is finally eliminated. In other words, as the blur width changes from a half-aperture blur width to a full-aperture blur width, the parallax changes from the initial parallax amount at the time of imaging to a parallax amount of zero. Accordingly, it is possible to use the degree of smoothing in the horizontal direction as a parallax amount control means. The fact that the parallax can become zero as a result of the smoothing in the horizontal direction can be effectively utilized. More specifically, a fixed smoothing filter with a filter width greater than or equal to the maximum parallax amount in the horizontal direction is applied. As a result, it is possible to obtain parallax images in which the parallax is always eliminated.

First Embodiment Example

The present embodiment example deals with a monochromatic stereoscopic image. In the case of a color image formed from the three colors R, G, and B, the same process as performed for the monochromatic image may be performed for each of the three color images, and therefore repetitive description of this process is omitted. The steps of this process are as shown below.
1) Input of the parallax image data
2) Generation of the one-dimensional projection data
3) Generation of the one-dimensional smoothed distribution data
4) Generation of the one-dimensional reference distribution data
5) Generation of the one-dimensional gain distribution data
6) Shading correction of the parallax images
The following describes these steps.
1) Input of the Parallax Image Data
The left parallax image Lt(x, y) and the right parallax image Rt(x, y) obtained by imaging a general subject are input. At this time, each parallax image is linear gradation data that has not undergone gamma correction. Furthermore, in the case of a color image, the parallax images are preferably RGB data resulting from the sensor spectral sensitivity without undergoing any color processing.
2) Generation of the One-Dimensional Projection Data
In order to suitably extract only the shading information included in the parallax images, it is necessary to eliminate the image structure information from the image data of the general subject image. Furthermore, as described above, the elimination of the parallax as a result of performing the shading correction must be avoided, and therefore it is necessary to remove the parallax information included in the parallax images. At this step, in order to eliminate the image structure information at an early stage, a method is used in which data addition is performed for all of the two-dimensional parallax images in the vertical direction and projected one-dimensionally in the horizontal direction. When the one-dimensionally projected data has a value that is the average value obtained by dividing the value resulting in the addition in the vertical direction by the number of pieces of data, one-dimensional projection data is obtained in which the fluctuating component of the noise is also restricted. Concerning the state of the parallax distribution of the one-dimensional projection data, the subject image is in focus at a certain region and a certain region has a parallax in a blur region, and therefore in the one-dimensional projection data resulting from the vertical addition, the parallax has a disordered distribution state and is weaker than the maximum parallax amount.

The one-dimensional projection data of the left parallax image and the one-dimensional projection data of the right parallax image are respectively represented as Lt(x) and Rt(x).

$Lt(x) = \langle Lt(x,y) dy / \langle dy$ $Rt(x) = \langle Rt(x,y) dy / \langle dy$ 3) Generation of the One-Dimensional Smoothed Distribution Data Next, a smoothing filter that is greater than the maximum parallax amount in the horizontal direction is applied to the left and right one-dimensional projection data, such that the parallax is not eliminated by the shading correction, and then a process is performed to completely eliminate the parallax information. In this way, the smoothed one-dimensional projection data includes broad configuration information of the one-dimensional projection image and a shading component unique to the parallax images, which are generated primarily by the relationship between the characteristics of the microlenses of the parallax pixels and the virtual pupils in the single-lens optical system.

The maximum parallax amount between the left and right parallax images is defined according to the relationship between the imaging area of the image sensor, the pixel pitch, and the optical system, and is of an order of approximately 5% in the horizontal direction relative to the entire image surface. When there are approximately 2000 pixels in the horizontal direction, the total parallax amount is approximately 100 pixels. A corresponding smoothing filter in the horizontal direction is applied. The filter radius is represented as $\sigma_0$, and is set to the order of the maximum parallax amount. This filter is for local smoothing, and the smoothed one-dimensional projection data holds the shading component with this localized accuracy.

The case of Gaussian blur is expressed as shown below. The left and right one-dimensional smoothed distribution data are respectively represented by $\langle L(x) \rangle$ and $\langle R(x) \rangle$, with the meaning of being a localized average.

Gaussian Blur Filter $$F(x - x') = \frac{\exp\left(-\frac{|x-x'|^2}{\sigma_0^2}\right)}{\int_{|x-x'| \leq 2\sigma_0} \exp\left(-\frac{|x-x'|^2}{\sigma_0^2}\right) dx'}$$

One-Dimensional Smoothing Process in the Horizontal Direction $$\langle Lt(x) \rangle = F \otimes Lt(x) = \frac{\int_{|x-x'| \leq 2\sigma_0|} Lt(x) F(x-x') dx'}{\int_{|x-x'| \leq 2\sigma_0|} F(x-x') dx'}$$

$$\langle Rt(x) \rangle = F \otimes Rt(x) = \frac{\int_{|x-x'| \leq 2\sigma_0|} Rt(x) F(x-x') dx'}{\int_{|x-x'| \leq 2\sigma_0|} F(x-x') dvx'}$$

Even when Gaussian blur cannot be used easily, a uniform filter may be used that is expressed by positive filter constants that are all uniform.

4) Generation of the One-Dimensional Reference Distribution Data

The one-dimensional reference distribution data for representing the reference level of the shading correction is generated from the left one-dimensional smoothed distribution data in which the parallax has been eliminated and the right one-dimensional smoothed distribution data in which the parallax has been eliminated. The one-dimensional reference distribution data is represented as $\langle M(x) \rangle$. There are two methods for creating this reference point. One method is to use the arithmetic mean of the right and left, and the other method is to use the geometric mean of the right and left.

When the Arithmetic Mean is Used $$\langle M(x) \rangle = \frac{\langle Lt(x) \rangle + \langle Rt(x) \rangle}{2}$$

When the Geometric Mean is Used $$\langle M(x) \rangle = \sqrt{\langle Lt(x) \rangle \cdot \langle Rt(x) \rangle}$$

5) Generation of the One-Dimensional Gain Distribution Data

Using the left and right one-dimensional smoothed distribution data and the one-dimensional reference distribution data, the one-dimensional gain distribution data gLt(x) for correcting the left parallax image and the one-dimensional gain distribution data gRt(x) for correcting the right parallax image are generated. In this way, the inverse component of the shading component cancelled out by the image structure information is generated.

There are two methods for creating the gain distribution data, according to the two methods used to obtain the one-dimensional reference distribution data.

When the Arithmetic Mean is Used $$g_{Lt}(x) = \frac{\langle M(x) \rangle}{\langle Lt(x) \rangle} = \frac{\frac{\langle Lt(x) \rangle + \langle Rt(x) \rangle}{2}}{\langle Lt(x) \rangle}$$

$$g_{Rt}(x) = \frac{\langle M(x) \rangle}{\langle Rt(x) \rangle} = \frac{\frac{\langle Lt(x) \rangle + \langle Rt(x) \rangle}{2}}{\langle Rt(x) \rangle}$$

When the Geometric Mean is Used $$g_{Lt}(x) = \frac{\langle M(x) \rangle}{\langle Lt(x) \rangle} = \sqrt{\frac{\langle Rt(x) \rangle}{\langle Lt(x) \rangle}}$$

$$g_{Rt}(x) = \frac{\langle M(x) \rangle}{\langle Rt(x) \rangle} = \sqrt{\frac{\langle Lt(x) \rangle}{\langle Rt(x) \rangle}}$$

6) Shading Correction of the Parallax Images

Using the obtained left and right one-dimensional gain distribution data respectively, the shading is corrected for each of the left parallax image and the right parallax image. The two-dimensional data is corrected using the same line of one-dimensional data for each line. In other words, the computation shown below is performed for each point on the y axis. The left parallax image in which the shading has been corrected is represented by Lt'(x, y) and the right parallax image in which the shading has been corrected is represented by Rt'(x, y).

$$Lt'(x,y) = g_{Lt}(x) \cdot Lt(x,y)$$

$$Rt'(x,y) = g_{Rt}(x) \cdot Rt(x,y)$$

In this way, a stereoscopic image is generated in which the shading caused by the characteristics of the parallax pixels has been corrected. When this stereoscopic image is displayed, it is possible to obtain a natural stereoscopic image in which there is no conflict between fields of view due to the shading. By extracting the shading characteristics that fluctuate according to the optical conditions from the image itself, it is possible to provide a simple and reliable shading correction method. In other words, by using the signal information of a general captured image itself and correcting the shading that occurs in the parallax images without losing the stereoscopic effect with a simple configuration, it is possible to generate a natural stereoscopic image.

In general, the shading characteristics differ between a case in which the subject is nearby and a case in which the subject is infinitely far. Accordingly, although it is possible for the shading to change according to the arrangement relationship of the subject image, the shading actually causes a problem only in an optical system with a constricted diaphragm. This case may be thought of in the same manner as a case in which the depth of field is deep and many subjects are at infinitely far focus, and therefore the correction method of the present embodiment is still able to provide shading correction that is sufficient for a useful stereoscopic image. Furthermore, the shading correction may be performed once on at least one set of the left and right parallax images among a plurality of related left and right parallax images, e.g. a plurality of left and right parallax images captured through serial imaging. The shading correction need not be performed on the other left and right parallax images, or the gain distribution data used for the shading correction of the one set may be used as-is for the shading correction of the parallax images. In this way, it is possible to decrease the processing load relating to the shading correction. Furthermore, among a plurality of related left and right parallax images, it is acceptable for the shading correction to be performed only on the left and right parallax images that are set in advance by user input, for example.

FIGS. 14-A to 14-C are drawings for describing examples of shading correction. FIG. 14-A shows a captured image displayed in the display section 209. FIG. 14-B shows a left parallax image and a right parallax image before the shading correction. In FIGS. 14-B and 14-C, the hashing density indicates the level of brightness. Shading occurs in the parallax images due to the angle dependency of the pixels. Because of this, as shown in FIG. 14-B, the left parallax image and the right parallax image each have different degrees of brightness at the left edge portion and the right edge portion. In the drawings, in the left parallax image, the right edge portion is brighter than the left edge portion, while in the right parallax image, the left edge portion is brighter than the right edge portion. Furthermore, the parallax shading is not symmetrical in the left parallax image and the right parallax image. Specifically, the brightness difference between the left and right edges in the right parallax image is greater than the brightness difference between the left and right edges in the left parallax image.

FIG. 14-C shows the right parallax image and the left parallax image after the shading correction. As shown in the drawing, as a result of the shading correction, the brightness at the left edge of the left parallax image and the brightness at the left edge of the right parallax image become substantially the same. In the same manner, the brightness at the right edge of the left parallax image and the brightness at the right edge of the right parallax image become substantially the same. In this way, the brightness difference between corresponding portions of the left parallax image and the right parallax image can be decreased, and therefore it is possible to reduce the unnatural feeling when viewing the stereoscopic image.

Second Embodiment Example

The following describes a case in which a fitting function is used when calculating the one-dimensional gain distribution data in step 5. The difference with respect to the first embodiment example is only that a process for further manipulation of the one-dimensional gain distribution data at step 5 is added, and therefore only this differing portion is described. The steps of this process are the same as those of the first embodiment example.

5) Generation of the One-Dimensional Gain Distribution Data

Figure 15:
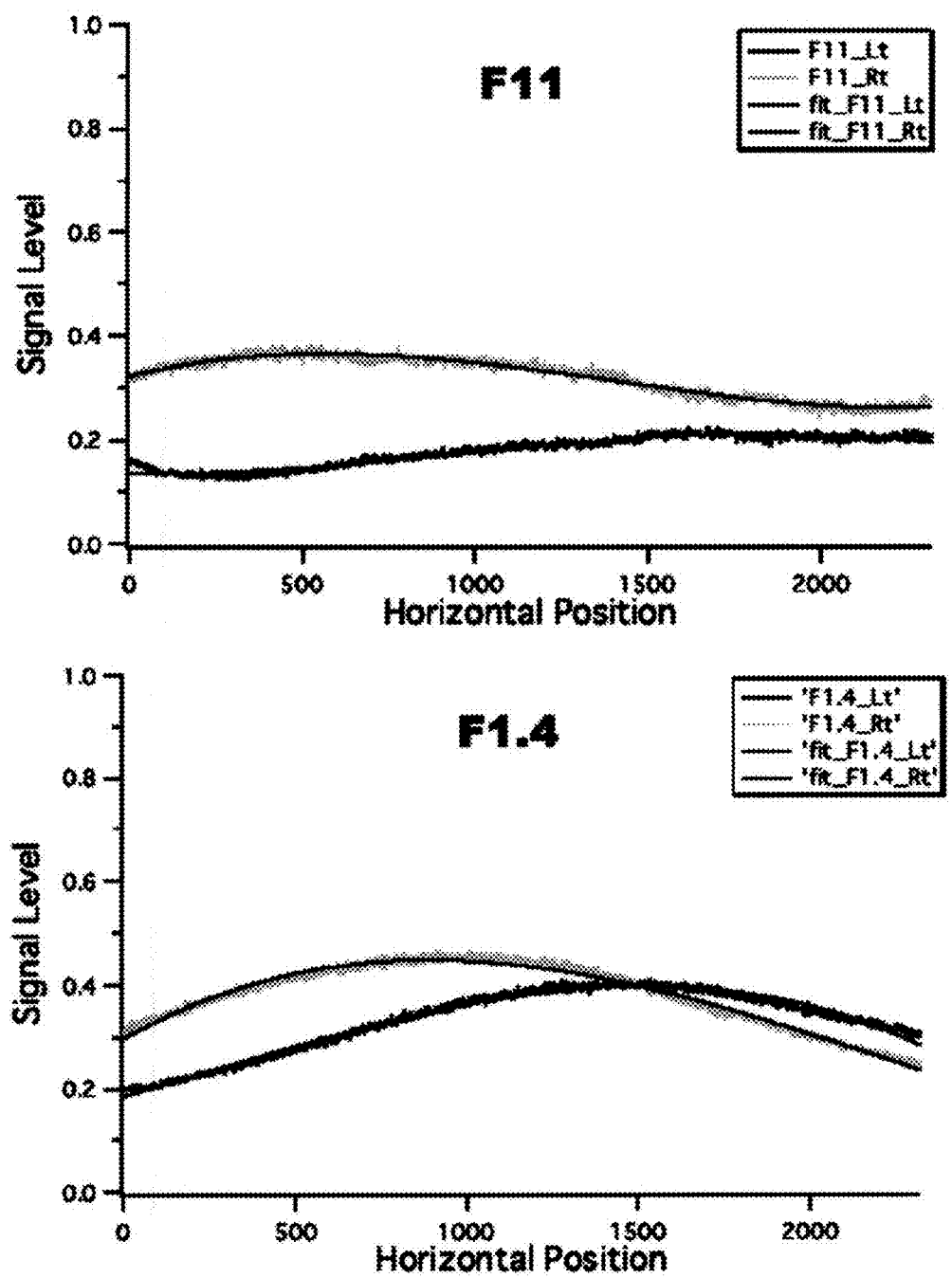
FIG. 15 is a drawing for describing the function fitting.

The one-dimensional gain distribution data $gLt(x)$ and $gRt(x)$ obtained in the first embodiment example can be thought of as being removed from the normal image structure, but when the input parallax images of a general subject are captured with extremely high sensitivity, there are cases where the fluctuation component of the noise remains. Furthermore, when the brightness level in only one of the parallax images is saturated as a result of an extremely bright region being included in the general subject image, there are cases where the image structure information cannot be suitably removed. In such cases, in order for the shading correction to function properly, a process is performed to forcefully remove the image structure information from the one-dimensional gain distribution data. Specifically, the fact that the shading always has characteristics that can be fitted using a gentle function is utilized. FIG. 15 is a drawing for describing the function fitting. The upper portion of FIG. 15 shows a case of F11 and the bottom portion shows a case of F1.4. In each drawing, the horizontal axis indicates the pixel position in the horizontal direction and the vertical axis indicates the signal level. Furthermore, in each drawing, the state of the behavior of the shading obtained by extracting only one line of the uniform image and the state of the data fitted to this using a fourth-degree function are shown. When function fitting is performed for the one-dimensional gain distribution data acquired in the first embodiment example, gain distribution data is obtained from which the image structure information has been completely and forcefully removed. The original shading can be expressed by a fourth-degree function, and therefore the gain distribution can also be through of as being able to be approximated by a fourth-degree function.

$$g_{Lt}(x)=a_L+b_Lx+c_Lx^2+d_Lx^3+e_Lx^4$$

$$g_{Rt}(x)=a_R+b_Rx+c_Rx^2+d_Rx^3+e_Rx^4$$

Here, the constants a, b, c, d, and e are each fitting coefficients. The coefficients are obtained using the least square method. When fitting is performed, the fluctuation of the noise and the image structure information are both reliably removed.

In this way, the shading correction is performed in step 6 using the one-dimensional gain distribution data approximated using a fitting function.

Third Embodiment Example

In the first embodiment example and second embodiment example, the resolution of the input image is handled as-is, but as described in the second embodiment example, the shading signal is a component that changes gently across the entire image. Accordingly, it is still possible to obtain enough information even when the input image has its resolution lowered to that of a thumbnail image having 360×240 pixels, for example. With the coordinate axes of the input image being represented as (x, y) and the coordinate axes of the thumbnail image being represented as (x', y'), when the compression ratio of the thumbnail image is 1/α times (α>1) and the sampling start position is $(x_0, y_0)$, the relationship shown below is established.

$$x=\alpha x'+x_0$$

$$y=\alpha y'+y_0$$

Therefore, with the same computation used in the first embodiment example or the second embodiment example having been performed at the pixel position (x', y') of the thumbnail image, the computation may be performed using the variable conversion relating to x described above only when performing the shading correction a in the final step 6.

The techniques of the first embodiment example and second embodiment example that can be performed with a thumbnail image such as described above can be said to be simple processes especially suitable for hardware processing. This is because the processing up to step 5 for a thumbnail image is finished during the wait time lasting until the actual parallax images are generated in the pipeline, and the process of step 6 can be performed at the same time that the parallax images come flowing through the pipeline. Furthermore, the idea of the one-dimensional projection in the first step creates a process even more suitable for hardware processing. With hardware, long and large-scale smoothing of a number of filter taps in the vertical direction with the actual resolution is often difficult because a line memory is necessary, but with the present embodiment, processing for the thumbnail size is easy and the smoothing is limited to the horizontal direction.

Fourth Embodiment Example

A specific example is described using a sparse parallax pixel arrangement that is a Bayer RGB arrangement. In this example, the arrangement in the upper portion of FIG. 11 is a primitive lattice in which image sensors are arranged periodically. The arrangement characteristics of FIG. 11 are as already described above. The steps of this process are generally as shown below.

1) Input of the color and parallax multiplexed mosaic image data
2) Global gain balance correction of the color and parallax mosaic image
3) Generation of the tentative parallax images
4) Generation of the non-parallax color mosaic image resulting from the left and right localized luminance distribution correction (local gain balance correction)
5) Generation of the non-parallax reference image
6) Generation of the actual parallax images
7) Shading correction of the parallax images
8) Conversion to output color space The following describes these steps.

1) Input of the Color and Parallax Multiplexed Mosaic Image Data

The single-plate mosaic image obtained by multiplexing the color and parallax of FIG. 11 is represented as M(x, y). The gradation is the linear gradation output as a result of an A/D conversion.

2) Global Gain Balance Correction of the Color and Parallax Mosaic Image.

The captured subject image is used as-is to calculate the average value $\bar{N}$ for the entire image of the pixel values of the non-parallax pixels, the average value $\bar{Lt}$ for the entire image of the pixel values of the left parallax pixels, and the average value $\bar{Rt}$ for the entire image of the pixel values of the right parallax pixel. In contrast to the first embodiment, the there are three signal levels. First, the gain correction is performed to match the signal levels to the average values, with a reference point between the left and right. At this time, there are two methods for obtaining the reference point, which are a method using the arithmetic mean and a method using the geometric mean. After this, the geometric mean between the signal level averaged from the left and right and the signal level of the non-parallax pixels is calculated, and the gain correction is performed to match the signal levels to this average value. Next, this process is performed for each of the RGB color components.

The corresponding average values are as shown below.
$\overline{R}_N$, $\overline{R}_{Lt}$, $\overline{R}_{Rt}$,
$\overline{G}_N$, $\overline{G}_{Lt}$, $\overline{G}_{Rt}$,
$\overline{B}_N$, $\overline{B}_{Lt}$, $\overline{B}_{Rt}$ For convenience, in the mosaic image M(x, y):
the signal plane of the non-parallax pixels having the R component is represented as RN_mosaic(x, y),
the signal plane of the left parallax pixels having the R component is represented as RLt_mosaic(x, y),
the signal plane of the right parallax pixels having the R component is represented as RRt_mosaic(x, y),
the signal plane of the non-parallax pixels having the G component is represented as GN_mosaic(x, y),
the signal plane of the left parallax pixels having the G component is represented as GLt_mosaic(x, y),
the signal plane of the right parallax pixels having the G component is represented as GRt_mosaic(x, y),
the signal plane of the non-parallax pixels having the B component is represented as BN_mosaic(x, y),
the signal plane of the left parallax pixels having the B component is represented as BLt_mosaic(x, y), and
the signal plane of the right parallax pixels having the B component is represented as BRt_mosaic(x, y).

a) When Using the Arithmetic Mean of the Left and Right Average Values $$\overline{m}_R = \sqrt{\overline{R}_N \cdot \frac{\overline{R}_{Lt} + \overline{R}_{Rt}}{2}}$$

$$\overline{m}_G = \sqrt{\overline{G}_N \cdot \frac{\overline{G}_{Lt} + \overline{G}_{Rt}}{2}}$$

$$\overline{m}_B = \sqrt{\overline{B}_N \cdot \frac{\overline{B}_{Lt} + \overline{B}_{Rt}}{2}}$$

Gain Values for the Non-Parallax Pixels $$\overline{g}_{R_N} = \frac{\overline{m}_R}{\overline{R}_N} = \sqrt{\frac{\overline{R}_{Lt} + \overline{R}_{Rt}}{2\overline{R}_N}}$$

$$\overline{g}_{G_g} = \frac{\overline{m}_G}{\overline{G}_N} = \sqrt{\frac{\overline{G}_{Lt} + \overline{G}_{Rt}}{2\overline{G}_N}}$$

$$\overline{g}_{B_N} = \frac{\overline{m}_B}{\overline{B}_N} = \sqrt{\frac{\overline{B}_{Lt} + \overline{B}_{Rt}}{2\overline{B}_N}}$$

Gain Values for the Left Parallax Pixels $$\overline{g}_{R_{Lt}} = \frac{\overline{m}_R}{\overline{R}_{Lt}} = \sqrt{\frac{\overline{R}_N}{\overline{R}_{Lt}} \cdot \frac{\overline{R}_{Lt} + \overline{R}_{Rt}}{2\overline{R}_{Lt}}}$$

$$\overline{g}_{G_{Lt}} = \frac{\overline{m}_G}{\overline{G}_{Lt}} = \sqrt{\frac{\overline{G}_N}{\overline{G}_{Lt}} \cdot \frac{\overline{G}_{Lt} + \overline{G}_{Rt}}{2\overline{G}_{Lt}}}$$

$$\overline{g}_{B_{Lt}} = \frac{\overline{m}_B}{\overline{B}_{Lt}} = \sqrt{\frac{\overline{B}_N}{\overline{B}_{Lt}} \cdot \frac{\overline{B}_{Lt} + \overline{B}_{Rt}}{2\overline{B}_{Lt}}}$$

Gain Values for the Right Parallax Pixels $$\overline{g}_{R_{Rt}} = \frac{\overline{m}_R}{\overline{R}_{Lt}} = \sqrt{\frac{\overline{R}_N}{\overline{R}_{Rt}} \cdot \frac{\overline{R}_{Lt} + \overline{R}_{Rt}}{2\overline{R}_{Rt}}}$$

$$\overline{g}_{G_{Rt}} = \frac{\overline{m}_G}{\overline{G}_{Rt}} = \sqrt{\frac{\overline{G}_N}{\overline{G}_{Rt}} \cdot \frac{\overline{G}_{Lt} + \overline{G}_{Rt}}{2\overline{G}_{Rt}}}$$

$$\overline{g}_{B_{Rt}} = \frac{\overline{m}_B}{\overline{B}_{Rt}} = \sqrt{\frac{\overline{B}_N}{\overline{B}_{Rt}} \cdot \frac{\overline{B}_{Lt} + \overline{B}_{Rt}}{2\overline{B}_{Rt}}}$$

Global Gain Correction for the Non-Parallax Pixels $$R'_{N\_mosaic}(x, y) = R_{N\_mosaic}(x, y) \cdot \overline{g}_{R_N} = R_{N\_mosaic}(x, y) \cdot \sqrt{\frac{\overline{R}_{Lt} + \overline{R}_{Rt}}{2\overline{R}_N}}$$

$$G'_{N\_mosaic}(x, y) = G_{N\_mosaic}(x, y) \cdot \overline{g}_{G_N} = G_{N\_mosaic}(x, y) \cdot \sqrt{\frac{\overline{G}_{Lt} + \overline{G}_{Rt}}{2\overline{G}_N}}$$

$$B'_{N\_mosaic}(x, y) = B_{N\_mosaic}(x, y) \cdot g_{B_N} = B_{N\_mosaic}(x, y) \cdot \sqrt{\frac{\overline{B}_{Lt} + \overline{B}_{Rt}}{2\overline{B}_N}}$$

Global Gain Correction for the Left Parallax Pixels $$R'_{Lt\_mosaic}(x, y) = R_{Lt\_mosaic}(x, y) \cdot \overline{g}_{R_{Lt}} =$$
$$R_{Lt\_mosaic}(x, y) \cdot \sqrt{\frac{\overline{R}_N}{\overline{R}_{Lt}} \cdot \frac{\overline{R}_{Lt} + \overline{R}_{Rt}}{2\overline{R}_{Lt}}}$$

$$G'_{Lt\_mosaic}(x, y) = G_{Lt\_mosaic}(x, y) \cdot \overline{g}_{G_{Lt}} =$$
$$G_{Lt\_mosaic}(x, y) \cdot \sqrt{\frac{\overline{G}_N}{\overline{G}_{Lt}} \cdot \frac{\overline{G}_{Lt} + \overline{G}_{Rt}}{2\overline{G}_N}}$$

$$B'_{Lt\_mosaic}(x, y) = B_{Lt\_mosaic}(x, y) \cdot \overline{g}_{B_{Lt}} - B_{Lt\_mosaic}(x, y) \cdot \sqrt{\frac{\overline{B}_N}{\overline{B}_{Lt}} \cdot \frac{\overline{B}_{Lt} + \overline{B}_{Rt}}{2\overline{B}_{Lt}}}$$

Global Gain Correction for the Right Parallax Pixels $$R'_{Rt\_mosaic}(x, y) = R_{Rt\_mosaic}(x, y) \cdot \overline{g}_{R_{Rt}} =$$
$$R_{Rt\_mosaic}(x, y) \cdot \sqrt{\frac{\overline{R}_N}{\overline{R}_{Rt}} \cdot \frac{\overline{R}_{Lt} + \overline{R}_{Rt}}{2\overline{R}_{Rt}}}$$

$$G'_{Nt\_mosaic}(x, y) = G_{Rt\_mosaic}(x, y) \cdot \overline{g}_{G_{Rt}} =$$
$$G_{Rt\_mosaic}(x, y) \cdot \sqrt{\frac{\overline{G}_N}{\overline{G}_{Rt}} \cdot \frac{\overline{G}_{Lt} + \overline{G}_{Rt}}{2\overline{G}_{Rt}}}$$

-continued $$B'_{Rt\_mosaic}(x, y) = B_{Rt\_mosaic}(x, y) \cdot \bar{g}_{N_{Rt}} = B_{Rt\_mosaic}(x, y) \cdot \sqrt{\frac{\bar{B}_N}{\bar{B}_{Rt}} \cdot \frac{\bar{B}_{Lt} + \bar{B}_{Rt}}{2\bar{B}_{Rt}}}$$

b) When Using the Geometric Mean of the Left and Right Average Values $$\bar{m}_R = \sqrt{\bar{R}_N \cdot \sqrt{\bar{R}_{Lt} \cdot \bar{R}_{Rt}}}$$

$$\bar{m}_G = \sqrt{\bar{G}_N \cdot \sqrt{\bar{G}_{Lt} \cdot \bar{G}_{Rt}}}$$

$$\bar{m}_B = \sqrt{\bar{B}_N \cdot \sqrt{\bar{B}_{Lt} \cdot \bar{B}_{Rt}}}$$

Gain Values for the Non-Parallax Pixels $$\bar{g}_{R_N} = \frac{\bar{m}_R}{\bar{R}_N} = \sqrt{\frac{\sqrt{\bar{R}_{Lt} \cdot \bar{R}_{Rt}}}{\bar{R}_N}}$$

$$\bar{g}_{G_N} = \frac{\bar{m}_G}{\bar{G}_N} = \sqrt{\frac{\sqrt{\bar{G}_{Lt} \cdot \bar{G}_{Rt}}}{\bar{G}_N}}$$

$$\vec{g}_{B_N} = \frac{\bar{m}_B}{\bar{B}_N} = \sqrt{\frac{\sqrt{\bar{B}_{Lt} \cdot \bar{B}_{Rt}}}{\bar{B}_N}}$$

Gain Values for the Left Parallax Pixels $$\bar{g}_{R_{Lt}} = \frac{\bar{m}_R}{\bar{R}_{Lt}} = \sqrt{\frac{\bar{R}_N}{\bar{R}_{Lt}} \cdot \sqrt{\frac{\bar{R}_{Rt}}{\bar{R}_{Lt}}}}$$

$$\bar{g}_{G_{Lt}} = \frac{\bar{m}_G}{\bar{G}_{Lt}} = \sqrt{\frac{\bar{G}_N}{\bar{G}_{Lt}} \cdot \sqrt{\frac{\bar{G}_{Rt}}{\bar{G}_{Lt}}}}$$

$$\bar{g}_{B_{Lt}} = \frac{\bar{m}_B}{\bar{B}_{Lt}} = \sqrt{\frac{\bar{B}_N}{\bar{B}_{Lt}} \cdot \sqrt{\frac{\bar{B}_{Rt}}{\bar{B}_{Lt}}}}$$

Gain Values for the Right Parallax Pixels $$\bar{g}_{R_{Rt}} = \frac{\bar{m}_R}{\bar{R}_{Rt}} = \sqrt{\frac{\bar{R}_N}{\bar{R}_{Rt}} \cdot \sqrt{\frac{\bar{R}_{Lt}}{\bar{R}_{Rt}}}}$$

$$\bar{g}_{G_{Rt}} = \frac{\bar{m}_G}{\bar{G}_{Rt}} = \sqrt{\frac{\bar{G}_N}{\bar{G}_{Rt}} \cdot \sqrt{\frac{\bar{G}_{Lt}}{\bar{G}_{Rt}}}}$$

$$\bar{g}_{B_{Rt}} = \frac{\bar{m}_B}{\bar{B}_{Rt}} = \sqrt{\frac{\bar{B}_N}{\bar{B}_{Rt}} \cdot \sqrt{\frac{\bar{B}_{Lt}}{\bar{B}_{Rt}}}}$$

Global Gain Correction for the Non-Parallax Pixels $$R'_{N\_mosaic}(x, y) = R_{N\_mosaic}(x, y) \cdot \bar{g}_{R_N} = R_{N\_mosaic}(x, y) \cdot \sqrt{\frac{\sqrt{\bar{R}_{Lt} \cdot \bar{R}_{Rt}}}{\bar{R}_N}}$$

$$G'_{N\_mosaic}(x, y) = G_{N\_mosaic}(x, y) \cdot \bar{g}_{G_N} = G_{N\_mosaic}(x, y) \cdot \sqrt{\frac{\sqrt{\bar{G}_{Lt} \cdot \bar{G}_{Rt}}}{\bar{G}_N}}$$

$$B'_{N\_mosaic}(x, y) = B_{N\_mosaic}(x, y) \cdot \bar{g}_{B_N} = B_{N\_mosaic}(x, y) \cdot \sqrt{\frac{\sqrt{\bar{B}_{Lt} \cdot \bar{B}_{Rt}}}{\bar{B}_N}}$$

Global Gain Correction for the Left Parallax Pixels $$R'_{Lt\_mosaic}(x, y) = R_{Lt\_mosaic}(x, y) \cdot \bar{g}_{R_{Lt}} = R_{Lt\_mosaic}(x, y) \cdot \sqrt{\frac{\bar{R}_N}{\bar{R}_{Lt}} \cdot \sqrt{\frac{\bar{R}_{Rt}}{\bar{R}_{Lt}}}}$$

$$G'_{Lt\_mosaic}(x, y) = G_{Lt\_mosaic}(x, y) \cdot \bar{g}_{G_N} = G_{Lt\_mosaic}(x, y) \cdot \sqrt{\frac{\bar{G}_N}{\bar{G}_{Lt}} \cdot \sqrt{\frac{\bar{G}_{Rt}}{\bar{G}_{Lt}}}}$$

$$B'_{Lt\_mosaic}(x, y) = B_{Lt\_mosaic}(x, y) \cdot \bar{g}_{B_{Lt}} = B_{Lt\_mosaic}(x, y) \cdot \sqrt{\frac{\bar{B}_N}{\bar{B}_{Lt}} \cdot \sqrt{\frac{\bar{B}_{Rt}}{\bar{B}_{Lt}}}}$$

Global Gain Correction for the Right Parallax Pixels $$R'_{Rt\_mosaic}(x, y) = R_{Rt\_mosaic}(x, y) \cdot \bar{g}_{R_{Rt}} = R_{Rt\_mosaic}(x, y) \cdot \sqrt{\frac{\bar{R}_N}{\bar{R}_{Rt}} \cdot \sqrt{\frac{\bar{R}_{Lt}}{\bar{R}_{Rt}}}}$$

$$G'_{Rt\_mosaic}(x, y) = G_{Rt\_mosaic}(x, y) \cdot \bar{g}_{G_N} = G_{Rt\_mosaic}(x, y) \cdot \sqrt{\frac{\bar{G}_N}{\bar{G}_{Rt}} \cdot \sqrt{\frac{\bar{G}_{Lt}}{\bar{G}_{Rt}}}}$$

$$B'_{Rt\_mosaic}(x, y) = B_{Rt\_mosaic}(x, y) \cdot \bar{g}_{B_{Lt}} = B_{Rt\_mosaic}(x, y) \cdot \sqrt{\frac{\bar{B}_N}{\bar{B}_{Rt}} \cdot \sqrt{\frac{\bar{B}_{Lt}}{\bar{B}_{Rt}}}}$$

When a mask is used in which all of the non-parallax pixels are full-aperture, the method using the arithmetic average is adopted. When a mask is used in which all of the non-parallax pixels half-aperture, the method using the geometric mean is adopted. Accordingly, the method using the arithmetic mean is adopted in the present embodiment example. In this way, the mosaic image in which the non-parallax pixels are corrected using one gain coefficient, the left parallax pixels are corrected using one gain coefficient, and the right parallax pixels are corrected using one gain coefficient is output as M'(x, y).

3) Generation of the Tentative Parallax Images

A tentative left parallax image and a tentative right parallax image having low spatial frequency resolution are generated. A simple average interpolation of the G color plane obtained by gathering only the left parallax pixels is performed. Using nearby pixel values, linear interpolation is performed according to the ratio of the distance. In the same manner, a simple average interpolation in the G color plane obtained by gathering only the right parallax pixels is performed. In the same manner, a simple average interpolation in the G color plane obtained by gathering only the non-parallax pixels is performed. The same process is performed for each of the colors R, G, and B. Specifically, RLt(x, y) is generated from RLt_mosaic(x, y), RRt(x, y) is generated from RRt_mosaic(x, y), RN(x, y) is generated from RN_mosaic(x, y), GLt(x, y) is generated from GLt_mosaic(x, y), GRt(x, y) is generated from GRt_mosaic(x, y), GN(x, y) is generated from GN_mosaic(x, y), BLt(x, y) is generated from BLt_mosaic(x, y), BRt(x, y) is generated from BRt_mosaic(x, y), and BN(x, y) is generated from BN_mosaic(x, y).

Tentative non-parallax image having the R component: RN(x, y)

Tentative non-parallax image having the G component: GN(x, y)

Tentative non-parallax image having the B component: BN(x, y)

Tentative left parallax image having the R component: RLt(x, y)

Tentative left parallax image having the G component: GLt(x, y)

Tentative left parallax image having the B component: BLt(x, y)

Tentative right parallax image having the R component: RRt(x, y)

Tentative right parallax image having the G component: GRt(x, y)

Tentative right parallax image having the B component: BRt(x, y)

When creating the tentative non-parallax images RN(x, y), GN(x, y), and BN(x, y), a direction judgment in the signal plane may be introduced to realize higher accuracy.

4) Generation of the Non-Parallax Color Mosaic Image Resulting from the Left and Right Localized Luminance Distribution Correction (Local Gain Balance Correction)

Next, based on the same thinking as used for the global gain correction performed in step 1, the luminance of the left parallax pixels in the screen and the right parallax pixels in the screen are made to match, by performing a local gain correction in pixel units. As a result of this operation, the parallax between the left and right is eliminated. After this, the signal planes that have been averaged for left and right and the imaging signal plane of the non-parallax pixels are also made to match. A new Bayer plane is thereby created in which all of the pixels have matching gain. This is equivalent to the replacement with an average value, and realizes a Bayer plane in which the parallax has been eliminated. This is written as $M_N(x, y)$.

In this case as well, there are two types of methods that can be used for the process of setting the target value to be taken as the reference point for each pixel and the process for eliminating the parallax between the left and right, which are a method selecting the arithmetic mean and a method selecting the geometric mean. When there is a mask area in which all of the non-parallax pixels are full-aperture, it is necessary to select the method using the arithmetic mean in order for the blur width of the subject image for which the parallax between the left and right has been eliminated with the full-aperture blur width. On the other hand, if there is a mask area in which all of the non-parallax pixels are half-aperture, it is necessary to select the method using the geometric mean, in order for the blur width of the subject image in which the parallax between the left and right has been eliminated to match the half-aperture blur width.

Furthermore, the operation for obtaining the average between the signal plane in which the parallax between the left and right has been eliminated and the imaging signal plane of the non-parallax pixels must preserve the blur widths of these planes, since both already conform with the subject image having the same blur width. Accordingly, the geometric mean must be used for both planes at this time. The following provides detailed expressions for this operation.

a) When Using the Arithmetic Mean of the Left and Right Average Value of Each Pixel $$m_R(x, y) = \sqrt{R_N(x, y) \cdot \frac{R_{Lt}(x, y) + R_{Rt}(x, y)}{2}}$$

$$m_G(x, y) = \sqrt{G_N(x, y) \cdot \frac{G_{Lt}(x, y) + G_{Rt}(x, y)}{2}}$$

$$m_B(x, y) = \sqrt{B_N(x, y) \cdot \frac{B_{Lt}(x, y) + B_{Rt}(x, y)}{2}}$$

Gain Values for Each Non-Parallax Pixel $$g_{R_N}(x, y) = \frac{m_R(x, y)}{R_N(x, y)} = \sqrt{\frac{R_{Lt}(x, y) + R_{Rt}(x, y)}{2R_N(x, y)}}$$

$$g_{G_N}(x, y) = \frac{m_G(x, y)}{G_N(x, y)} = \sqrt{\frac{G_{Lt}(x, y) + G_{Rt}(x, y)}{2G_N(x, y)}}$$

$$g_{B_N}(x, y) = \frac{m_B(x, y)}{B_N(x, y)} = \sqrt{\frac{B_{Lt}(x, y) + B_{Rt}(x, y)}{2B_N(x, y)}}$$

Gain Values for Each Left Parallax Pixel $$g_{R_{Lt}}(x, y) = \frac{m_R(x, y)}{R_{Lt}(x, y)} = \sqrt{\frac{R_N(x, y)}{R_{Lt}(x, y)} \cdot \frac{R_{Lt}(x, y) + R_{Rt}(x, y)}{2R_{Lt}(x, y)}}$$

$$g_{G_{Lt}}(x, y) = \frac{m_G(x, y)}{G_{Lt}(x, y)} = \sqrt{\frac{G_N(x, y)}{G_{Lt}(x, y)} \cdot \frac{G_{Lt}(x, y) + G_{Rt}(x, y)}{2G_{Lt}(x, y)}}$$

$$g_{B_{Lt}}(x, y) = \frac{m_B(x, y)}{B_{Lt}(x, y)} = \sqrt{\frac{B_N(x, y)}{B_{Lt}(x, y)} \cdot \frac{B_{Lt}(x, y) + B_{Rt}(x, y)}{2B_{Lt}(x, y)}}$$

Gain Values for Each Right Parallax Pixel $$g_{R_{Rt}}(x, y) = \frac{m_R(x, y)}{R_{Rt}(x, y)} = \sqrt{\frac{R_N(x, y)}{R_{Lt}(x, y)} \cdot \frac{R_{Lt}(x, y) + R_{Rt}(x, y)}{2R_{Lt}(x, y)}}$$

$$g_{G_{Rt}}(x, y) = \frac{m_G(x, y)}{G_{Rt}(x, y)} = \sqrt{\frac{G_N(x, y)}{G_{Rt}(x, y)} \cdot \frac{G_{Lt}(x, y) + G_{Rt}(x, y)}{2G_{Rt}(x, y)}}$$

$$g_{B_{Rt}}(x, y) = \frac{m_B(x, y)}{B_{Rt}(x, y)} = \sqrt{\frac{B_N(x, y)}{B_{Rt}(x, y)} \cdot \frac{B_{Lt}(x, y) + B_{Rt}(x, y)}{2B_{Rt}(x, y)}}$$

Global Gain Correction for Each Non-Parallax Pixel $R_N(x,y) \cdot g_{R_N}(x,y) = m_R(x,y)$ $G_N(x,y) \cdot g_{G_N}(x,y) = m_G(x,y)$ $B_N(x,y) \cdot g_{B_N}(x,y) = m_B(x,y)$ Global Gain Correction for Each Left Parallax Pixel $R_{Lt}(x,y) \cdot g_{R_{Lt}}(x,y) = m_R(x,y)$ $G_{Lt}(x,y) \cdot g_{G_{Lt}}(x,y) = m_G(x,y)$ $B_{Lt}(x,y) \cdot g_{B_{Lt}}(x,y) = m_B(x,y)$ Global Gain Correction for Each Right Parallax Pixel $$R_{Rt}(x,y) \cdot g_{R_{Rt}}(x,y) = m_R(x,y)$$

$$G_{Rt}(x,y) \cdot g_{G_{Rt}}(x,y) = m_G(x,y)$$

$$B_{Rt}(x,y) \cdot g_{B_{Rt}}(x,y) = m_B(x,y)$$

b) When Using the Geometric Mean of the Left and Right Average Value of Each Pixel $$m_R(x, y) = \sqrt{R_N(x, y) \cdot \sqrt{R_{Lt}(x, y) \cdot R_{Rt}(x, y)}}$$

$$m_G(x, y) = \sqrt{G_N(x, y) \cdot \sqrt{G_{Lt}(x, y) \cdot G_{Rt}(x, y)}}$$

$$m_B(x, y) = \sqrt{B_N(x, y) \cdot \sqrt{B_{Lt}(x, y) \cdot B_{Rt}(x, y)}}$$

Gain Values for Each Non-Parallax Pixel $$g_{R_N}(x, y) = \frac{m_R(x, y)}{R_N(x, y)} = \sqrt{\frac{\sqrt{R_{Lt}(x, y) \cdot R_{Rt}(x, y)}}{R_N(x, y)}}$$

$$g_{G_N}(x, y) = \frac{m_G(x, y)}{G_N(x, y)} = \sqrt{\frac{\sqrt{G_{Lt}(x, y) \cdot G_{Rt}(x, y)}}{G_N(x, y)}}$$

$$g_{B_N}(x, y) = \frac{m_B(x, y)}{B_N(x, y)} = \sqrt{\frac{\sqrt{B_{Lt}(x, y) \cdot B_{Rt}(x, y)}}{B_N(x, y)}}$$

Gain Values for Each Left Parallax Pixel $$g_{R_{Lt}}(x, y) = \frac{m_R(x, y)}{R_{Lt}(x, y)} = \sqrt{\frac{R_N(x, y)}{R_{Lt}(x, y)} \cdot \sqrt{\frac{R_{Rt}(x, y)}{R_{Lt}(x, y)}}}$$

$$g_{G_{Lt}}(x, y) = \frac{m_G(x, y)}{G_{Lt}(x, y)} = \sqrt{\frac{G_N(x, y)}{G_{Lt}(x, y)} \cdot \sqrt{\frac{G_{Rt}(x, y)}{G_{Lt}(x, y)}}}$$

$$g_{B_{Lt}}(x, y) = \frac{m_B(x, y)}{B_{Lt}(x, y)} = \sqrt{\frac{B_N(x, y)}{B_{Lt}(x, y)} \cdot \sqrt{\frac{B_{Rt}(x, y)}{B_{Lt}(x, y)}}}$$

Gain Values for Each Right Parallax Pixel $$g_{R_{Rt}}(x, y) = \frac{m_R(x, y)}{R_{Rt}(x, y)} = \sqrt{\frac{R_N(x, y)}{R_{Rt}(x, y)} \cdot \sqrt{\frac{R_{Lt}(x, y)}{R_{Rt}(x, y)}}}$$

$$g_{G_{Rt}}(x, y) = \frac{m_G(x, y)}{G_{Rt}(x, y)} = \sqrt{\frac{G_N(x, y)}{G_{Rt}(x, y)} \cdot \sqrt{\frac{G_{Lt}(x, y)}{G_{Rt}(x, y)}}}$$

$$g_{B_{Rt}}(x, y) = \frac{m_B(x, y)}{B_{Rt}(x, y)} = \sqrt{\frac{B_N(x, y)}{B_{Rt}(x, y)} \cdot \sqrt{\frac{B_{Lt}(x, y)}{B_{Rt}(x, y)}}}$$

Global Gain Correction for Each Non-Parallax Pixel $$R_N(x,y) \cdot g_{R_N}(x,y) = m_R(x,y)$$

$$G_N(x,y) \cdot g_{G_N}(x,y) = m_G(x,y)$$

$$B_N(x,y) \cdot g_{B_N}(x,y) = m_B(x,y)$$

Global Gain Correction for Each Left Parallax Pixel $$R_{Lt}(x,y) \cdot g_{R_{Lt}}(x,y) = m_R(x,y)$$

$$G_{Lt}(x,y) \cdot g_{G_{Lt}}(x,y) = m_G(x,y)$$

$$B_{Lt}(x,y) \cdot g_{B_{Lt}}(x,y) = m_B(x,y)$$

Global Gain Correction for Each Right Parallax Pixel $$R_{Rt}(x,y) \cdot g_{R_{Rt}}(x,y) = m_R(x,y)$$

$$G_{Rt}(x,y) \cdot g_{G_{Rt}}(x,y) = m_G(x,y)$$

$$B_{Rt}(x,y) \cdot g_{B_{Rt}}(x,y) = m_B(x,y)$$

The data of the Bayer plane is overwritten with the average values of the image of the left viewpoint and the image of the right viewpoint and the new non-parallax pixel values that are the pixel values obtained as the average values of the pixels of the reference viewpoint image that does not have a parallax, and the result is output as the image $M_N(x, y)$ having a non-parallax Bayer plane.

5) Generation of the Non-Parallax Reference Image

A widely known Bayer interpolation technique (demosaicing process) is used. For example, please see U.S. Pat. No. 8,259,213 from the same inventor as the present application. The non-parallax reference image generated in this way has undergone the shading correction as a result of the local gain correction performed in step 4, and therefore a 2D image is generated in which the effect of the shading occurring in the left and right regions of the parallax images has been removed. This image can be used to print out a normal 2D image with high resolution as-is.

6) Generation of the Actual Parallax Images

Using the tentative left parallax color images RLt(x, y), GLt(x, y), and BLt(x, y) with low resolution generated in step 3 and the non-parallax color images RN(x, y), GN(x, y), and BN(x, y) with high resolution generated as an intermediate process in step 5, left parallax color images color images R'Lt(x, y), G'Lt(x, y), and B'Lt(x, y) that have high resolution and are to actually be output are generated. In the same manner, using the tentative right parallax color images RRt(x, y), GRt(x, y), and BRt(x, y) with low resolution generated in step 3 and the non-parallax color images RN(x, y), GN(x, y), and BN(x, y) with high resolution generated as an intermediate process in step 5, right parallax color images color images R'Rt(x, y), G'Rt(x, y), and B'Rt(x, y) that have high resolution and are to actually be output are generated.

There are two methods considered for the parallax modulation, which are a method using the arithmetic mean as a reference point and a method using the geometric mean as a reference point. Either method can be used to realize the parallax modulation effect, but the method using the arithmetic mean as the reference point is adopted when the aperture mask of the non-parallax pixels of the image sensor is full-aperture and the method using the geometric mean as the reference point is adopted when the aperture mask of the non-parallax pixels of the image sensor is half-aperture in the same manner as the parallax pixels. Accordingly, in the present embodiment example, the method using the arithmetic mean as the reference point is used.

a) Parallax Modulation with the Arithmetic Mean as a Reference Point

Left Parallax Modulation $$R'_{Lt}(x, y) = R_N(x, y) \frac{2R_{Lt}(x, y)}{R_{Lt}(x, y) + R_{Rt}(x, y)} \frac{2G_{Lt}(x, y)}{G_{Lt}(x, y) + G_{Rt}(x, y)} \frac{2B_{Lt}(x, y)}{B_{Lt}(x, y) + B_{Rt}(x, y)}$$

-continued $$G'_{Lt}(x, y) = G_N(x, y) \frac{2R_{Lt}(x, y)}{R_{Lt}(x, y) + R_{Rt}(x, y)}$$

$$\frac{2G_{Lt}(x, y)}{G_{Lt}(x, y) + G_{Rt}(x, y)} \frac{2B_{Lt}(x, y)}{B_{Lt}(x, y) + B_{Rt}(x, y)}$$

$$B'_{Lt}(x, y) = B_N(x, y) \frac{2R_{Rt}(x, y)}{R_{Lt}(x, y) + R_{Rt}(x, y)}$$

$$\frac{2G_{Lt}(x, y)}{G_{Lt}(x, y) + G_{Rt}(x, y)} \frac{2B_{Lt}(x, y)}{B_{Lt}(x, y) + B_{Rt}(x, y)}$$

Right Parallax Modulation $$R'_{Rt}(x, y) = R_N(x, y) \frac{2R_{Rt}(x, y)}{R_{Lt}(x, y) + R_{Rt}(x, y)} \frac{2G_{Rt}(x, y)}{G_{Lt}(x, y) + G_{Rt}(x, y)} \frac{2B_{Rt}(x, y)}{B_{Lt}(x, y) + B_{Rt}(x, y)}$$

$$G'_{Rt}(x, y) = G_N(x, y) \frac{2R_{Rt}(x, y)}{R_{Lt}(x, y) + R_{Rt}(x, y)}$$

$$\frac{2G_{Rt}(x, y)}{G_{Lt}(x, y) + G_{Rt}(x, y)} \frac{2B_{Rt}(x, y)}{B_{Lt}(x, y) + B_{Rt}(x, y)}$$

$$B'_{Rt}(x, y) = B_N(x, y) \frac{2R_{Rt}(x, y)}{R_{Lt}(x, y) + R_{Rt}(x, y)}$$

$$\frac{2G_{Rt}(x, y)}{G_{Lt}(x, y) + G_{Rt}(x, y)} \frac{2B_{Rt}(x, y)}{B_{Lt}(x, y) + B_{Rt}(x, y)}$$

b) Parallax Modulation with the Geometric Mean as a Reference Point

Left Parallax Modulation $$R'_{Lt}(x, y) = R_N(x, y) \frac{R_{Lt}(x, y)}{\sqrt{R_{Lt}(x, y) \cdot R_{Rt}(x, y)}}$$

$$\frac{G_{Lt}(x, y)}{\sqrt{G_{Lt}(x, y) \cdot G_{Rt}(x, y)}} \frac{B_{Lt}(x, y)}{\sqrt{B_{Lt}(x, y) \cdot B_{Rt}(x, y)}}$$

$$G'_{Lt}(x, y) = G_N(x, y) \frac{R_{Lt}(x, y)}{\sqrt{R_{Lt}(x, y) \cdot R_{Rt}(x, y)}}$$

$$\frac{G_{Lt}(x, y)}{\sqrt{G_{Lt}(x, y) \cdot G_{Rt}(x, y)}} \frac{B_{Lt}(x, y)}{\sqrt{B_{Lt}(x, y) \cdot B_{Rt}(x, y)}}$$

$$B'_{Lt}(x, y) = B_N(x, y) \frac{R_{Lt}(x, y)}{\sqrt{R_{Lt}(x, y) \cdot R_{Rt}(x, y)}}$$

$$\frac{G_{Lt}(x, y)}{\sqrt{G_{Lt}(x, y) \cdot G_{Rt}(x, y)}} \frac{B_{Lt}(x, y)}{\sqrt{B_{Lt}(x, y) \cdot B_{Rt}(x, y)}}$$

Right Parallax Modulation $$R'_{Rt}(x, y) = R_N(x, y) \frac{R_{Rt}(x, y)}{\sqrt{R_{Lt}(x, y) \cdot R_{Rt}(x, y)}}$$

$$\frac{G_{Rt}(x, y)}{\sqrt{G_{Lt}(x, y) \cdot G_{Rt}(x, y)}} \frac{B_{Rt}(x, y)}{\sqrt{B_{Lt}(x, y) \cdot B_{Rt}(x, y)}}$$

$$B'_{Rt}(x, y) = B_N(x, y) \frac{R_{Rt}(x, y)}{\sqrt{R_{Lt}(x, y) \cdot R_{Rt}(x, y)}}$$

$$\frac{G_{Rt}(x, y)}{\sqrt{G_{Lt}(x, y) \cdot G_{Rt}(x, y)}} \frac{B_{Rt}(x, y)}{\sqrt{B_{Lt}(x, y) \cdot B_{Rt}(x, y)}}$$

When the Above Expressions are Rewritten

Left Parallax Modulation $$R'_{Lt}(x, y) = R_N(x, y) \sqrt{\frac{R_{Lt}(x, y)}{R_{Rt}(x, y)}} \sqrt{\frac{G_{Lt}(x, y)}{G_{Rt}(x, y)}} \sqrt{\frac{B_{Lt}(x, y)}{B_{Rt}(x, y)}}$$

$$G'_{Lt}(x, y) = G_N(x, y) \sqrt{\frac{R_{Lt}(x, y)}{R_{Rt}(x, y)}} \sqrt{\frac{G_{Lt}(x, y)}{G_{Rt}(x, y)}} \sqrt{\frac{B_{Lt}(x, y)}{B_{Rt}(x, y)}}$$

$$B'_{Lt}(x, y) = B_N(x, y) \sqrt{\frac{R_{Lt}(x, y)}{R_{Rt}(x, y)}} \sqrt{\frac{G_{Lt}(x, y)}{G_{Rt}(x, y)}} \sqrt{\frac{B_{Lt}(x, y)}{B_{Rt}(x, y)}}$$

Right Parallax Modulation $$R'_{Rt}(x, y) = R_N(x, y) \sqrt{\frac{R_{Rt}(x, y)}{R_{Lt}(x, y)}} \sqrt{\frac{G_{Rt}(x, y)}{G_{Lt}(x, y)}} \sqrt{\frac{B_{Rt}(x, y)}{B_{Lt}(x, y)}}$$

$$G'_{Rt}(x, y) = G_N(x, y) \sqrt{\frac{R_{Rt}(x, y)}{R_{Lt}(x, y)}} \sqrt{\frac{G_{Rt}(x, y)}{G_{Lt}(x, y)}} \sqrt{\frac{B_{Rt}(x, y)}{B_{Lt}(x, y)}}$$

$$B'_{Rt}(x, y) = B_N(x, y) \sqrt{\frac{R_{Rt}(x, y)}{R_{Lt}(x, y)}} \sqrt{\frac{G_{Rt}(x, y)}{G_{Lt}(x, y)}} \sqrt{\frac{B_{Rt}(x, y)}{B_{Lt}(x, y)}}$$

7) Shading Correction of the Parallax Images

The parallax images with low resolution before the parallax modulation have not undergone the shading correction, and therefore even though the effect of the shading is removed from the non-parallax image with high resolution as a result of the local gain balance correction, the shading occurs again in the parallax images with high resolution generated by the parallax modulation, i.e. the parallax images obtained at step 6. Accordingly, the shading correction of the first embodiment example, the second embodiment example, or the third embodiment example is performed for each RGB color plane.

8) Conversion to Output Color Space

The non-parallax intermediate color images RN(x, y), GN(x, y), and BN(x, y) with high resolution, the left parallax color images RLt(x, y), GLt(x, y), and BLt(x, y) with high resolution, and the right parallax color images RRt(x, y), GRt(x, y), and BRt(x, y) with high resolution obtained in this manner each undergo a gamma conversion and a color matrix conversion from the camera RGB of the spectral characteristics of the sensor to a standard sRGB color space, and are then output as images in the output color space.

Only the portion of the process described above relating to the relationship between the gain correction and parallax amount is extracted and summarized once again. For ease of explanation, only a case in which the geometric average is used as the reference point for the gain correction is discussed.

In the local gain balance correction, in order to generate the 2D image, the gain balance matching and parallax elimination between the Lt image and the Rt image are performed simultaneously, and the 2D image shading correction is introduced. The expression at the core of this operation includes performing the gain correction shown below on each of the left parallax image and the right parallax image.

$$g_{Lt}^{(2D)}(x, y) = \sqrt{\frac{R(x, y)}{L(x, y)}}$$

$$g_{Rt}^{(2D)}(x, y) = \sqrt{\frac{L(x, y)}{R(x, y)}}$$

One of the processes for generating the 3D image through parallax modulation from the 2D image has a core expression that includes performing the gain correction shown below on the non-parallax image.

$$Lt'(x, y) = N(x, y)\sqrt{\frac{Lt(x, y)}{Rt(x, y)}}$$

$$Rt'(x, y) = N(x, y)\sqrt{\frac{Rt(x, y)}{Lt(x, y)}}$$

In other words, the expression for the local gain balance correction has an inverse relationship with respect to the expression for the parallax modulation, and is associated with parallax elimination.

Furthermore, the process of performing the shading correction for the 3D image, has a core expression that includes performing the gain correction shown below on the parallax images.

$$g_{Lt}^{(3D)}(x) = \sqrt{\frac{\langle Rt(x) \rangle}{\langle Lt(x) \rangle}}$$

$$g_{Rt}^{(3D)}(x) = \sqrt{\frac{\langle Lt(x) \rangle}{\langle Rt(x) \rangle}}$$

This fulfills the role of extracting the blur characteristic information and the shading information without loss, even though the parallax information is lost by taking the local average over a larger area.

The three processes described above can be said to be computations using the unique nature derived from the one-to-one correspondence relationship between the blur and the parallax in single-lens stereoscopic imaging.

In the description relating to the fourth embodiment example above, the geometric mean is used in the operation to acquire the average between the signal plane in which the parallax between the left and right has been eliminated and the imaging signal plane of the non-parallax pixels, in order to realize a common blur width. When calculating the geometric mean of the pixel values of the non-parallax pixels and the average values of the left and right parallax pixels, the weighting for these pixel values and the weighting for these average values has a uniform distribution. However, the number of parallax pixels is less than the number of non-parallax pixels. In addition, the resolution power of the parallax images is less than the resolution power of the non-parallax images. As described above, while the Nyquist limit performance of the non-parallax images RN and BN is in a region formed by joining [±π/(2a), ±π/(2a)] and ky=[±π/(2a), ±π/(2a)], the Nyquist limit performance of the parallax images GLt and GRt is in a region formed by joining [±π/(4a), ±π/(4a)] and ky=[±π//(4a), ±π/(4a)]. Accordingly, when the weighting is distributed uniformly to the pixel values of the non-parallax pixels and the average values of the left and right parallax pixels, the resolution power of the resulting image drops overall due to the effect of the resolution power of the parallax images. Accordingly, some technique is necessary to make the resolution power as close as possible to the resolution power of the non-parallax images. Therefore, the geometric mean may be used in consideration of the density ratio of the parallax pixels and the non-parallax pixels in the pixel arrangement on the image sensor. Specifically, the ratio between the non-parallax pixels (N), the left parallax pixels (Lt) and the right parallax pixels (Rt) used in the fourth embodiment example are N:Lt:Rt=6:1:1, in other words N:(Lt+Rt)=3:1, and therefore a weighting of 3/4 is applied to the non-parallax image and a weighting of 1/4 is applied to the parallax images, such that the distribution gives more importance to the non-parallax images that have high density.

In the manner described above, there are two methods for eliminating the parallax between the left and right, which are a method selecting the arithmetic mean and a method selecting the geometric mean. In a case where there is a mask area in which all of the non-parallax pixels are full-aperture, the arithmetic mean may be selected in order for the blur width of the subject image in which the parallax between the left and right has been eliminated to match the full-aperture blur width. Section a) below shows a case in which the arithmetic mean is selected.

a) When Using the Arithmetic Mean of the Left and Right Average Value of Each Pixel $$m_R(x, y) = [R_N(x, y)]^{\frac{3}{4}} \cdot \left[\frac{R_{Lt}(x,y) + R_{Rt}(x, y)}{2}\right]^{\frac{1}{4}}$$

$$m_G(x, y) = [G_N(x, y)]^{\frac{3}{4}} \cdot \left[\frac{G_{Lt}(x,y) + G_{Rt}(x, y)}{2}\right]^{\frac{1}{4}}$$

$$m_B(x, y) = [B_N(x, y)]^{\frac{3}{4}} \cdot \left[\frac{B_{Lt}(x,y) + B_{Rt}(x, y)}{2}\right]^{\frac{1}{4}}$$

Gain Values for Each Non-Parallax Pixel $$g_{R_s}(x, y) = \frac{m_R(x, y)}{R_N(x, y)} = \sqrt[4]{\frac{R_{Lt}(x, y) + R_{Rt}(x, y)}{2R_N(x, y)}}$$

$$g_{G_s}(x, y) = \frac{m_R(x, y)}{G_N(x, y)} = \sqrt[4]{\frac{G_{Lt}(x, y) + G_{Rt}(x, y)}{2G_N(x, y)}}$$

$$g_{B_s}(x, y) = \frac{m_B(x, y)}{B_N(x, y)} = \sqrt[4]{\frac{B_{Lt}(x, y) + B_{Rt}(x, y)}{2B_N(x, y)}}$$

Gain Values for Each Left Parallax Pixel $$g_{R_{Lt}}(x, y) = \frac{m_R(x, y)}{R_{Lt}(x, y)} = \left[\frac{R_N(x, y)}{R_{Lt}(x, y)}\right]^{\frac{3}{4}} \cdot \left[\frac{R_{Lt}(x, y) + R_{Rt}(x, y)}{2R_{Lt}(x, y)}\right]^{\frac{1}{4}}$$

$$g_{G_{Lt}}(x, y) = \frac{m_G(x, y)}{G_{Lt}(x, y)} = \left[\frac{G_N(x, y)}{G_{Lt}(x, y)}\right]^{\frac{3}{4}} \cdot \left[\frac{G_{Lt}(x, y) + G_{Rt}(x, y)}{2G_{Lt}(x, y)}\right]^{\frac{1}{4}}$$

-continued $$g_{B_{Lt}}(x, y) = \frac{m_R(x, y)}{B_{Lt}(x, y)} = \left[\frac{B_N(x, y)}{B_{Lt}(x, y)}\right]^{\frac{3}{4}} \cdot \left[\frac{B_{Lt}(x, y) + B_{Rt}(x, y)}{2B_{Lt}(x, y)}\right]^{\frac{1}{4}}$$

Gain Values for Each Right Parallax Pixel $$g_{R_{Rt}}(x, y) = \frac{m_R(x, y)}{R_{Rt}(x, y)} = \left[\frac{R_N(x, y)}{R_{Rt}(x, y)}\right]^{\frac{3}{4}} \cdot \left[\frac{R_{Lt}(x, y) + R_{Rt}(x, y)}{2R_{Lt}(x, y)}\right]^{\frac{1}{4}}$$

$$g_{G_{Rt}}(x, y) = \frac{m_G(x, y)}{G_{Rt}(x, y)} = \left[\frac{G_N(x, y)}{G_{Rt}(x, y)}\right]^{\frac{3}{4}} \cdot \left[\frac{G_{Lt}(x, y) + G_{Rt}(x, y)}{2G_{Lt}(x, y)}\right]^{\frac{1}{4}}$$

$$g_{B_{Rt}}(x, y) = \frac{m_R(x, y)}{B_{Rt}(x, y)} = \left[\frac{B_N(x, y)}{B_{Rt}(x, y)}\right]^{\frac{3}{4}} \cdot \left[\frac{B_{Lt}(x, y) + B_{Rt}(x, y)}{2B_{Lt}(x, y)}\right]^{\frac{1}{4}}$$

On the other hand, in a case where there is a mask area in which all of the non-parallax pixels are half-aperture, the geometric mean may be selected in order for the blur width of the subject image in which the parallax between the left and right has been eliminated to match the half-aperture blur width. Section b) below shows a case in which the geometric mean is selected.

b) When Using the Geometric Mean of the Left and Right Average Value of Each Pixel $$m_R(x, y) = [R_N(x, y)]^{\frac{3}{4}} \cdot \left[\sqrt{R_{Lt}(x, y) \cdot R_{Rt}(x, y)}\right]^{\frac{1}{4}}$$

$$m_G(x, y) = [G_N(x, y)]^{\frac{3}{4}} \cdot \left[\sqrt{G_{Lt}(x, y) \cdot G_{Rt}(x, y)}\right]^{\frac{1}{4}}$$

$$m_B(x, y) = [B_N(x, y)]^{\frac{3}{4}} \cdot \left[\sqrt{B_{Lt}(x, y) \cdot B_{Rt}(x, y)}\right]^{\frac{1}{4}}$$

Gain Values for Each Non-Parallax Pixel $$g_{R_N}(x, y) = \frac{m_R(x, y)}{R_N(x, y)} = \sqrt[4]{\frac{\sqrt{R_{Lt}(x, y) \cdot R_{Rt}(x, y)}}{R_N(x, y)}}$$

$$g_{G_N}(x, y) = \frac{m_G(x, y)}{G_N(x, y)} = \sqrt[4]{\frac{\sqrt{G_{Lt}(x, y) \cdot G_{Rt}(x, y)}}{G_N(x, y)}}$$

$$g_{B_N}(x, y) = \frac{m_B(x, y)}{B_N(x, y)} = \sqrt[4]{\frac{\sqrt{B_{Lt}(x, y) \cdot B_{Rt}(x, y)}}{B_N(x, y)}}$$

Gain Values for Each Left Parallax Pixel $$g_{R_{Lt}}(x, y) = \frac{m_R(x, y)}{R_{Lt}(x, y)} = \left[\frac{R_N(x, y)}{R_{Lt}(x, y)}\right]^{\frac{3}{4}} \cdot \left[\sqrt{\frac{R_{Rt}(x, y)}{R_{Lt}(x, y)}}\right]^{\frac{1}{4}}$$

$$g_{G_{Lt}}(x, y) = \frac{m_G(x, y)}{G_{Lt}(x, y)} = \left[\frac{G_N(x, y)}{G_{Lt}(x, y)}\right]^{\frac{3}{4}} \cdot \left[\sqrt{\frac{G_{Rt}(x, y)}{G_{Lt}(x, y)}}\right]^{\frac{1}{4}}$$

$$g_{B_{Lt}}(x, y) = \frac{m_B(x, y)}{B_{Lt}(x, y)} = \left[\frac{B_N(x, y)}{B_{Lt}(x, y)}\right]^{\frac{3}{4}} \cdot \left[\sqrt{\frac{B_{Rt}(x, y)}{B_{Lt}(x, y)}}\right]^{\frac{1}{4}}$$

Gain Values for Each Right Parallax Pixel $$g_{R_{Rt}}(x, y) = \frac{m_R(x, y)}{R_{Rt}(x, y)} = \left[\frac{R_N(x, y)}{R_{Rt}(x, y)}\right]^{\frac{3}{4}} \cdot \left[\sqrt{\frac{R_{Lt}(x, y)}{R_{Rt}(x, y)}}\right]^{\frac{1}{4}}$$

$$g_{G_{Rt}}(x, y) = \frac{m_G(x, y)}{G_{Rt}(x, y)} = \left[\frac{G_N(x, y)}{G_{Rt}(x, y)}\right]^{\frac{3}{4}} \cdot \left[\sqrt{\frac{G_{Lt}(x, y)}{G_{Rt}(x, y)}}\right]^{\frac{1}{4}}$$

$$g_{B_{Rt}}(x, y) = \frac{m_B(x, y)}{B_{Rt}(x, y)} = \left[\frac{B_N(x, y)}{B_{Rt}(x, y)}\right]^{\frac{3}{4}} \cdot \left[\sqrt{\frac{B_{Lt}(x, y)}{B_{Rt}(x, y)}}\right]^{\frac{1}{4}}$$

Furthermore, when performing the parallax modulation, it is possible to take the geometric mean in consideration of the RGB density ratio among the parallax pixels in the pixel arrangement on the image sensor. Specifically, the R:G:B ratio among the left parallax pixels is 1:2:1 and the R:G:B ratio among the right parallax pixels is 1:2:1, and therefore a weighting of 1/4 is applied to the parallax modulation with the R component, a weighting of 1/2 is applied to the parallax modulation with the G component, and a weighting of 1/4 is applied to the parallax modulation with the B component, thereby realizing a distribution that places more importance on the parallax modulation with the G component that has high density. Section a) below shows parallax modulation in which the arithmetic mean is the reference point.

a) Parallax Modulation with the Arithmetic Mean as a Reference Point

Left Parallax Modulation $$R'_{Lt}(x, y) = R_N(x, y) \sqrt[4]{\frac{2R_{Lt}(x, y)}{R_{Lt}(x, y) + R_{Rt}(x, y)}}$$

$$\sqrt{\frac{2G_{Lt}(x, y)}{G_{Lt}(x, y) + G_{Rt}(x, y)}} \sqrt[4]{\frac{2B_{Lt}(x, y)}{B_{Lt}(x, y) + B_{Rt}(x, y)}}$$

$$G'_{Lt}(x, y) = G_N(x, y) \sqrt[4]{\frac{2R_{Lt}(x, y)}{R_{Lt}(x, y) + R_{Rt}(x, y)}}$$

$$\sqrt{\frac{2G_{Lt}(x, y)}{G_{Lt}(x, y) + G_{Rt}(x, y)}} \sqrt[4]{\frac{2B_{Lt}(x, y)}{B_{Lt}(x, y) + B_{Rt}(x, y)}}$$

$$B'_{Lt}(x, y) = B_N(x, y) \sqrt[4]{\frac{2R_{Lt}(x, y)}{R_{Lt}(x, y) + R_{Rt}(x, y)}}$$

$$\sqrt{\frac{2G_{Lt}(x, y)}{G_{Lt}(x, y) + G_{Rt}(x, y)}} \sqrt[4]{\frac{2B_{Lt}(x, y)}{B_{Lt}(x, y) + B_{Rt}(x, y)}}$$

Right Parallax Modulation $$R'_{Rt}(x, y) = R_N(x, y) \sqrt[4]{\frac{2R_{Rt}(x, y)}{R_{Lt}(x, y) + R_{Rt}(x, y)}}$$

$$\sqrt{\frac{2G_{Rt}(x, y)}{G_{Lt}(x, y) + G_{Rt}(x, y)}} \sqrt[4]{\frac{2B_{Rt}(x, y)}{B_{Lt}(x, y) + B_{Rt}(x, y)}}$$

$$G'_{Rt}(x, y) = G_N(x, y) \sqrt[4]{\frac{2R_{Rt}(x, y)}{R_{Lt}(x, y) + R_{Rt}(x, y)}}$$

$$\sqrt{\frac{2G_{Rt}(x, y)}{G_{Lt}(x, y) + G_{Rt}(x, y)}} \sqrt[4]{\frac{2B_{Rt}(x, y)}{B_{Lt}(x, y) + B_{Rt}(x, y)}}$$

-continued $$B'_{Rt}(x, y) = B_N(x, y) \sqrt[4]{\frac{2R_{Rt}(x, y)}{R_{Lt}(x, y) + R_{Rt}(x, y)}}$$

$$\sqrt{\frac{2G_{Rt}(x, y)}{G_{Lt}(x, y) + G_{Rt}(x, y)}} \sqrt[4]{\frac{2B_{Rt}(x, y)}{B_{Lt}(x, y) + B_{Rt}(x, y)}}$$

Section b) below shows parallax modulation in which the geometric mean is the reference point.

b) Parallax Modulation with the Geometric Mean as a Reference Point

Left Parallax Modulation $$R'_{Lt}(x, y) = R_N(x, y) \sqrt[4]{\frac{R_{Lt}(x, y)}{\sqrt{R_{Lt}(x, y) \cdot R_{Rt}(x, y)}}} \sqrt{\frac{G_{Lt}(x, y)}{\sqrt{G_{Lt}(x, y) \cdot G_{Rt}(x, y)}}} \sqrt[4]{\frac{B_{Lt}(x, y)}{\sqrt{B_{Lt}(x, y) \cdot B_{Rt}(x, y)}}}$$

$$G'_{Lt}(x, y) = G_N(x, y) \sqrt[4]{\frac{R_{Lt}(x, y)}{\sqrt{R_{Lt}(x, y) \cdot R_{Rt}(x, y)}}} \sqrt{\frac{G_{Lt}(x, y)}{\sqrt{G_{Lt}(x, y) \cdot G_{Rt}(x, y)}}} \sqrt[4]{\frac{B_{Lt}(x, y)}{\sqrt{B_{Lt}(x, y) \cdot B_{Rt}(x, y)}}}$$

$$B'_{Lt}(x, y) = B_N(x, y) \sqrt[4]{\frac{R_{Lt}(x, y)}{\sqrt{R_{Lt}(x, y) \cdot R_{Rt}(x, y)}}} \sqrt{\frac{G_{Lt}(x, y)}{\sqrt{G_{Lt}(x, y) \cdot G_{Rt}(x, y)}}} \sqrt[4]{\frac{B_{Lt}(x, y)}{\sqrt{B_{Lt}(x, y) \cdot B_{Rt}(x, y)}}}$$

Right Parallax Modulation $$R'_{Rt}(x, y) = R_N(x, y) \sqrt[4]{\frac{R_{Rt}(x, y)}{\sqrt{R_{Lt}(x, y) \cdot R_{Rt}(x, y)}}}$$

$$\sqrt{\frac{G_{Rt}(x, y)}{\sqrt{G_{Lt}(x, y) \cdot G_{Rt}(x, y)}}} \sqrt[4]{\frac{B_{Rt}(x, y)}{\sqrt{B_{Lt}(x, y) \cdot B_{Rt}(x, y)}}}$$

$$G'_{Rt}(x, y) = G_N(x, y) \sqrt[4]{\frac{R_{Rt}(x, y)}{\sqrt{R_{Lt}(x, y) \cdot R_{Rt}(x, y)}}}$$

$$\sqrt{\frac{G_{Rt}(x, y)}{\sqrt{G_{Lt}(x, y) \cdot G_{Rt}(x, y)}}} \sqrt[4]{\frac{B_{Rt}(x, y)}{\sqrt{B_{Lt}(x, y) \cdot B_{Rt}(x, y)}}}$$

$$B'_{Rt}(x, y) = B_N(x, y) \sqrt[4]{\frac{R_{Rt}(x, y)}{\sqrt{R_{Lt}(x, y) \cdot R_{Rt}(x, y)}}}$$

$$\sqrt{\frac{G_{Rt}(x, y)}{\sqrt{G_{Lt}(x, y) \cdot G_{Rt}(x, y)}}} \sqrt[4]{\frac{B_{Rt}(x, y)}{\sqrt{B_{Lt}(x, y) \cdot B_{Rt}(x, y)}}}$$

When the Above Expressions are Rewritten

Left Parallax Modulation $$R'_{Lt}(x, y) = R_N(x, y) \sqrt[4]{\sqrt{\frac{R_{Lt}(x, y)}{R_{Rt}(x, y)}}} \sqrt{\sqrt{\frac{G_{Lt}(x, y)}{G_{Rt}(x, y)}}} \sqrt[4]{\sqrt{\frac{B_{Lt}(x, y)}{B_{Rt}(x, y)}}}$$

$$G'_{Lt}(x, y) = G_N(x, y) \sqrt[4]{\sqrt{\frac{R_{Lt}(x, y)}{R_{Rt}(x, y)}}} \sqrt{\sqrt{\frac{G_{Lt}(x, y)}{G_{Rt}(x, y)}}} \sqrt[4]{\sqrt{\frac{B_{Lt}(x, y)}{B_{Rt}(x, y)}}}$$

$$B'_{Lt}(x, y) = B_N(x, y) \sqrt[4]{\sqrt{\frac{R_{Lt}(x, y)}{R_{Rt}(x, y)}}} \sqrt{\sqrt{\frac{G_{Lt}(x, y)}{G_{Rt}(x, y)}}} \sqrt[4]{\sqrt{\frac{B_{Lt}(x, y)}{B_{Rt}(x, y)}}}$$

Right Parallax Modulation $$R'_{Rt}(x, y) = R_N(x, y) \sqrt[4]{\sqrt{\frac{R_{Rt}(x, y)}{R_{Lt}(x, y)}}} \sqrt{\sqrt{\frac{G_{Rt}(x, y)}{G_{Lt}(x, y)}}} \sqrt[4]{\sqrt{\frac{B_{Rt}(x, y)}{B_{Lt}(x, y)}}}$$

$$G'_{Rt}(x, y) = G_N(x, y) \sqrt[4]{\sqrt{\frac{R_{Rt}(x, y)}{R_{Lt}(x, y)}}} \sqrt{\sqrt{\frac{G_{Rt}(x, y)}{G_{Lt}(x, y)}}} \sqrt[4]{\sqrt{\frac{B_{Rt}(x, y)}{B_{Lt}(x, y)}}}$$

-continued $$B'_{Rt}(x, y) = B_N(x, y) \sqrt[4]{\sqrt{\frac{R_{Rt}(x, y)}{R_{Lt}(x, y)}}} \sqrt{\sqrt{\frac{G_{Rt}(x, y)}{G_{Lt}(x, y)}}} \sqrt[4]{\sqrt{\frac{B_{Rt}(x, y)}{B_{Lt}(x, y)}}}$$

In the fourth embodiment example, the shading process of the parallax images is described as being performed on the high-resolution parallax images at the final step 7, in order to be suitable for the hardware described at the end of the third embodiment example. However, in order to obtain a high-quality image through software processing, the shading correction of the parallax images may be inserted between step 3 and step 4 and the shading correction may be performed on the tentative parallax images. In this way, the effect of the parallax modulation of step 6 burying the gradation jumps caused by the gain increase of the shading correction is realized.

(Additional Note)

The following describes a case in which the shading correction described above is applied to a moving image. When the input image is a moving image, a computation such as described in the third embodiment example can be performed on each frame image one by one. In the other embodiment examples, many efforts to increase stability are being taken, such as removing the effect of the image structure of the subject or noise. However, if further stability strategies are desired for the time axis of the shading in the moving image, the following process can be considered. In moving image capturing, the image capturing generally includes operations on the camera side such as slowly zooming in and zooming out or slowly changing the diaphragm value. In other words, the pupil position and the pupil diameter, which are sources of change in the shading distribution of the stereoscopic image, change slowly. An I picture is arranged at the beginning of a scene change in a moving image, and then a P picture and a B picture are often arranged. Accordingly, the one-dimensional gain distribution data of step 5 obtained in the third embodiment example obtained during the time from one I picture to the frame immediately before the next I picture may be used for smooth function fitting in the time axis direction.

A personal computer can be made to function as the image processing device that fulfills the functions of the image data generating section 530, the one-dimensional projection data generating section 531, the one-dimensional smoothed data generating section 532, the one-dimensional reference data generating section 533, and the shading correcting section 534. The image processing device may acquire parallax image data from another apparatus, such as a camera. In this case, the image data generating section 530 fulfills the role of an image data acquiring section. In a case where the image data generating section 530 generates the parallax image data by itself, it can still be said that the image data generating section 530 acquires the parallax image data by generating this data itself. The image processing device is not limited to a personal computer, and can be realized in various forms. For example, the image processing device can be a device that includes a display section such as a TV, mobile telephone, or game device, or a device that is connected to the display section. The images in the above description can refer to image data or to an actual subject image that is visible as a result of being expanded according to a certain format.

In each of the embodiments described above, any of the following modifications are considered as methods for acquiring the parallax information resulting from the pupil division of a single lens.

1) The incident light of the single lens is split into two directions that each have half the optical intensity by a prism, and two-plate imaging is performed using a left parallax image sensor and a right parallax image sensor in each of which parallax pixels of only one type are closely arranged. In this way, each pixel can have the two types of information including the right parallax pixel value and the left parallax pixel value.

2) The structure of the single lens is such that diaphragms corresponding to the virtual pupils described in FIGS. 4-A to 4-D are inserted on the right side and left side in an alternating manner, and the left parallax image and right parallax image are acquired in order through two exposures of a monochromatic image sensors of normal non-parallax pixel While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

LIST OF REFERENCE NUMERALS

10: digital camera, 20: imaging lens, 21: optical axis, 50: digital camera, 60: imaging lens, 61: optical axis, 100: image sensor, 101: microlens, 102: color filter, 103: aperture mask, 104: aperture section, 105: wiring layer, 106: wiring, 107: aperture, 108: photoelectric converting element, 109: substrate, 201: control section, 202: A/D conversion circuit, 203: A/D conversion circuit, 204: driving section, 205: image processing section, 207: memory card IF, 208: manipulating section, 209: display section, 210: LCD drive circuit, 220: memory card, 230: image data generating section, 231: smoothed data generating section, 232: target image data generating section, 233: gain correcting section, 322: center line, 400: image sensor, 501: control section, 502: A/D conversion circuit, 503: memory, 504: driving section, 505: image processing section, 507: memory card IF, 508: manipulating section, 509: display section, 510: LCD drive circuit, 520: memory card, 530: image data generating section, 531: one-dimensional projection data generating section, 532: one-dimensional smoothed data generating section, 533: one-dimensional reference data generating section, 534: shading correcting section, 1801: distribution curve, 1802: distribution curve, 1804: distribution curve, 1805: distribution curve, 1806: combined distribution curve, 1807: distribution curve, 1808: distribution curve, 1809: combined distribution curve

What is claimed is:

1. An image processing device comprising:
an image sensor configured to input, through one optical system, at least two parallax images composed of an image of a first viewpoint direction and an image of a second viewpoint direction obtained by capturing a subject image of a partial luminous flux passed through different regions from among a total luminous flux; and
a computer configured to:
generate a first smoothed image and a second smoothed image by applying, respectively to the image of the first viewpoint direction and the image of the second viewpoint direction, a smoothing filter at least in a direction joining the first viewpoint and the second viewpoint;
generate a reference image formed by a value based on a product of a value of the first smoothed image and a value of the second smoothed image;
generate first gain distribution data by dividing a value of the reference image by the value of the first smoothed image;
perform a gain correction of each pixel on the image of the first viewpoint direction, based on the first gain distribution data; and
output the image of the first viewpoint direction on which the gain correction has been performed, as a parallax image for stereoscopic display, wherein
the smoothing filter is a filter for smoothing that has a filter radius approximately equal to a parallax amount occurring between the image of the first viewpoint direction and the image of the second viewpoint direction.

2. The image processing device according to claim 1, wherein the computer is further configured to:
generate second gain distribution data by dividing the value of the reference image by the value of the second smoothed image;
perform a gain correction of each pixel on the image of the second viewpoint direction, based on the second gain distribution data; and
output together the image of the first viewpoint direction on which the gain correction has been performed and the image of the second viewpoint direction on which the gain correction has been performed, as parallax images for stereoscopic display.

3. The image processing device according to claim 1, wherein
the reference image is formed by a value that is a geometric mean of the value of the first smoothed image and the value of the second smoothed image.

4. The image processing device according to claim 1, wherein the computer is further configured to:
acquire a tentative parallax image of the first viewpoint direction, a tentative parallax image of the second viewpoint direction, and a reference image of a reference direction between the first viewpoint direction and the second viewpoint direction having higher resolution than each of the tentative parallax images;
generate a high-resolution parallax image of the first viewpoint direction and a high-resolution parallax image of the second viewpoint direction by using the tentative parallax image of the first viewpoint direction, the tentative parallax image of the second viewpoint direction, and the reference image; and
input the tentative parallax image of the first viewpoint direction as an image of the first viewpoint direction and input the tentative parallax image of the second viewpoint direction as an image of the second viewpoint direction.

5. An image processing device comprising:
an image sensor configured to input, through one optical system, at least two parallax images composed of an image of a first viewpoint direction and an image of a second viewpoint direction obtained by capturing a subject image of a partial luminous flux passed through different regions from among a total luminous flux; and
a computer configured to:
generate a first smoothed image and a second smoothed image by applying, respectively to the image of the first viewpoint direction and the image of the second viewpoint direction, a smoothing filter at least in a direction joining the first viewpoint and the second viewpoint;
generate a reference image based on the first smoothed image and the second smoothed image;
generate first gain distribution data by dividing a value of the reference image by a value of the first smoothed image;
generate second gain distribution data by dividing the value of the reference image by a value of the second smoothed image;
perform a gain correction of each pixel on the image of the first viewpoint direction, based on the first gain distribution data;
perform a gain correction of each pixel on the image of the second viewpoint direction, based on the second gain distribution data;
output together the image of the first viewpoint direction on which the gain correction has been performed and the image of the second viewpoint direction on which the gain correction has been performed, as parallax images for stereoscopic display; and
adjust a parallax amount between the parallax images for the stereoscopic display, by causing a filter radius of the smoothing filter to be variable, wherein
the filter radius contracts to zero when eliminating the parallax and widens to a radius greater than or equal to a maximum parallax amount that can occur between two parallax pixels of the input image when preserving the parallax.

6. The image processing device according to claim 5, wherein
the reference image is formed by a value based on a product of a value of the first smoothed image and a value of the second smoothed image.

7. The image processing device according to claim 6, wherein
the reference image is formed by a value that is a geometric mean of the value of the first smoothed image and the value of the second smoothed image.

8. The image processing device according to claim 5, wherein
the computer is further configured to:
acquire a tentative parallax image of the first viewpoint direction, a tentative parallax image of the second viewpoint direction, and a reference image of a reference direction between the first viewpoint direction and the second viewpoint direction having higher resolution than each of the tentative parallax images;
generate a high-resolution parallax image of the first viewpoint direction and a high-resolution parallax image of the second viewpoint direction by using the tentative parallax image of the first viewpoint direction, the tentative parallax image of the second viewpoint direction, and the reference image; and
input the tentative parallax image of the first viewpoint direction as an image of the first viewpoint direction and input the tentative parallax image of the second viewpoint direction as an image of the second viewpoint direction.

9. An image processing device comprising:
an image sensor configured to acquire first image data corresponding to a first viewpoint and second image data corresponding to a second viewpoint, obtained through an optical system of which at least a portion is shared; and
a computer configured to:
generate first smoothed data and second smoothed data by respectively filtering the first image data and the second image data such that an image represented by the first image data and an image represented by the second image data are smoothed in a parallax direction;
generate target image data using a geometric mean of a pixel value of the first smoothed data and a pixel value of the second smoothed data corresponding to each of the smoothed data; and
correct the first image data using a ratio of the target image data to the first smoothed data.

10. The image processing device according to claim 9, wherein
the gain correcting section corrects the second image data using a ratio of the target image data to the second smoothed data.

11. The image processing device according to claim 9, wherein
the computer is further configured to:
perform smoothing using a parallax amount occurring between the first image data and the second image data as a sampling width.

12. The image processing device according to claim 9, wherein
the image sensor is further configured to:
acquire reference image data corresponding to a third viewpoint that is a reference direction, and
the computer is further configured to:
generate high-resolution reference image data using the first image data, the second image data, and the reference image data, generates high-resolution first image data using the first image data that has been corrected and the high-resolution reference image data; and
generate high-resolution second image data using the second image data that has been corrected and the high-resolution reference image data.

13. An image processing device comprising:
an image sensor configured to acquire first image data corresponding to a first viewpoint and second image data corresponding to a second viewpoint, obtained through an optical system of which at least a portion is shared; and
a computer configured to:
generate first smoothed data and second smoothed data by respectively filtering the first image data and the second image data such that an image represented by the first image data and an image represented by the second image data are smoothed in a parallax direction;
generate target image data based on the first smoothed data and the second smoothed data;
correct the first image data using a ratio of the target image data to the first smoothed data and correct the second image data using a ratio of the target image data to the second smoothed data; and
adjust a parallax amount between the first image data and the second image data after the correction by the gain correcting section, by adjusting a sampling width of the smoothing.

14. The image processing device according to claim 13, wherein
the computer is further configured to:
generate the target image data using a geometric mean of a pixel value of the first smoothed data and a pixel value of the second smoothed data corresponding to each of the smoothed data.

15. The image processing device according to claim 13, wherein
when maintaining the parallax amount occurring at a time of acquisition by the image sensor, the computer is further configured to:
adjust the sampling width to be greater than or equal to a maximum parallax amount between the first image data and the second image data, and when decreasing the parallax amount occurring at the time of acquisition by the image sensor; and
adjust the sampling width to be less than the maximum parallax amount between the first image data and the second image data.

16. The image processing device according to claim 13, wherein
the image sensor is further configured to:
acquire reference image data corresponding to a third viewpoint that is a reference direction, and
the computer is further configured to:
generate high-resolution reference image data using the first image data, the second image data, and the reference image data;
generate high-resolution first image data using the first image data that has been corrected and the high-resolution reference image data; and
generate high-resolution second image data using the second image data that has been corrected and the high-resolution reference image data.

17. An imaging apparatus comprising:
the image processing device according to claim 9, wherein
the first image data and the second image data are generated based on output of the image sensor.

18. A non-transitory computer-readable medium storing thereon an image processing program that causes a computer to:
acquire first image data corresponding to a first viewpoint and second image data corresponding to a second viewpoint, obtained through an optical system of which at least a portion is shared;
generate first smoothed data and second smoothed data by respectively filtering the first image data and the second image data such that an image represented by the first image data and an image represented by the second image data are smoothed in a parallax direction;
generate target image data using a geometric mean of a pixel value of the first smoothed data and a pixel value of the second smoothed data corresponding to each of the smoothed data; and
correct the first image data using a ratio of the target image data to the first smoothed data.

19. An image processing device comprising:
an image sensor configured to input, through one optical system, at least two parallax images composed of an image of a first viewpoint direction and an image of a second viewpoint direction obtained by capturing a subject image of a partial luminous flux passed through different regions from among a total luminous flux; and
a computer configured to:
generate one-dimensional distribution data of the first viewpoint direction and one-dimensional distribution data of the second viewpoint direction projected one-dimensionally respectively for the image of the first viewpoint direction and the image of the second viewpoint direction, by adding together pixel values of a plurality of pixels lined up in a y direction orthogonal to an x direction that joins the first viewpoint and the second viewpoint;
generate first one-dimensional smoothed distribution data and second one-dimensional smoothed distribution data by applying a one-dimensional smoothing filter respectively to the one-dimensional distribution data of the first viewpoint direction and the one-dimensional distribution data of the second viewpoint direction projected one-dimensionally;
generate one-dimensional reference distribution data by obtaining a point between the first one-dimensional smoothed distribution data and the second one-dimensional smoothed distribution data, based on the first one-dimensional smoothed distribution data and the second one-dimensional smoothed distribution data;
generate first one-dimensional gain distribution data by dividing a value of the one-dimensional reference distribution data by a value of the first one-dimensional smoothed distribution data;
perform a gain correction in the one-dimensional direction on the image of the first viewpoint direction, using the first one-dimensional gain distribution data in common at each y coordinate; and
output the image of the first viewpoint on which the gain correction has been performed, as a parallax image for stereoscopic display, wherein
the one-dimensional smoothing filter is a filter that smooths across a range greater than a maximum parallax amount occurring between the image of the first viewpoint direction and the image of the second viewpoint direction.

20. The image processing device according to claim 19, wherein
the computer is further configured to:
generate second one-dimensional gain distribution data by dividing a value of the one-dimensional reference distribution data by a value of the second one-dimensional smoothed distribution data;

perform a gain correction in the one-dimensional direction on the image of the second viewpoint direction, using the second one-dimensional gain distribution data in common for each row; and output together the image of the first viewpoint direction on which the gain correction has been performed and the image of the second viewpoint direction on which the gain correction has been performed, as parallax images for stereoscopic display.

21. The image processing device according to claim 20, wherein
the computer is further configured to:
perform function fitting on the obtained first one-dimensional gain distribution data to approximate the first one-dimensional gain distribution data with a gentle change curve, and uses the fitting curve as the one-dimensional gain distribution data for performing the gain correction on the image of the first viewpoint direction; and
perform function fitting on the obtained second one-dimensional gain distribution data to approximate the second one-dimensional gain distribution data with a gentle change curve, and uses the fitting curve as the one-dimensional gain distribution data for performing the gain correction on the image of the second viewpoint direction.

22. The image processing device according to claim 21, wherein
the function fitting uses a fourth-degree polynomial for the approximation.

23. The image processing device according to claim 19, wherein
the image of the first viewpoint direction and the image of the second viewpoint direction are arbitrary general subject images captured by the optical system with arbitrary optical conditions.

24. The image processing device according to claim 19, wherein
the computer is further configured to:
use a thumbnail image of the image of the first viewpoint direction and a thumbnail image of the image of the second viewpoint direction as input images.

25. The image processing device according to claim 19, wherein
the computer is further configured to:
obtain an arithmetic mean or a geometric mean of the first one-dimensional smoothed distribution data and the second one-dimensional smoothed distribution data.

26. An image processing device comprising:
an image sensor configure to acquire first image data corresponding to a first viewpoint and second image data corresponding to a second viewpoint, obtained through an optical system of which at least a portion is shared; and
a computer configured to:
generate first one-dimensional projection data and second one-dimensional projection data by adding together, respectively for the first image data and the second image data, pixel values of a plurality of pixels lined up in a direction orthogonal to a parallax direction;
generate first one-dimensional smoothed data and second one-dimensional smoothed data by calculating, respectively for the first one-dimensional projection data and the second one-dimensional projection data, a movement average with a sampling width that is greater than or equal to a maximum parallax amount;
generate one-dimensional reference data based on the first one-dimensional smoothed data and the second one-dimensional smoothed data; and
perform a shading correction on the first image data using a ratio of the one-dimensional reference data to the first one-dimensional smoothed data.

27. The image processing device according to claim 26, wherein
the computer is further configured to:
perform the shading correction on the second image data using a ratio of the one-dimensional reference data to the second one-dimensional smoothed data.

28. The image processing device according to claim 27, wherein
the computer is further configured to:
generate the one-dimensional reference data based on an arithmetic mean or a geometric mean of a pixel value of the first one-dimensional smoothed data and a pixel value of the second one-dimensional smoothed data corresponding to each of the one-dimensional smoothed data.

29. The image processing device according to claim 27, wherein
the computer is further configured to:
use function fitting to generate the ratio of the one-dimensional reference data to the first one-dimensional smoothed data and the ratio of the one-dimensional reference data to the second one-dimensional smoothed data.

30. The image processing device according to claim 29, wherein
the function is a fourth-degree polynomial.

31. The image processing device according to claim 26, wherein
the computer is further configured to:
decrease resolution of an image represented by the first image data and an image represented by the second image data; and
generate the first one-dimensional projection data and the second one-dimensional projection data respectively for the first image data and the second image data expressing the images after the decrease of the resolution.

32. An imaging apparatus comprising:
the image processing device according to claim 26, wherein
the first image data and the second image data are generated based on output of the image sensor.

33. A non-transitory computer-readable medium storing thereon an image processing program that causes a computer to:
acquire first image data corresponding to a first viewpoint and second image data corresponding to a second viewpoint, obtained through an optical system of which at least a portion is shared;
generate first one-dimensional projection data and second one-dimensional projection data by adding together, respectively for the first image data and the second image data, pixel values of a plurality of pixels lined up in a direction orthogonal to a parallax direction;
generate first one-dimensional smoothed data and second one-dimensional smoothed data by calculating, respectively for the first one-dimensional projection data and the second one-dimensional projection data, a movement average with a sampling width that is greater than or equal to a maximum parallax amount;

generate one-dimensional reference data based on the first one-dimensional smoothed data and the second one-dimensional smoothed data; and perform a shading correction on the first image data using a ratio of the one-dimensional reference data to the first one-dimensional smoothed data.

\* \* \* \* \*